US008066226B2

(12) United States Patent
Fiala et al.

(10) Patent No.: US 8,066,226 B2
(45) Date of Patent: Nov. 29, 2011

(54) INERTIAL PROPULSION DEVICE TO MOVE AN OBJECT UP AND DOWN

(76) Inventors: Harvey E. Fiala, Downey, CA (US);
John Emil Fiala, Spring, TX (US);
John-Arthur Fiala, Spring, TX (US)

( * ) Notice: Subject to any disclaimer, the term of this patent is extended or adjusted under 35 U.S.C. 154(b) by 0 days.

(21) Appl. No.: 12/931,856

(22) Filed: Feb. 11, 2011

(65) Prior Publication Data

US 2011/0219893 A1     Sep. 15, 2011

Related U.S. Application Data

(63) Continuation-in-part of application No. 12/009,852, filed on Jan. 22, 2008, now Pat. No. 7,900,874.

(51) Int. Cl.
*B64G 1/40* (2006.01)

(52) U.S. Cl. ..................................... 244/171.5; 244/165

(58) Field of Classification Search ............... 244/171.5, 244/165; 74/DIG. 9, 84 S, 84 R
See application file for complete search history.

(56) References Cited

U.S. PATENT DOCUMENTS

| 3,555,915 | A | * | 1/1971 | Young, Jr. | ............ 74/84 S |
| 5,557,988 | A | * | 9/1996 | Claxton | ............ 74/84 S |
| 2004/0050191 | A1 | * | 3/2004 | Chung | ............ 74/84 S |
| 2005/0005719 | A1 | * | 1/2005 | Chung | ............ 74/84 S |
| 2009/0108136 | A1 | * | 4/2009 | Suzuki | ............ 244/165 |

* cited by examiner

*Primary Examiner* — Timothy D Collins
*Assistant Examiner* — Philip J Bonzell

(57) ABSTRACT

Disclosed herein are two separate processes that do not require a propellant and do not produce an equal and opposite reaction against any external form of matter in the Local Inertial Reference Frame and do not violate Newton's Laws in the Universal Reference Frame. The first process produces horizontal motion, relies on the earth's gravitational field as an external force, and has been successfully tested. The second process produces vertical motion and relies only on the aether. It has been successfully tested considering the effect of the earth's gravity. Due to the law of conservation of angular momentum, the first process is considered by some to not be possible, but with the proper use of an external field (for example, gravity) and the phenomenon of precession, it is clearly possible. A clear distinction is made between a simple rotor and a gyroscope which is a far more complex device.

7 Claims, 51 Drawing Sheets

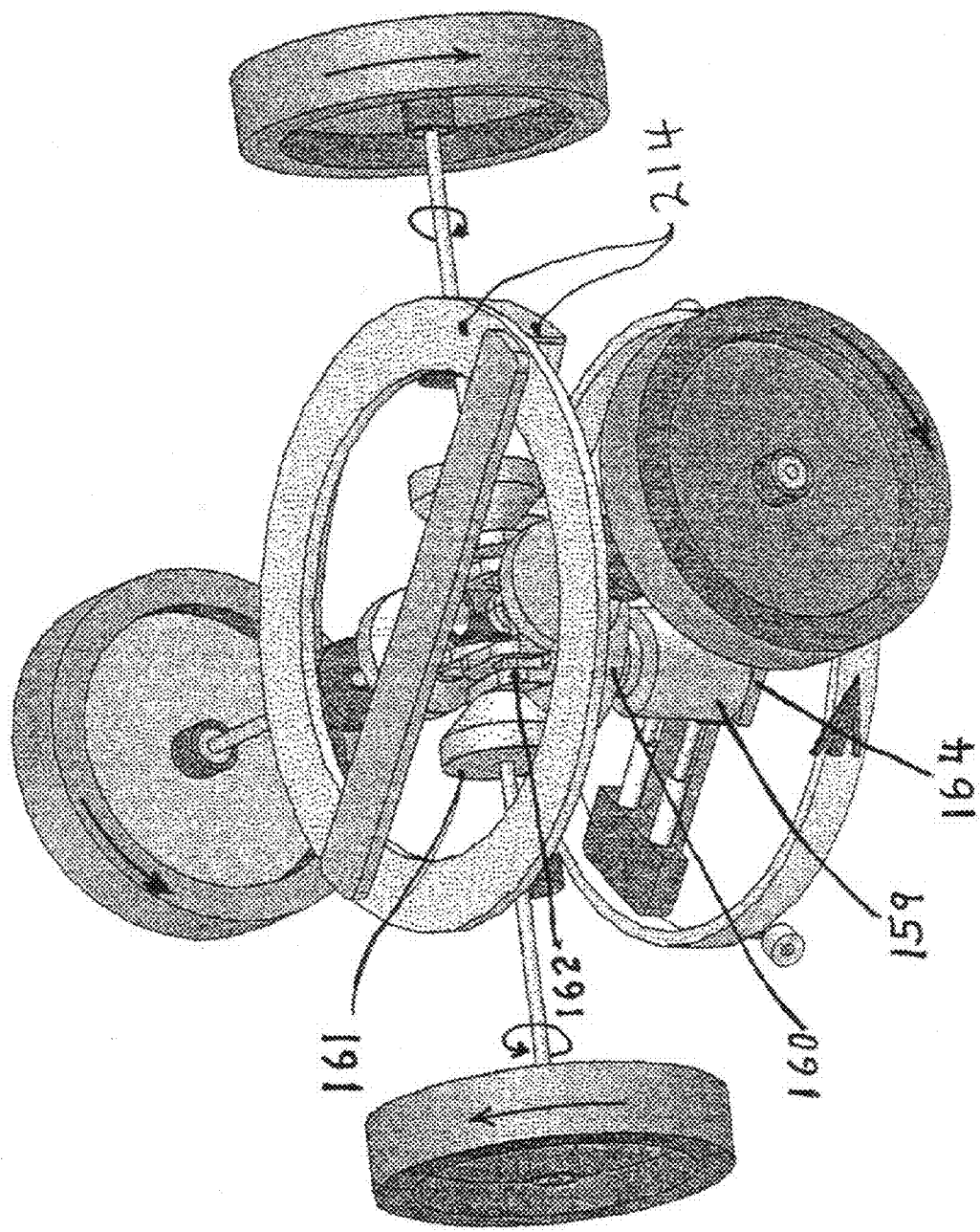

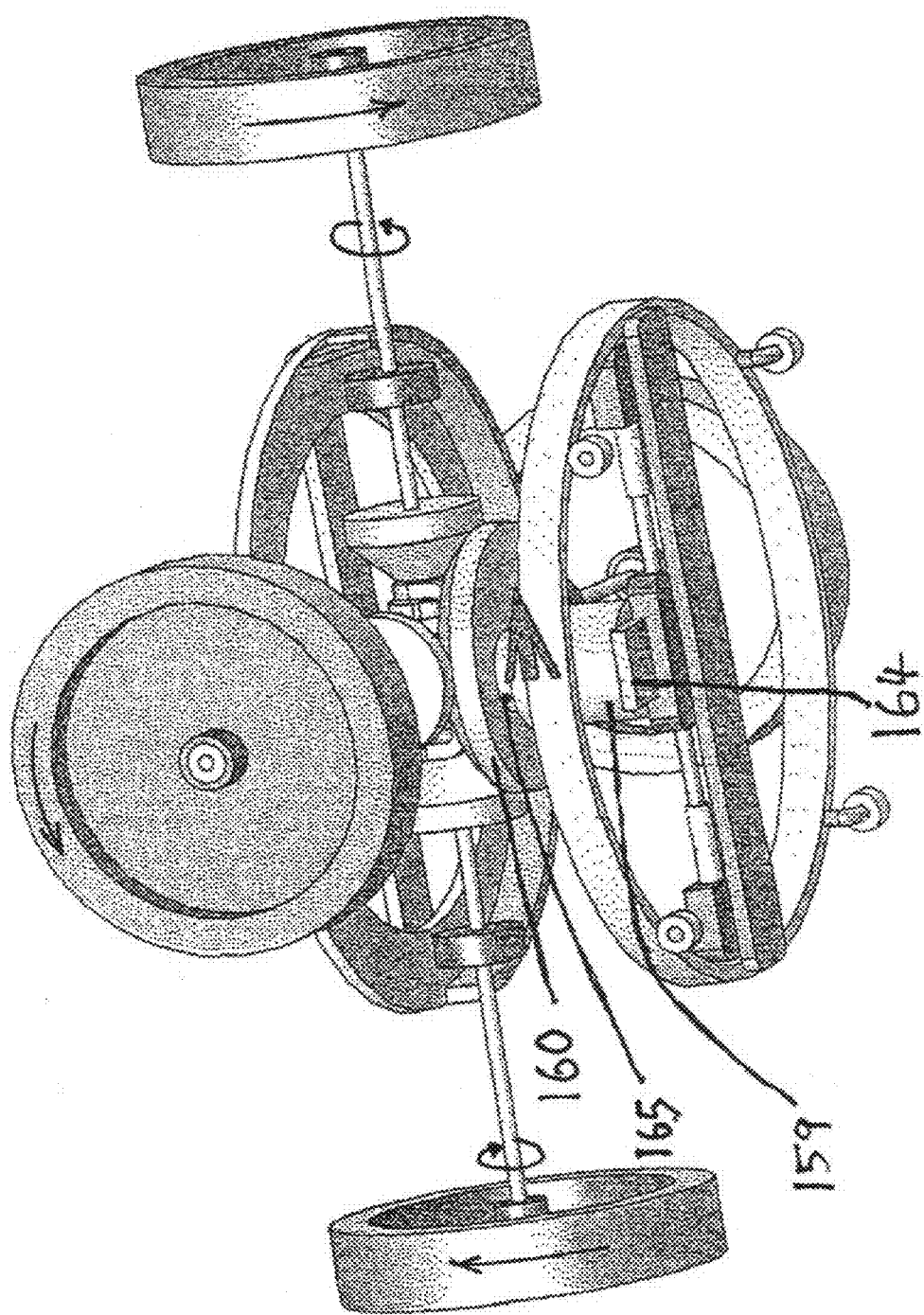

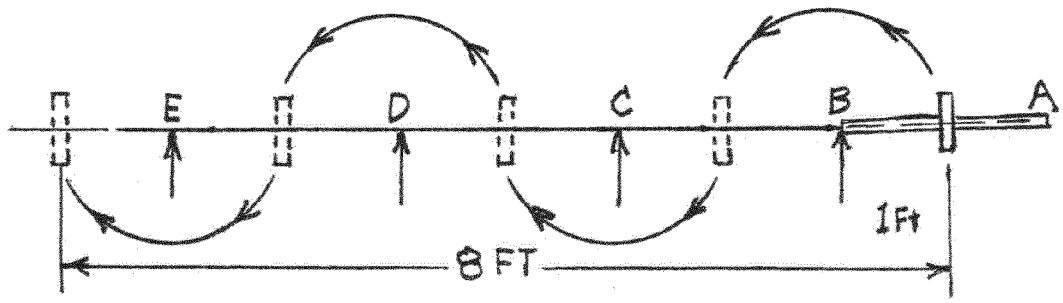
B, C, D, & E ARE PIVOT POINTS
FIGURE 14: S-CURVE HMMT
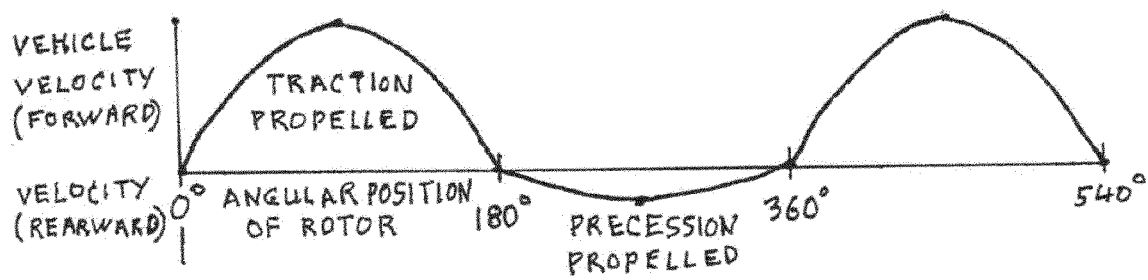
FIGURE 15: VELOCITY FOR SINGLE ROTOR OF FIGURE 1

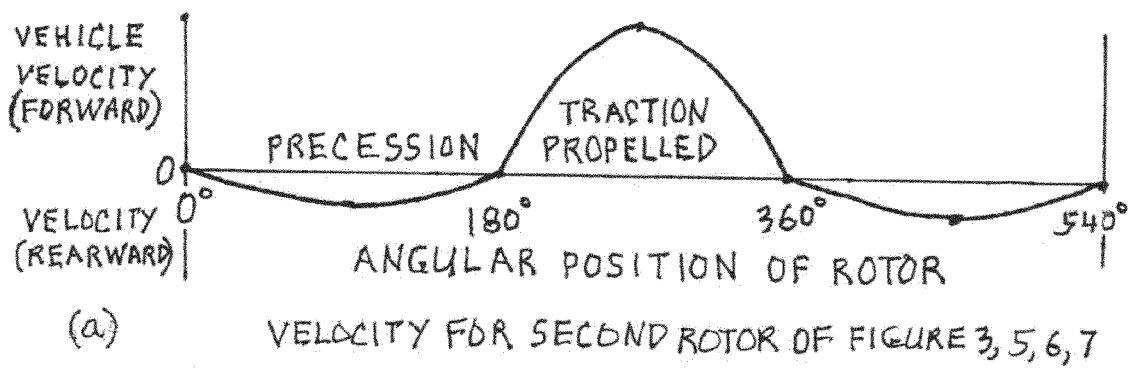
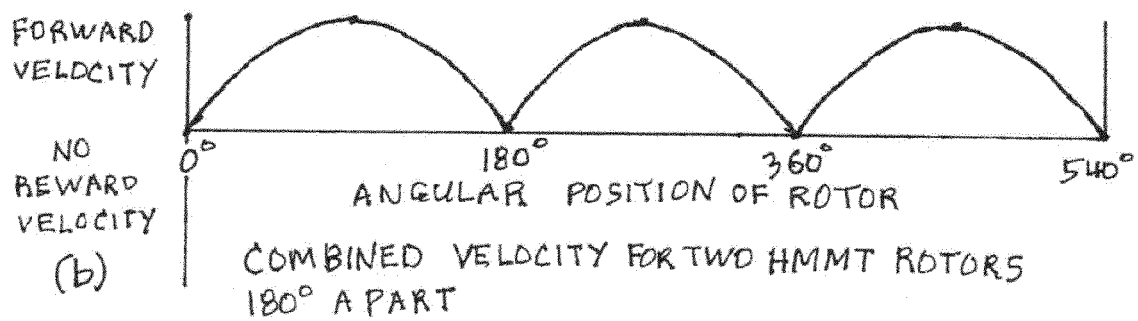
FIGURE 16: VELOCITIES FOR TWO-ROTOR HMMT IPD+ OF FIGURES 3, 5, 6, 7
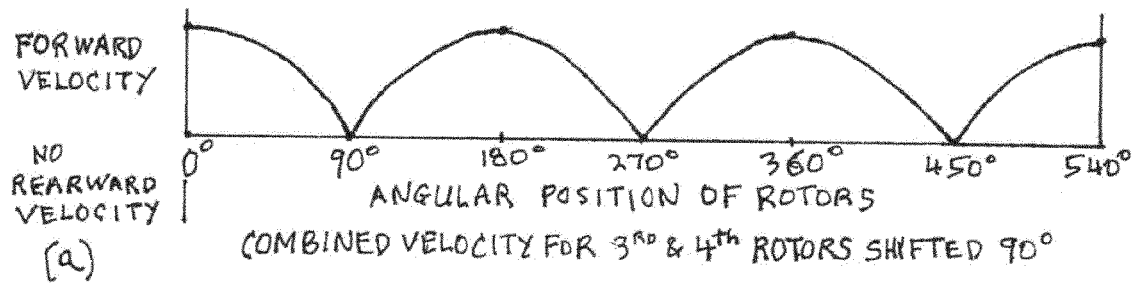
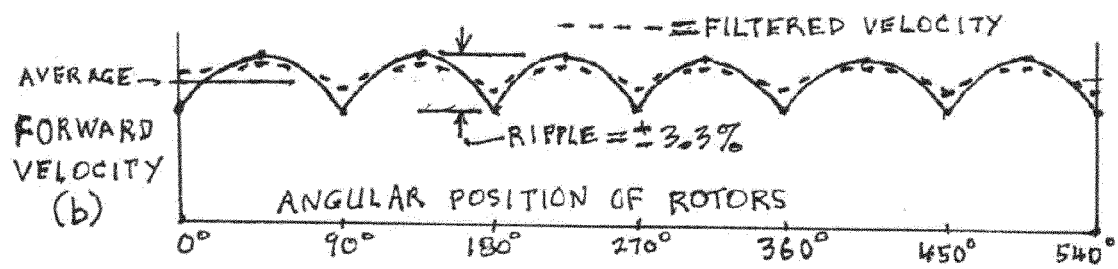
FIGURE 17: COMBINED VELOCITY FOR FOUR ROTORS 90° APART FOR FIGURES 9 & 10

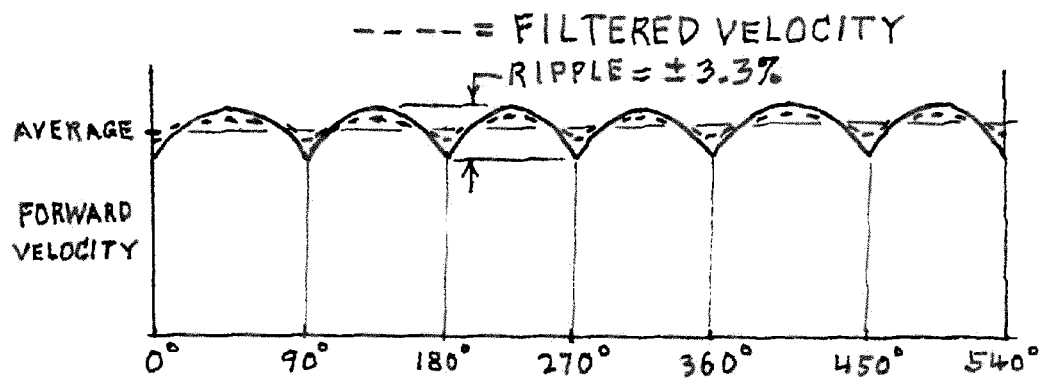
FIGURE 18: VELOCITY WAVEFORMS FOR FOUR ROTORS EACH 90° APART FOR FIGURES 9, 10, 21, 24, 25, 26, 27, & 28
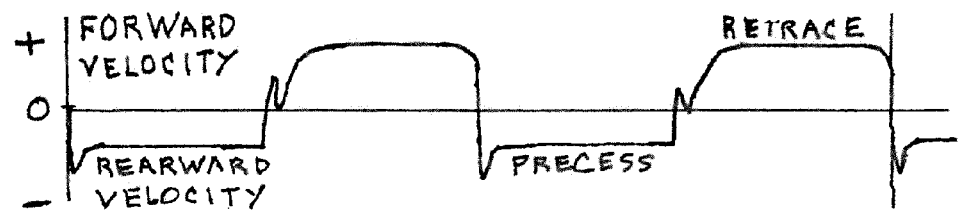
FIGURE 19: VELOCITY FOR 60 DEGREE HMT IPD OF FIGURE 13

FIG. 22: FIALA VERTICAL SPACE DRIVE (FVSD)

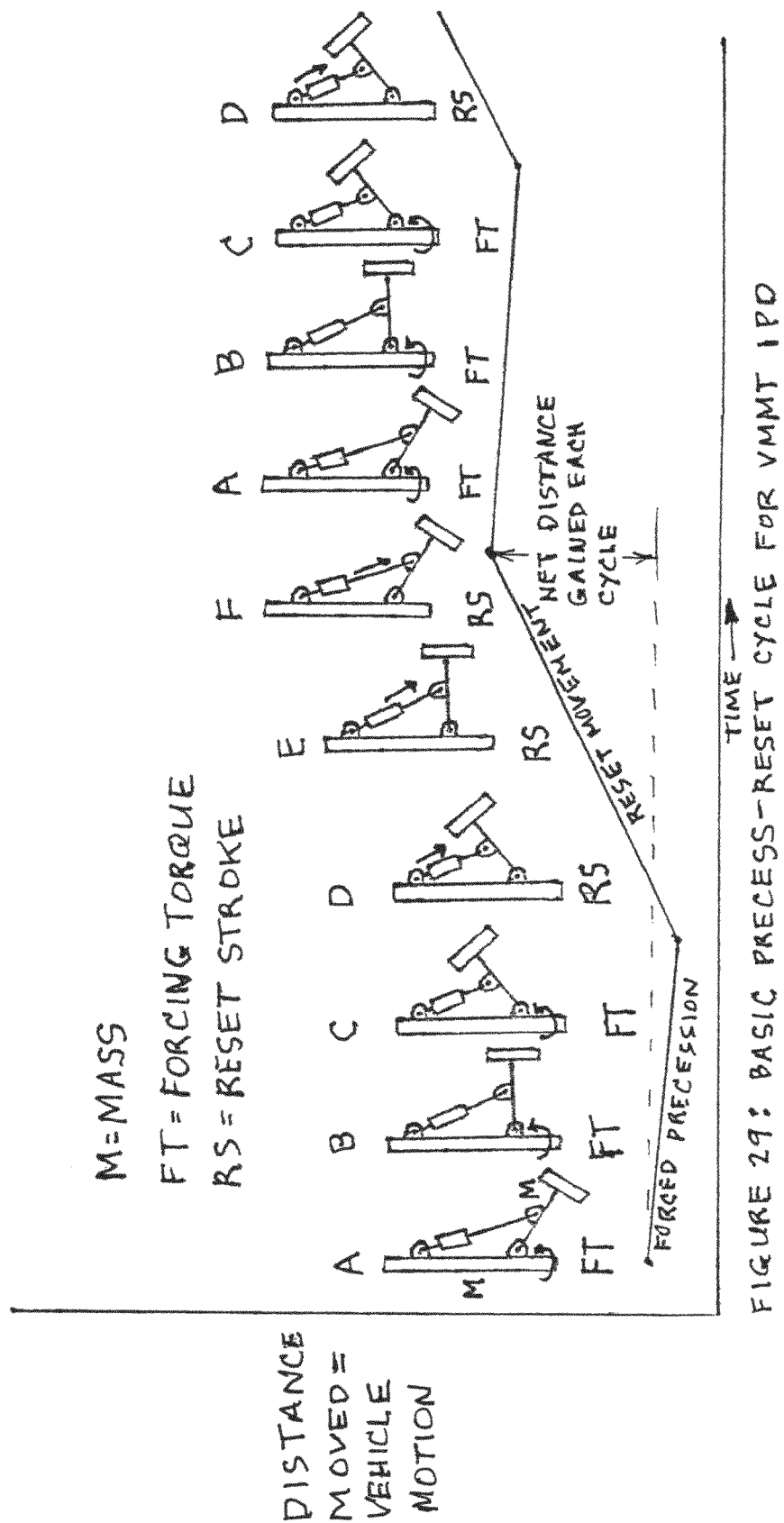

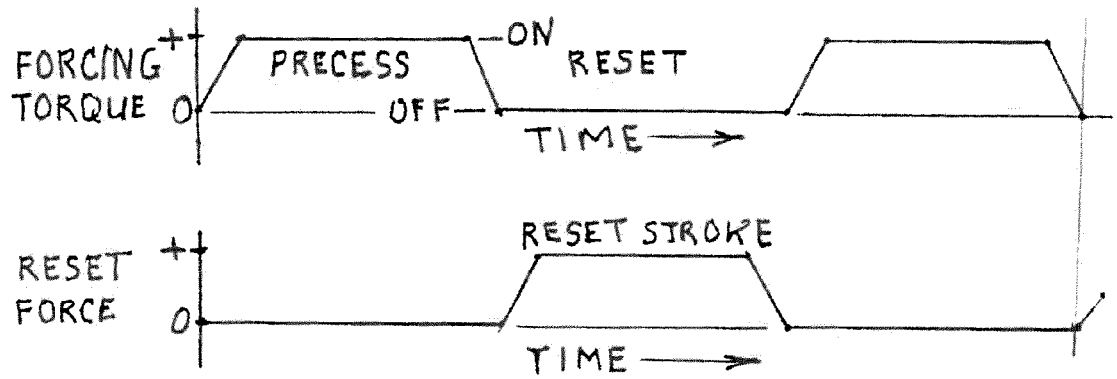
FIGURE 30: PRECESS-RESET CYCLE FOR VMMT
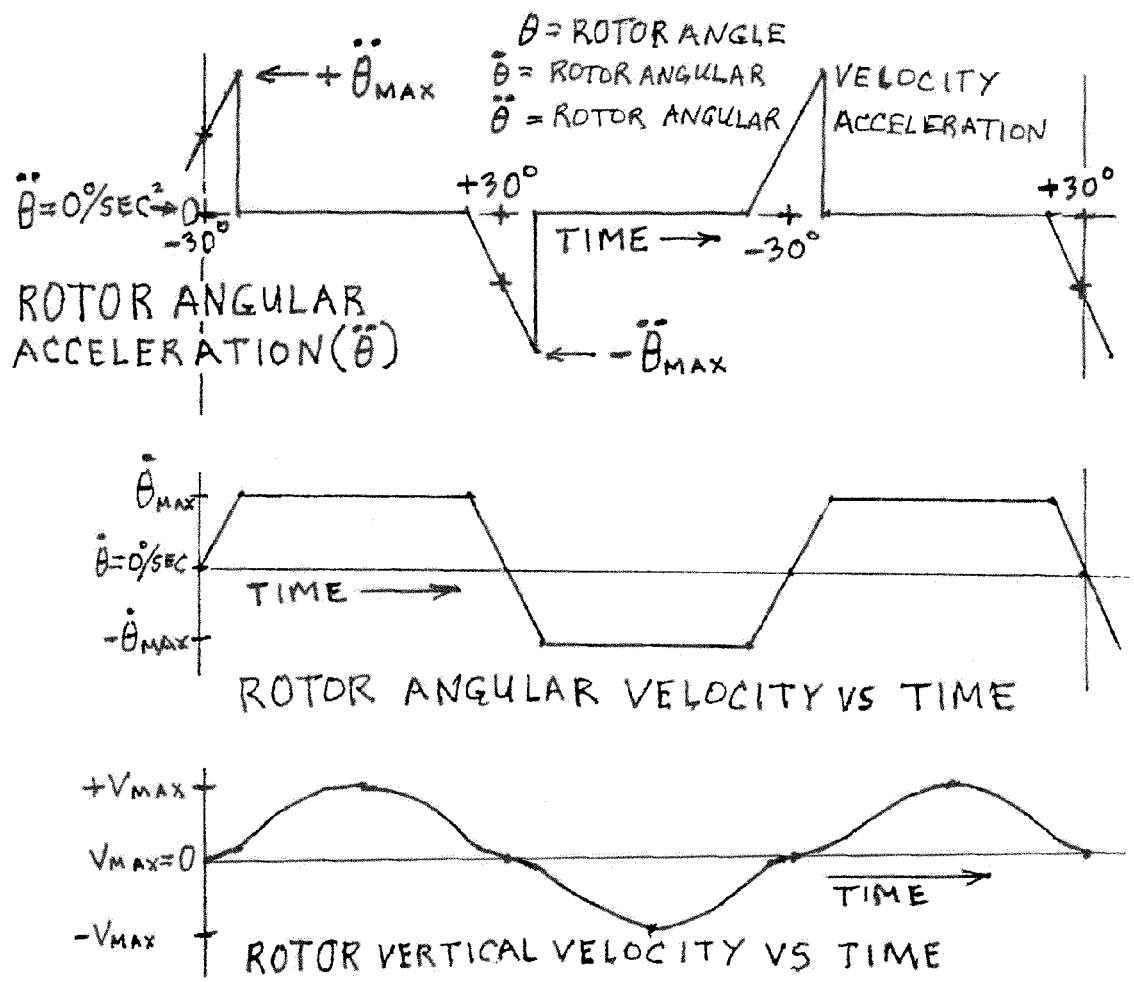
FIGURE 31: WAVEFORMS FOR INDIVIDUAL ROTORS

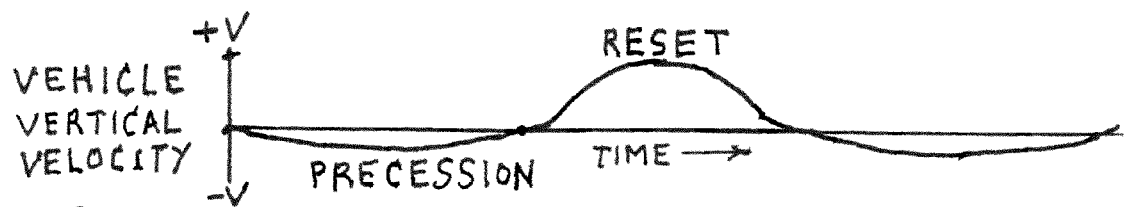
FIGURE 32: VEHICLE VERTICAL VELOCITY FOR FIGURE 20
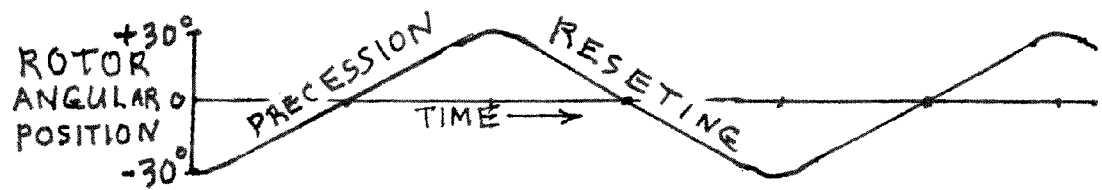
FIGURE 33: ROTOR ANGULAR POSITION FOR FIGURE 20

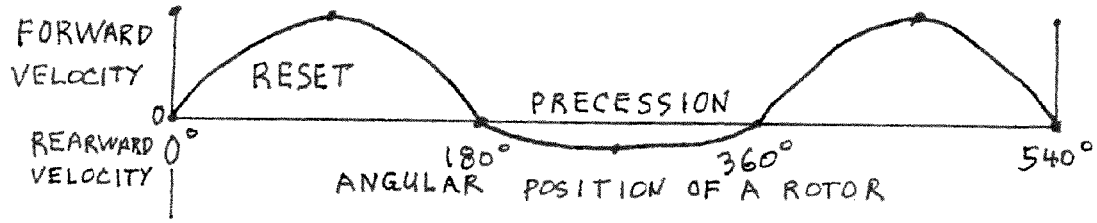
(a) VELOCITY FOR INDIVIDUAL ROTORS OF FIGURES 22, 24, 25
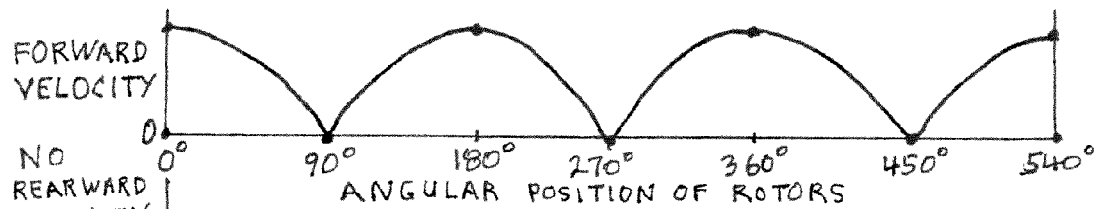
(b) COMBINED VELOCITY FOR ROTORS IN FIGURE 22, 24, 25
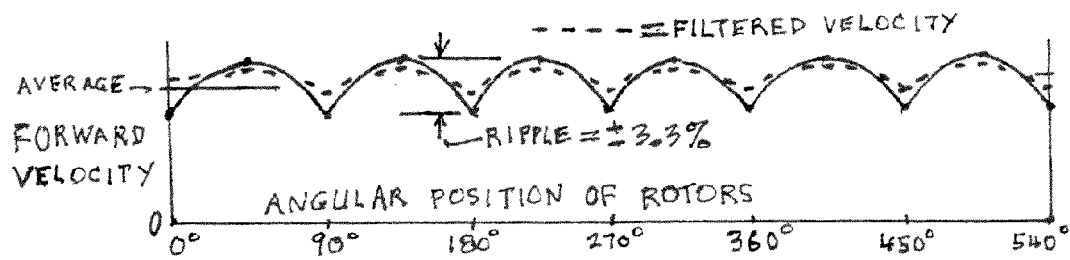
(c) VELOCITY FOR TWO SETS OF ROTORS 90° APART IN FIGURES 27 & 28
FIGURE 34: VARIOUS VELOCITY WAVEFORMS OF FIG. 22, 24, 25, 26, 27, 28

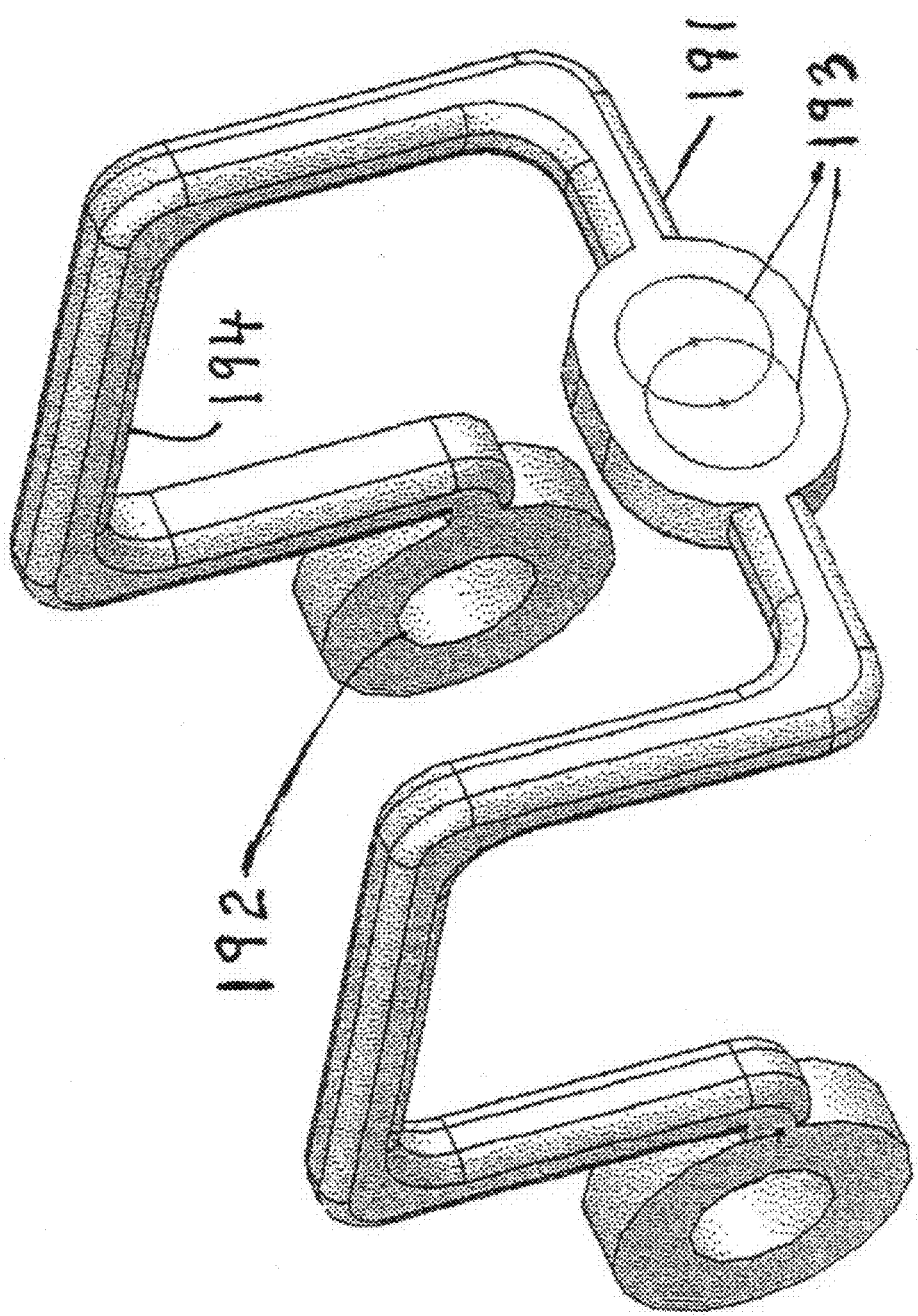

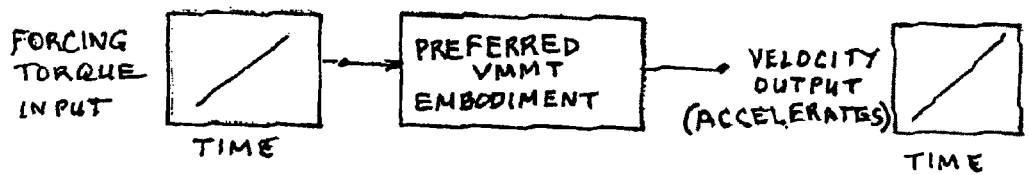
FIGURE 37: INCREASING FORCING TORQUE PRODUCES ACCELERATION
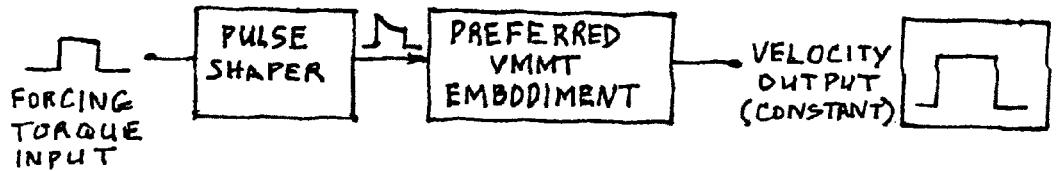
FIGURE 38: PULSE SHAPED INPUT PRODUCES CONSTANT VELOCITY
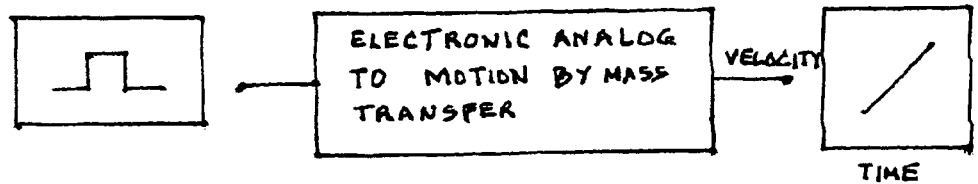
FIGURE 39: Electronic Analog to Inertial Propulsion Device

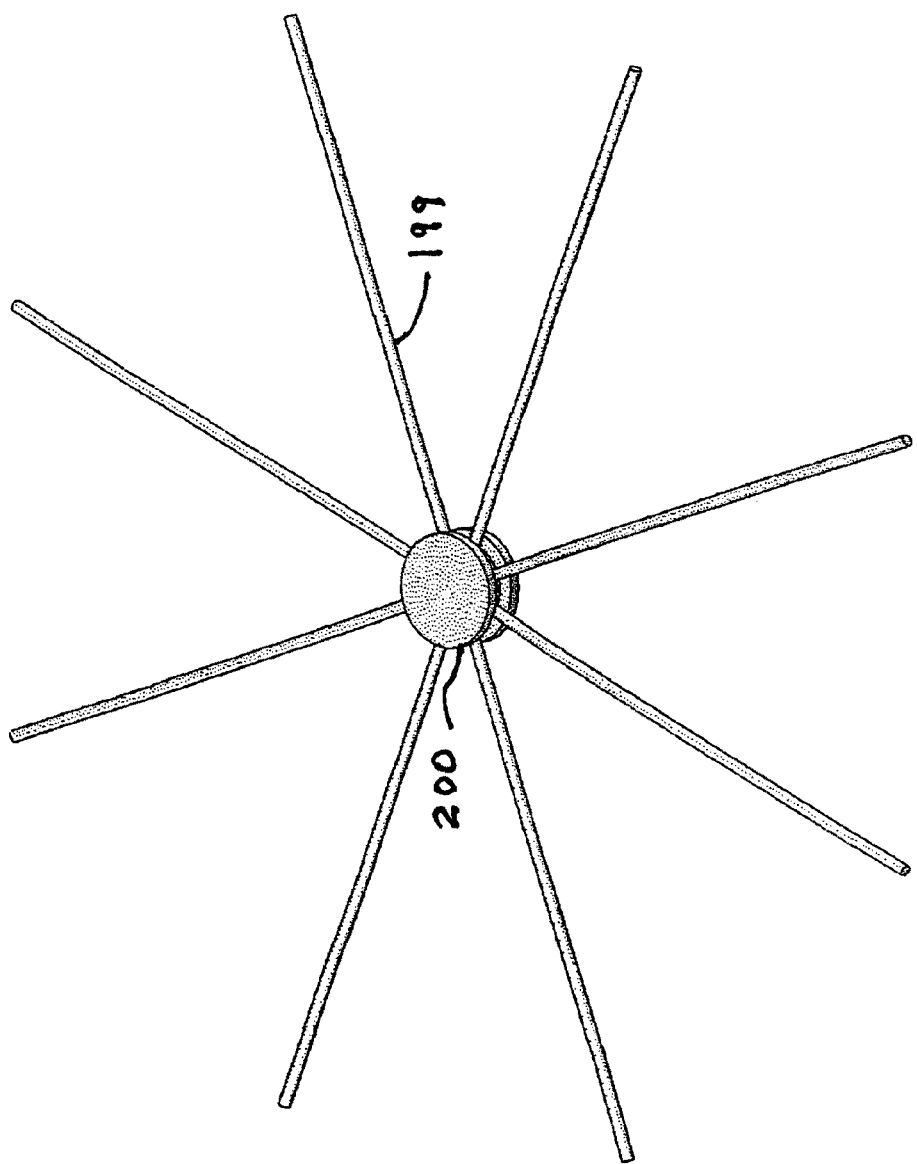

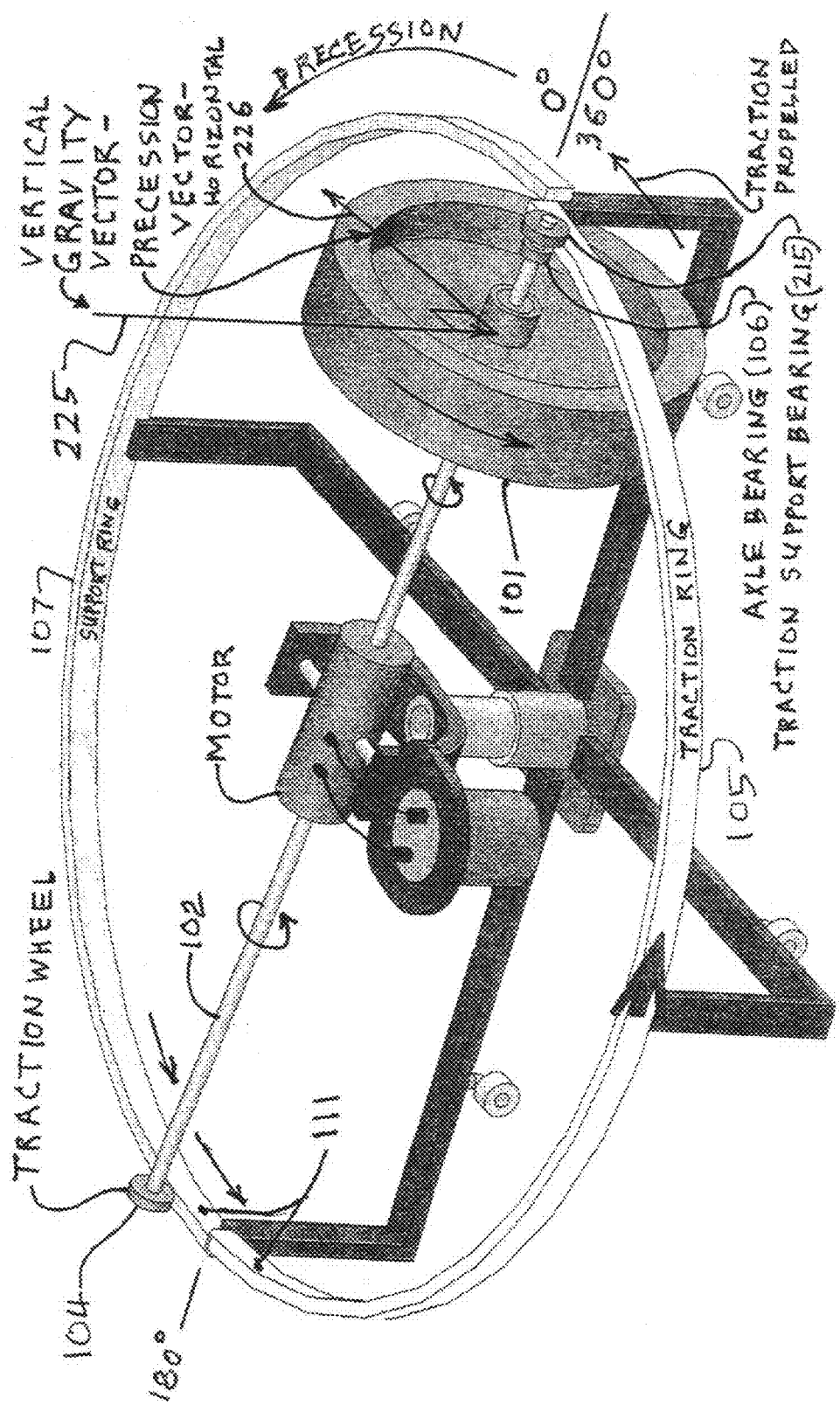

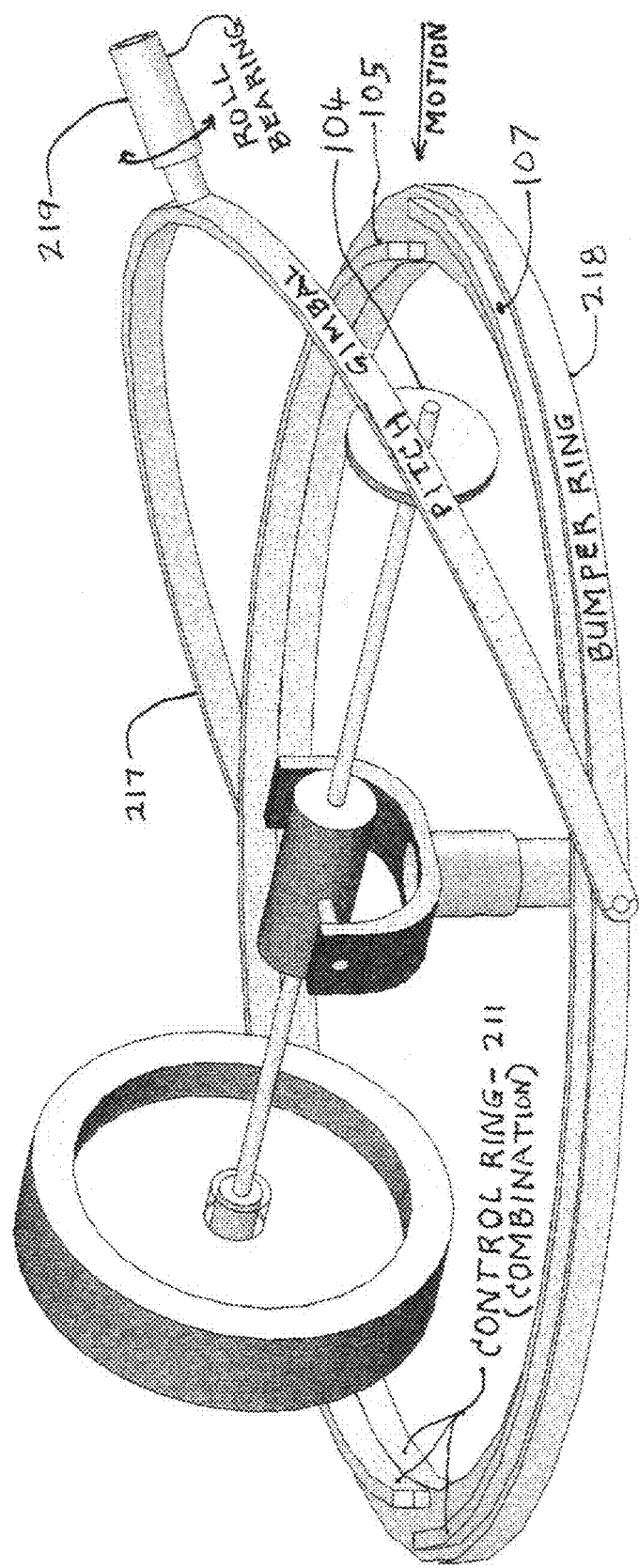
FIG 46: SELF-LEVELING HMT IPD

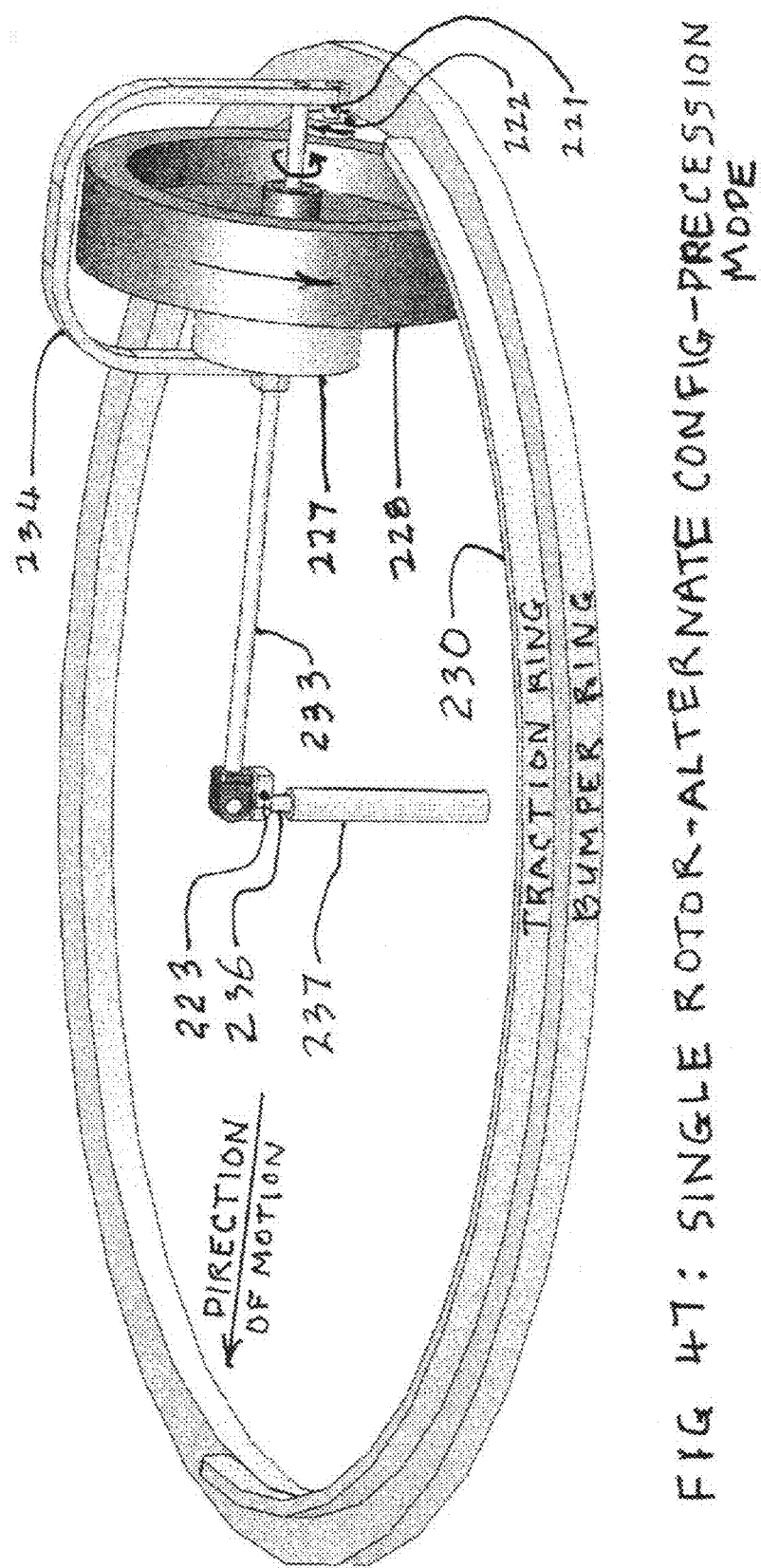
FIG 47: SINGLE ROTOR-ALTERNATE CONFIG-PRECESSION MODE

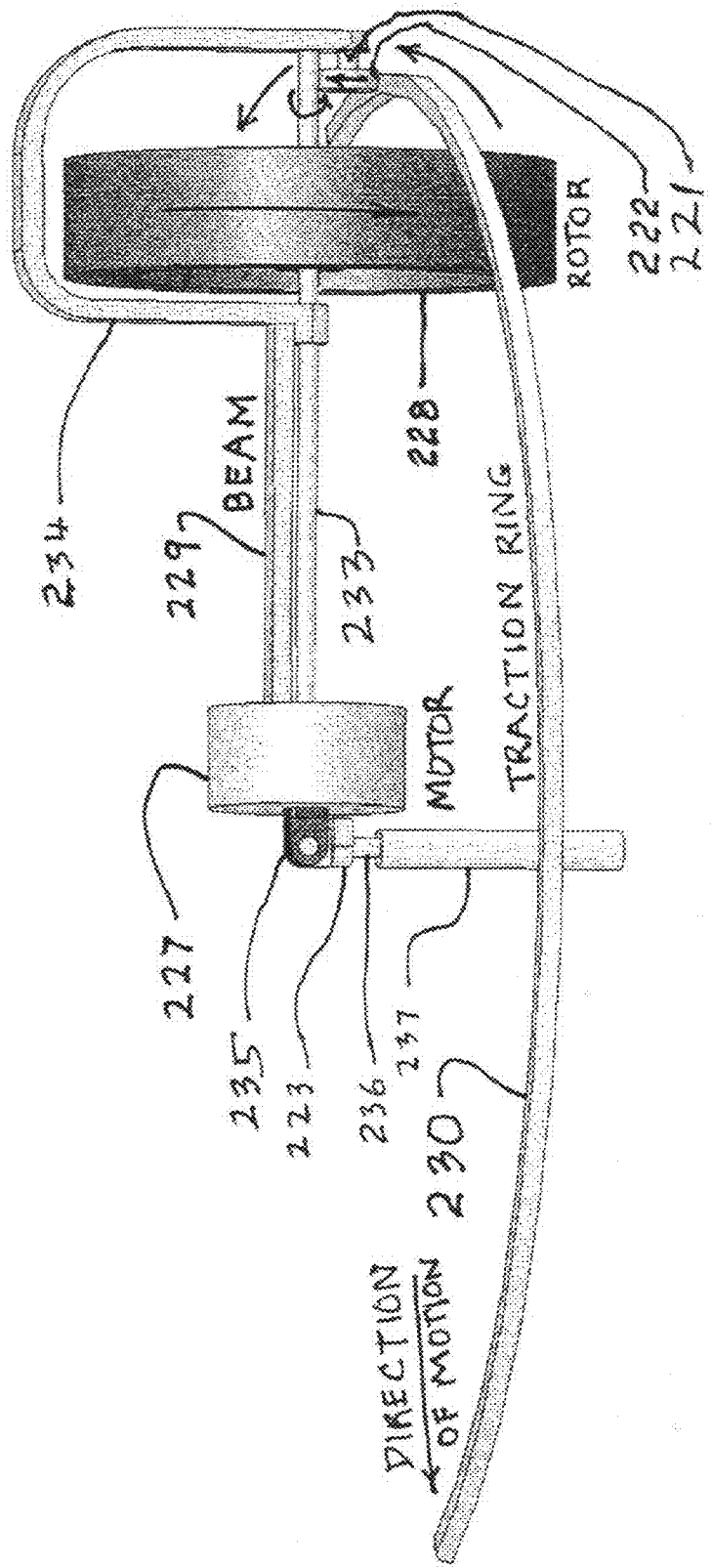
FIG 48A: MOTOR NEAR CENTER

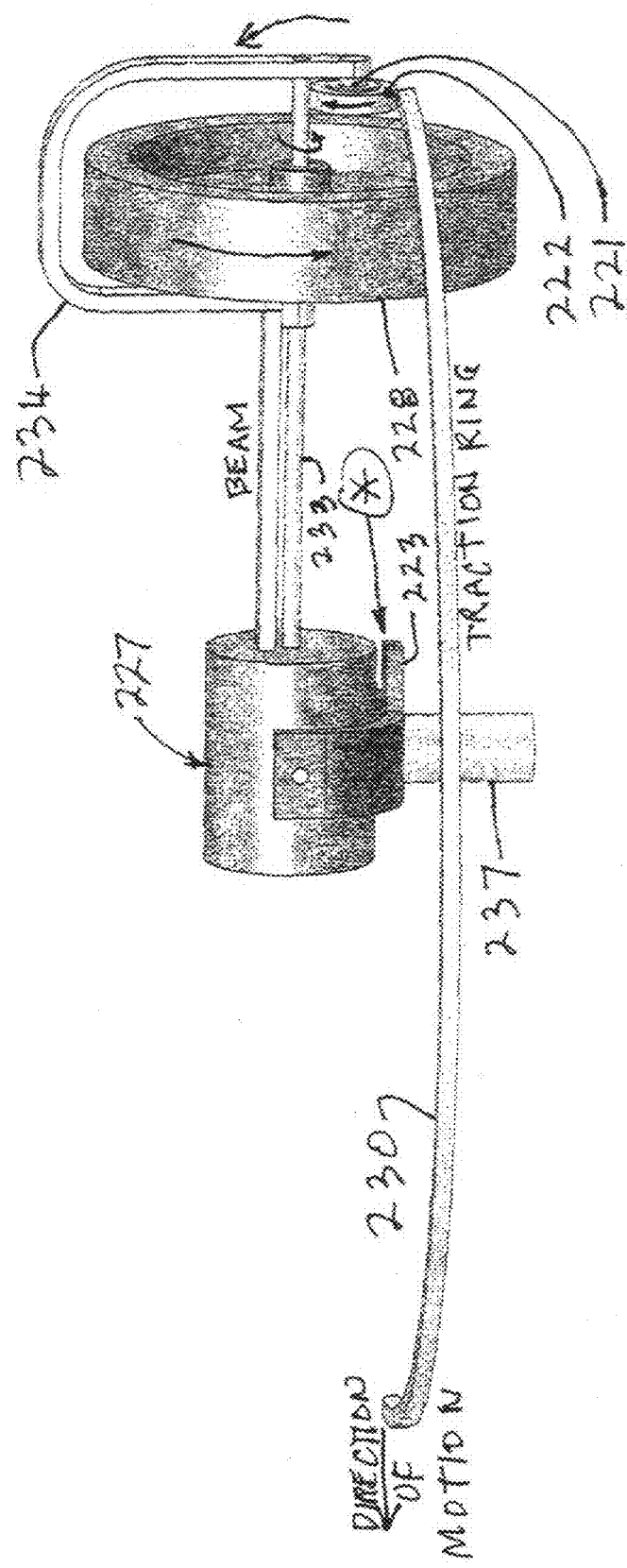
FIG 48B: MOTOR AT CENTER

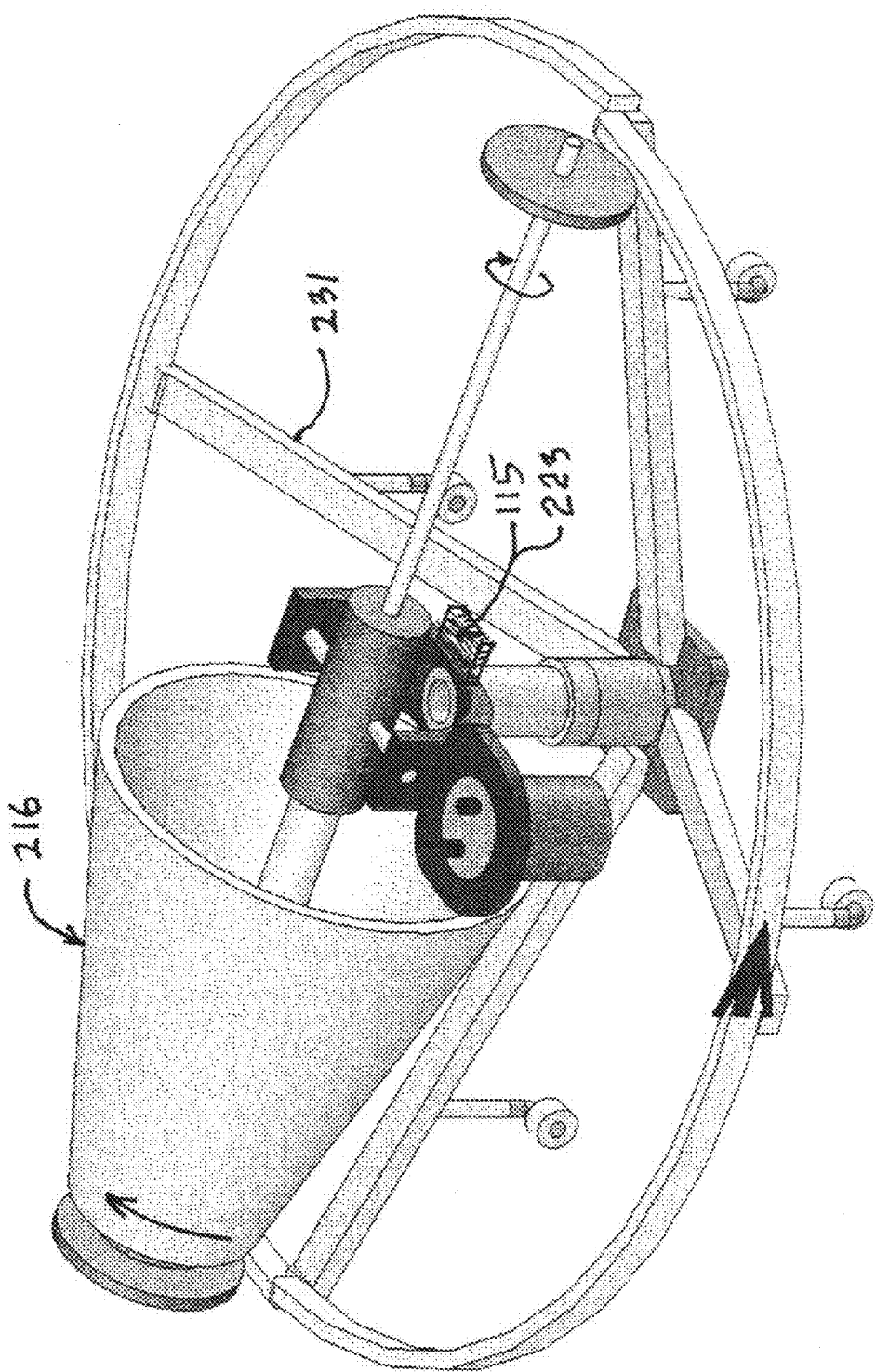

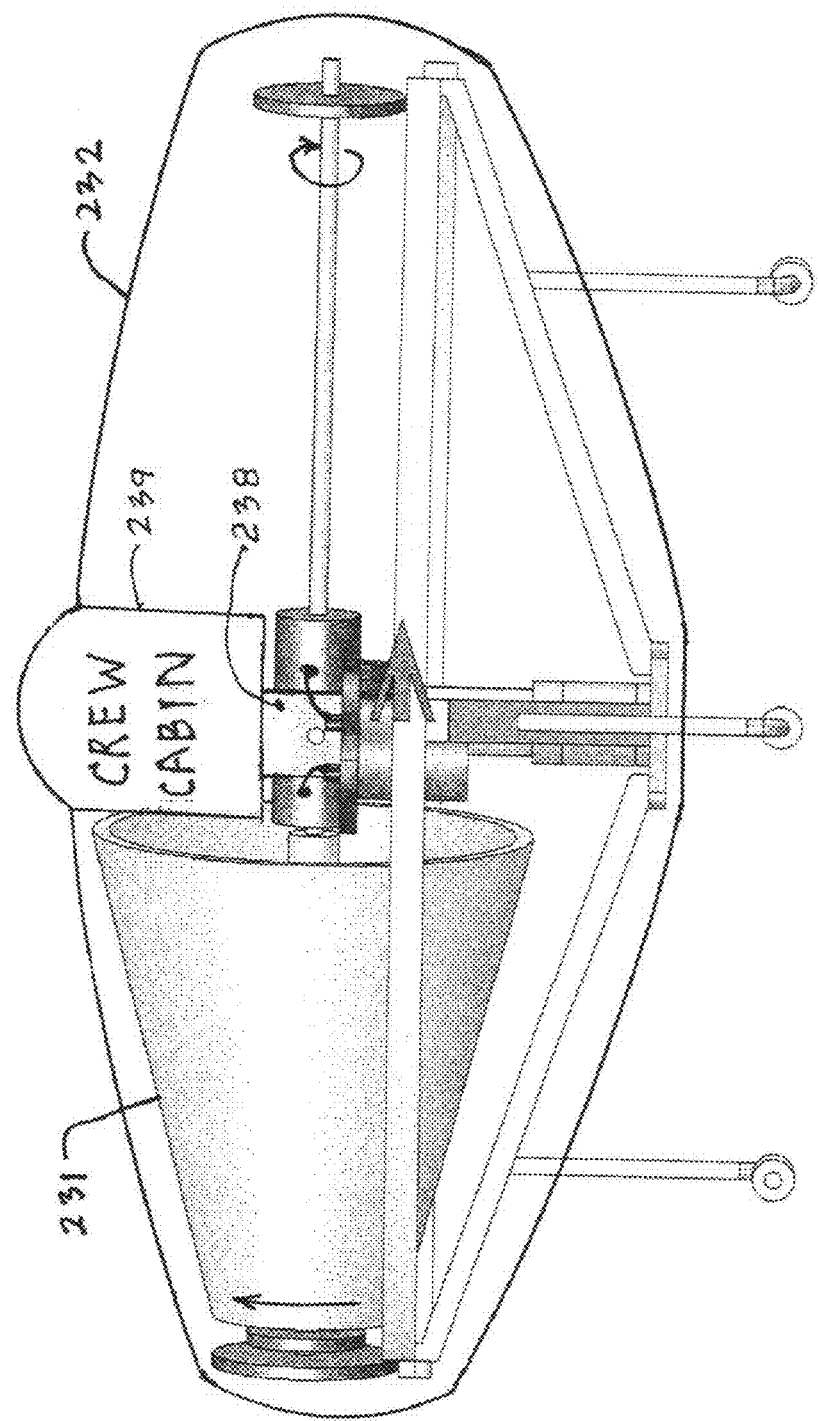
FIG 50: FLYING SAUCER USING AN HMT IPD

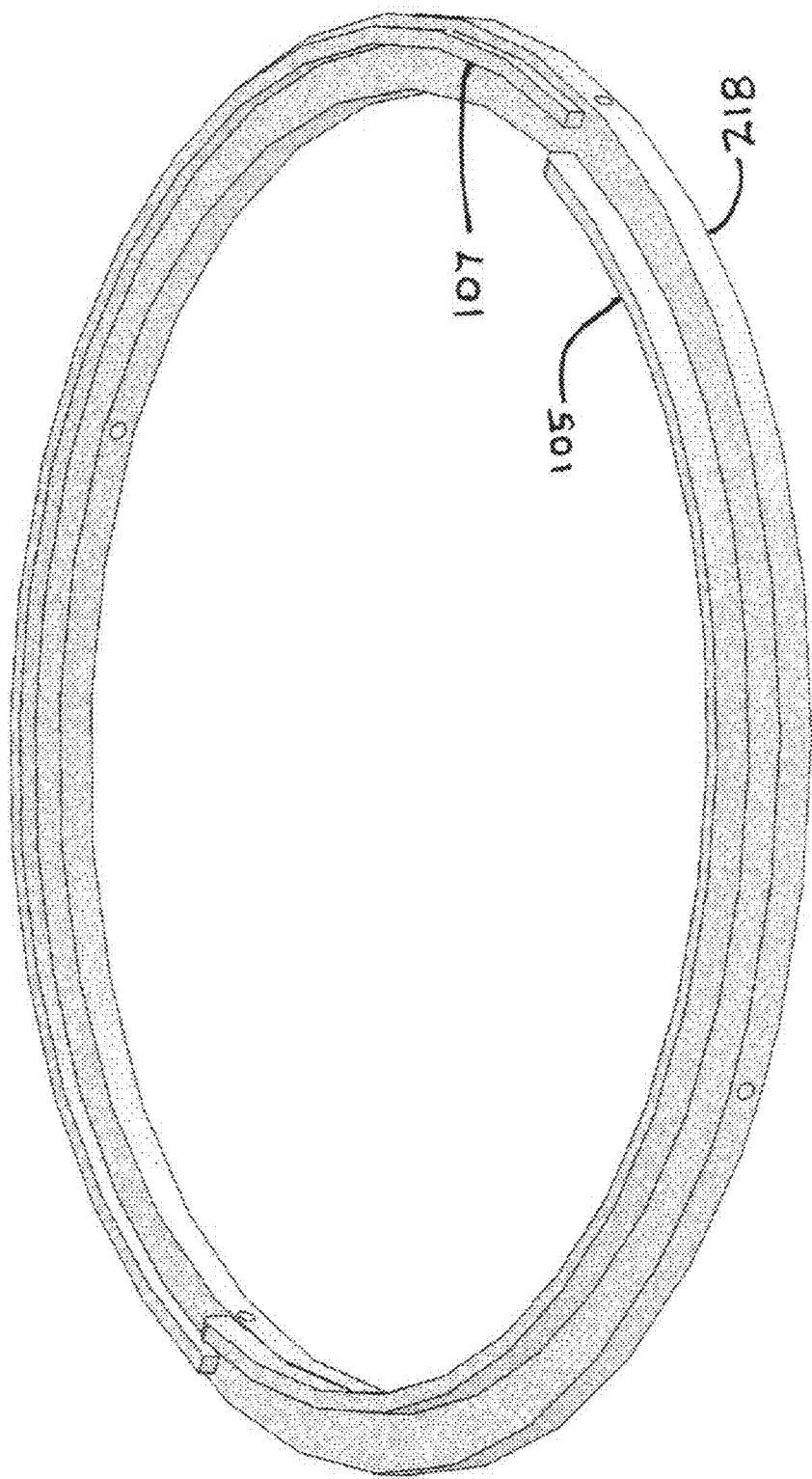
FIG 51 : CONTROL RING ASSEMBLY

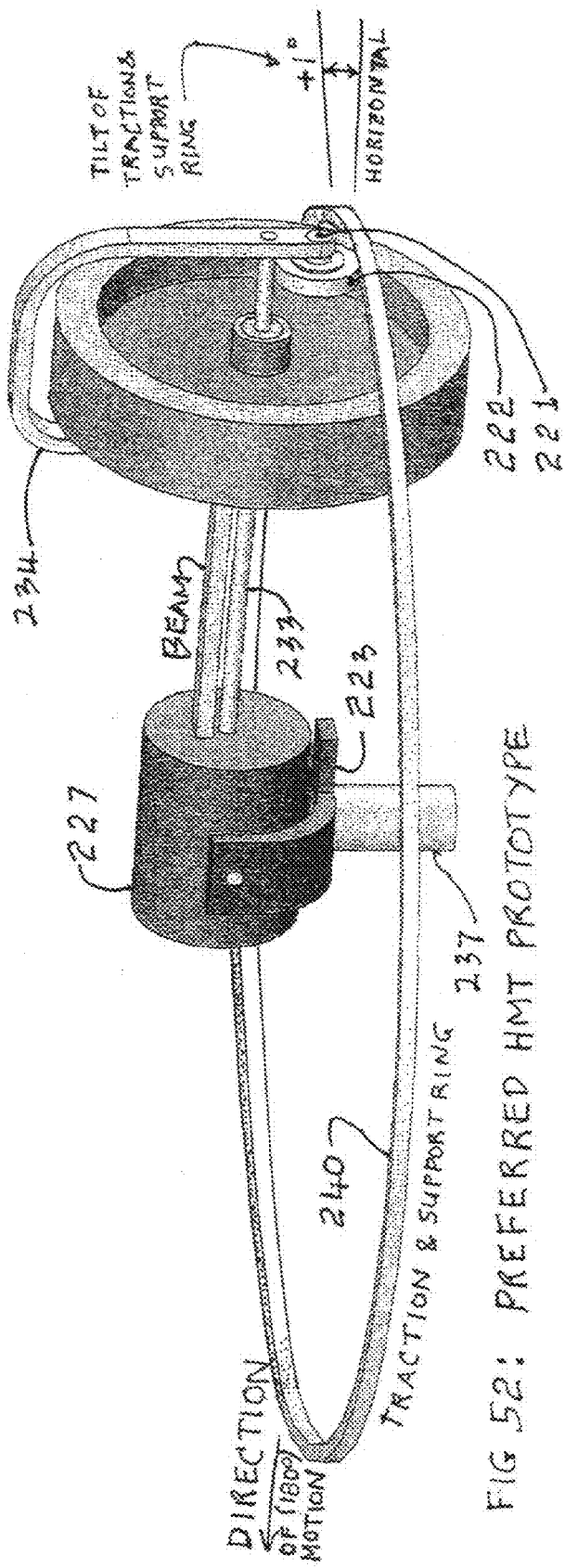
FIG 52: PREFERRED HMT PROTOTYPE

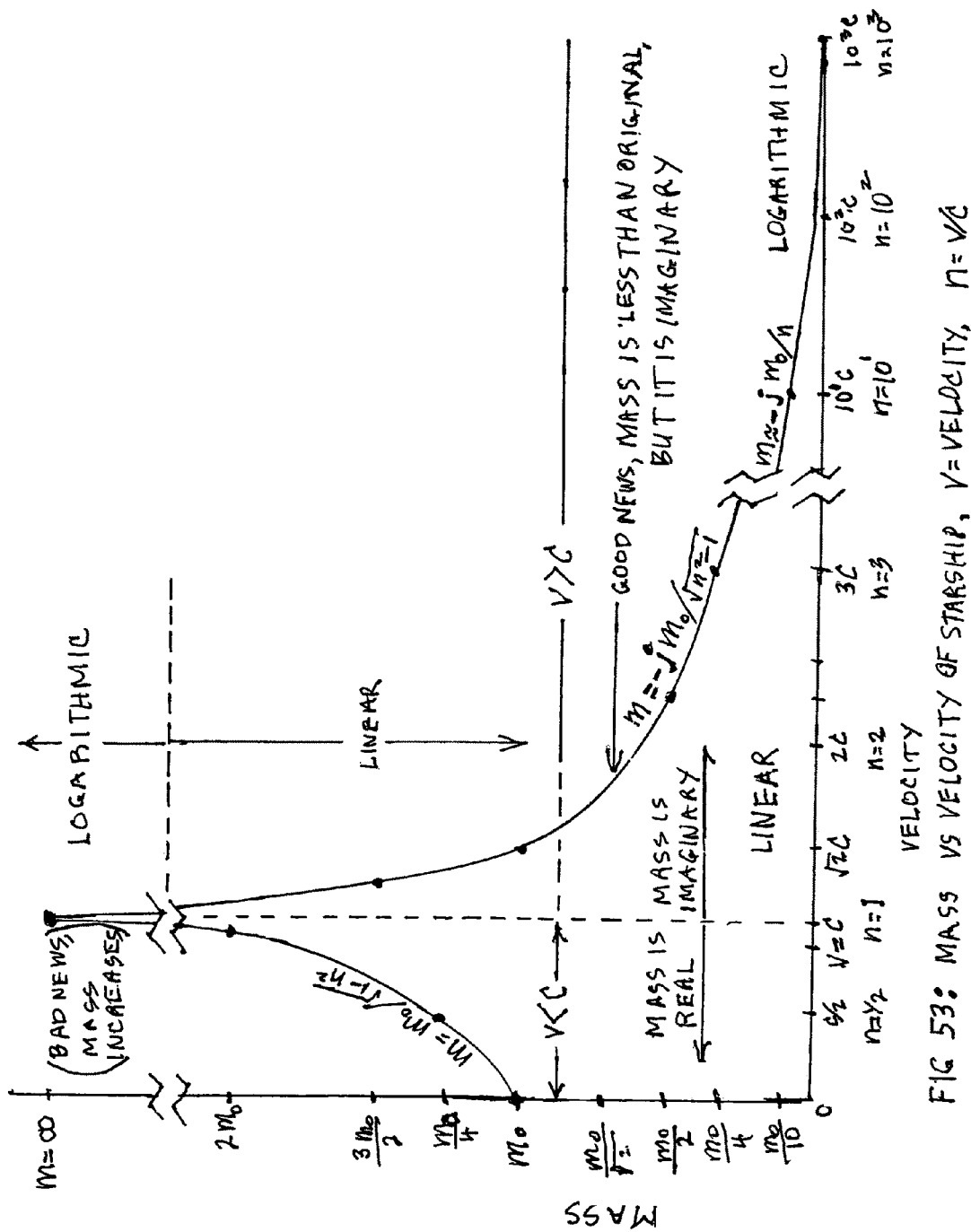
FIG 53: MASS vs VELOCITY OF STARSHIP, V=VELOCITY, n=V/C

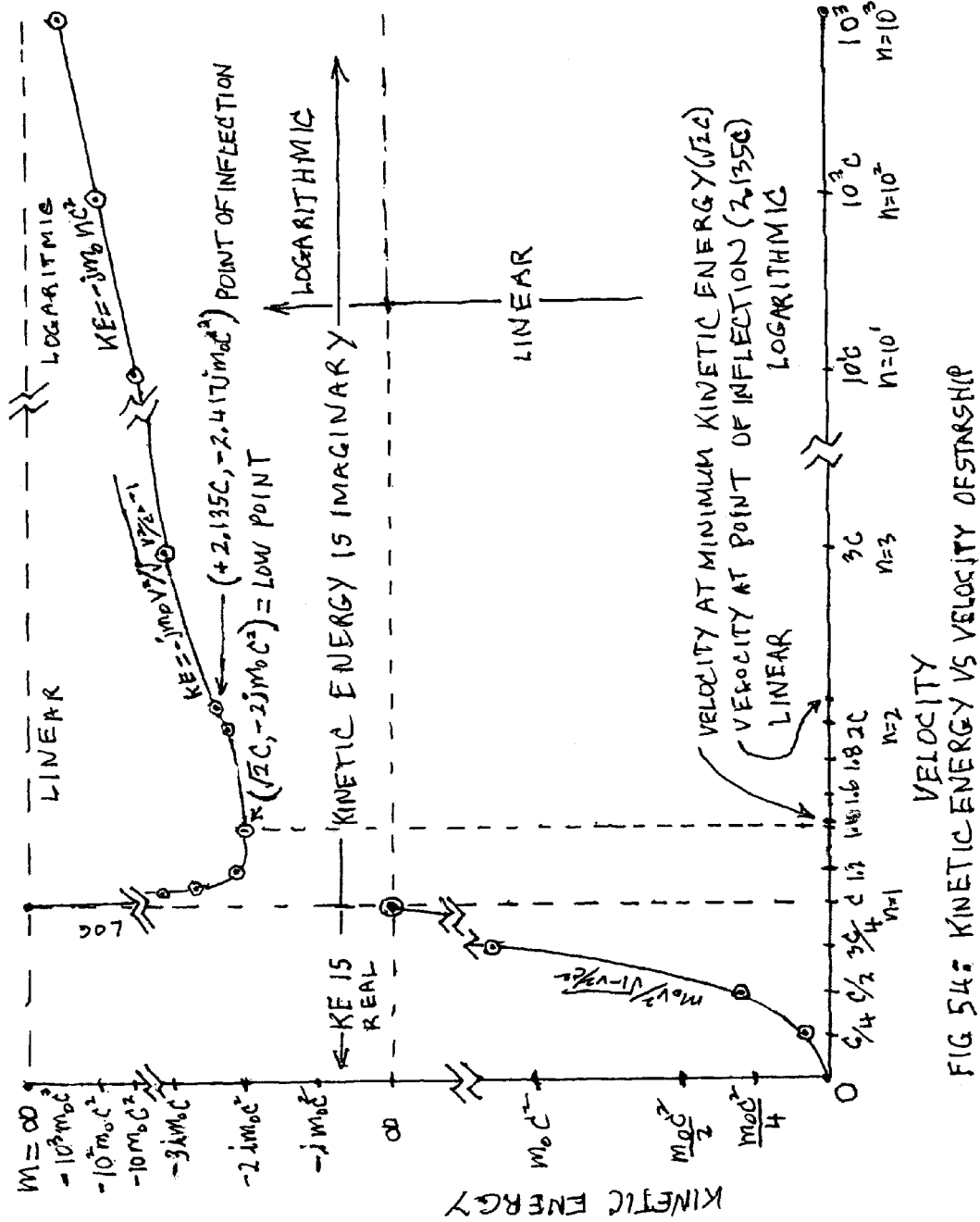
FIG 54: KINETIC ENERGY VS VELOCITY OF STARSHIP

INERTIAL PROPULSION DEVICE TO MOVE AN OBJECT UP AND DOWN

INTRODUCTION

This application is a Continuation-In-Part of a previous application Ser. No. 12/009,852 dated Jan. 22, 2008 now U.S. Pat. No. 7,900,874 originally titled "Inertial Propulsion Device", and later retitled "Device to Move an Object Back and Forth". It was Considered Ready for Issue on Jan. 12, 2001 and Dispatched to FDC on Feb. 9, 2011.

Inertial propulsion is a largely undeveloped field. Inertial propulsion is defined as propelling a vehicle without the use of a propellant such as rocket fuel or ions, or by the application of an obvious external force. In short, inertial propulsion is propellantless propulsion.

After consulting with prominent physicists, based on current definitions, the earth's gravity is definitely considered an external field (and force). If a one pound object is sitting on a table, the gravitational field causes it to exert a one pound force on the table and to keep the object from falling the table responds by exerting an equal and opposite upward directed force. Contemporary thinking is largely that because the gravitational field is by definition exactly perpendicular to the horizontal, it can not be used to cause an object to move horizontally. This has been true for all the approaches that have been tried in the past, but that does not prove it cannot be done. It just remains for someone creative enough to figure out how to do it, and this patent defines that unique process. Because different technical terms can mean different things to different people, a GLOSSARY is provided to define exactly the meaning of terms as used in this application.

The two processes referenced above employing precession are examples of converting the rotary motion of a spinning rotor into unidirectional linear motion.

Gravity causes the phenomenon of natural or free precession (precession not using a man-made forcing torque). There has been creditable evidence that a spinning precessing rotor has a reduced level of inertia and angular momentum in the direction of precession while it is precessing, although it is difficult to measure and that process is currently not well understood or agreed upon. Consider a one-foot long axle with one end on a pivot point attached to a base and a spinning rotor on the other end. By removing a support at the rotor end of the axle and relying on gravity to precess or move the spinning mass 60°, for example, and then reinserting the support so that precession stops, the mass of the rotor will have moved a linear distance of exactly one foot (equilateral triangle). The mass will have moved this distance of one foot and it will have done so with a reduced level of inertia and angular momentum and hence with a reduced reaction against the pivot point and hence against the base. During precession the base will have moved only very slightly in the direction opposite that of the precession; for example one-half of an inch for a given table-top device. Then if precession is stopped and the spinning rotor is pushed or reset back to its original position while it exhibits full inertia and angular momentum, their will be a full reaction against the pivot point and hence against the base, and so the base will have moved a significant amount in a direction opposite to the reset direction, but in the same direction as the original precession. The net result will be that there is a net motion of, for example, 1 inch in this example, in the direction of precession, for each cycle of the precession and reset action.

The glossary contains the definition of many technical terms and acronyms associated with the subject of Inertial Propulsion. Different terms can mean different things to different people; however, the definitions given in this glossary apply to the meanings as used in this invention submission and especially in the Claims. Throughout this document the terms "housing" and "vehicle" and "carriage" have the same meaning and are used interchangeably.

The second form of inertial propulsion disclosed herein produces vertical motion and does not rely upon any internal or external familiar and convenient field except that of the all-pervasive aether. It relies upon a forcing torque to turn precession on and off to produce the states of low and high levels of inertia necessary to result in a net upward movement in the absence of a gravitational field. The form of inertial propulsion that produces vertical motion is referred to as Vertical Motion by Mass Transfer (VMT).

Inertial propulsion consists of two different levels of performance. The simpler forms of inertial propulsion produce only movement with a velocity limit that cannot be exceeded and is referred to as Horizontal Motion by Mass Transfer (HMT) and VMT. Although the simpler forms produce significant acceleration during the beginning of each cycle, they do not produce sustained acceleration (SA), and as such, are generally not suitable for propulsion to distant stars, although they may be suitable for interplanetary travel, in particular for unmanned vehicles, depending on the level of the development of the technology. However, VMT is clearly suitable for moving manned or unmanned vehicles in outer space applications where little or no significant gravitational fields exist, such as maneuvering near the Space Station, small planets, asteroids, comets, libration points, geostationary orbits, or in general, any orbit where the centrifugal force cancels the gravitational force, and for spacecraft attitude control[7].

The more desirable form of inertial propulsion has a higher level of performance and produces sustained acceleration (SA). The essence of this invention deals with sustained acceleration only in a limited sense. Full details relating to sustained acceleration will be disclosed after further research has been completed and a model has been built that can satisfactorily and repeatedly demonstrate sustained acceleration.

It is a scientific fact that the inertia of a rotating body is proportional to its mass and an accepted theory that it is an instantaneous function of all the rest of the mass in the whole universe[8,9] via the medium of the aether (also called the universal lattice or universal reference frame). It follows directly that an accelerating mass has an interaction with all of the rest of the mass in the aether[10]. Rotation of a body involves centripetal acceleration, which is a subset of more generalized acceleration. In the specific instances of the devices disclosed in this invention, the accelerating mass is a spinning precessing mass having a reduced level of inertia in the direction of precession, depending on its construction. Since the inertia of a body is a function of its interaction with the aether, the reduction of the inertia of a spinning precessing mass in the direction of precession is also a function of its interaction with the aether. The exact reason for the reduced magnitude of inertia and angular momentum during precession and a calculation of the magnitude of its reduction is not well understood or agreed upon by many present day physicists. The inventor has derived his own formula for the reduced inertia and angular momentum as shown in later paragraphs.

The essence of the two processes for inertial propulsion disclosed herein is that a spinning mass has a reduced value of inertia while it is precessing in one direction and full inertia while it is not precessing, but is being pushed or propelled back in the opposite direction to its starting point. While it is precessing with a reduced level of inertia, its center of mass is moving in an absolute reference frame in one direction while the vehicle that contains it will be moving with a lower velocity in the opposite direction. But when the spinning mass stops precessing and has full inertia and is driven back to its reference position within its vehicle, forcing it back has a full reaction on the enclosing vehicle that moves the enclosing vehicle by an amount related to the ratio of the mass of the spinning rotor (while not precessing) to the mass of the rest of the complete vehicle assembly. One cycle of this propulsion consists of precessing forward with a reduced level of inertia and then resetting the spinning mass back to its reference position with full inertia resulting in a net movement forward. The cycle is then repeated continuously for further net movement forward.

Because of the difficulty of being issued a patent on a device that some scientific minds think violate some basic principles of science, the title and claims of this invention do not refer to propulsion, but simply to the structure of a device that moves an object back and forth for an HMT device and up or down for a VMT device. In reality, if the device will move an object more in one direction than the other (back and forth for an HMT device and up or down for a VMT device), then the device will indeed have a net movement in one direction and will represent one form of Class I inertial propulsion.

BACKGROUND OF THE INVENTION

For almost a century there have been close to a hundred patents issued that claim to produce inertial propulsion, usually in the form of converting rotary motion to unidirectional linear motion. NASA funded a program titled "Breakthrough Propulsion Physics" (BPP) from 1996 to 2002. It was a very successful program in that it provided an opportunity for anyone who believed they had a propulsion breakthrough to present their concept. Its goal was to seek the ultimate solutions to the following three main problems: no propellant required, speeds approaching that of light, and a source of energy to power any such devices (for example, zero-point energy). Terms like "Space drives," "Warp drives," and "Wormholes" are now being used routinely and are written about regularly in reputable scientific journals providing a very healthy atmosphere for creative breakthroughs, thanks to the BPP project.

The BPP Project was a success in that it produced 14 peer-reviewed articles. The project was terminated in 2002 due primarily to a lack of funding, but also due to the realization that out of thousands of submissions, nobody had submitted an idea that appeared to work. Many of the submissions to the BPP Project involved concepts that were already known to not work. Most of the concepts were divided into three common categories: Oscillation Thrusters, Gyroscopic Antigravity, and Electrostatic Antigravity. A detailed analysis was given of at least one example in each of the three categories. The analysis would give a description of the device, then state why it looked like a breakthrough, give a reflexive objection as to why the device cannot work, a deeper assessment, a conclusion, and a "What If" in case someone actually figured out a way to make it work. As an example of an oscillation thruster, the "Dean Drive" described in U.S. Pat. Nos. 2,886,976[1] and 3,182,517[8] was given. As an example of a Gyroscopic Antigravity device, Dr. Eric Laithwaite's[4] work was mentioned. As an example of an electrostatic antigravity device, various Biefeld-Brown effect devices were mentioned, including Lifters, and Asymmetrical Capacitors.

An example of what appears, at first glance, to be propellantless propulsion, but in reality cannot move its center of gravity, is given by U.S. Pat. No. 5,280,864 and described in reference 8.1.

The first instance known to this inventor of a successful demonstration of movement of a device involving the use of gravity as an external force was made by Alexander Charles Jones on May 20, 1975. Alex Jones demonstrated successful inertial propulsion one cycle at a time to Dr. Eric R. Laithwaite. Alex Jones (now deceased) may be considered as the Father of Inertial Propulsion. A reenactment of this first demonstration may be observed by watching the British Broadcasting Company's video titled the "Heretics". Alex Jones' first patent application was in German and was titled, "Vortriebsvorrichtung" (Forward Thrust Device[6]), Patent # 23 41 245. The patent was filed on Aug. 16, 1973 and was issued on May 22, 1975. The principal inventor of this current Inertial Propulsion System (H. Fiala) translated the original Jones patent from German to English.

By far the most comprehensive patent to date on the subject of inertial propulsion is that by Dr. Eric Robert Laithwaite (also now deceased), U.S. Pat. No. 5,860,317 titled, "Propulsion System[4]", filed on May 5, 1995 and issued on Jan. 19, 1999.

The problem with existing space vehicle propulsion systems is that they require large amounts of highly explosive propellants, as can be recalled from the explosion of the Space Shuttle Challenger in 1986 and the explosion of very many rockets on the launch pad for both the United States and foreign countries. Rockets using solid or liquid propellants are clearly a brute force and very dangerous approach to manned space flights and space travel. Zero-point energy[9,10,12,13,14,15,16,17] is now recognized as existing even though man has not yet managed to successfully harness it. However, it is anticipated that within a few decades, assuming that zero-point energy will have been developed, combining a zero-point energy source with an inertial propulsion system will constitute a perfect marriage of the two technologies for future travel to the'planets and the stars.

Physics of Inertial Propulsion Employing Sustained Acceleration

Einstein's Special Theory of Relativity states that nothing can travel faster than the speed of light. All of the tests of the Theory of Relativity are subject to observations that are usually made by perceiving the results with radar or visually or with photosensitive devices. It is absolutely true that nothing can be observed to travel faster than the speed of light (FTL) because electromagnetic waves are the medium used to make the observations. If an object is traveling away from an observer at greater than the speed of light, its speed could never be measured using light originating at the observer or being emitted by or reflected off the object. If an object were traveling at greater than the speed of light, then according to Special Relativity its mass would be imaginary as shown by the following equations. Trying to measure an object traveling at a speed greater than that of light using some form of electromagnetic waves is like trying to measure the speed of a B1 bomber flying at Mach 3 (three times the speed of sound) using only sonar. It can't be done. According to Special Relativity, the mass m of an object; as a function of its velocity and the speed of light is:

$m = m_0/\sqrt{(1-v^2/c^2)}$ If the velocity exceeded the speed of light by an amount x, then $v = c+x,$ $m = m_0/\sqrt{(1-(c+x)^2/c^2)} = m_0/\sqrt{(1-(c^2+2cx+x^2)/c^2)}$ $m=m_0/\sqrt{(1-1-2x/c-x^2/c^2)}=m_0/\sqrt{(-2x/c-x^2/c^2)}=-jm_0/(2x/c+x^2/c^2)$ $m=-jm_0/\sqrt{(2x/c+x^2/c^2)}=-jm_0/\sqrt{((x/c)(2+x/c)}$ This result is the author's own theory. It is just as believable for the mass to become imaginary as it is for mass to turn infinitely large as its speed approaches that of light. This paragraph may generate some controversy. The author welcomes any physical proof to the contrary. If a light beam or a burst of electrons is split in two with each half going in opposite directions, what is the speed of one wavefront with respect to the other wavefront? It is 2c (twice the speed of light). Examine some one-way cases:

---

If the velocity were to equal the speed of light, then $m = m_0/\sqrt{(1 - v^2/c^2)} = m_0/\sqrt{(1 - 1/1)} = m_0/\sqrt{0} = \infty$
If the velocity were twice the speed of light, then $m = m_0/\sqrt{(1 - 4)} = m_0/\sqrt{(-3)}) = m_0/-1.732i = -.577jm_0$
At twice the speed of light, the mass is reduced to its original mass
If $v = \sqrt{2}$, then $m = m_0/\sqrt{(1 - 2)} = m_0/(\sqrt{(-1)}) = m_0/i = -jm_0$   $1/i = -I$   $1/j = -j$

---

At 1.414 times the speed of light, the mass is reduced to its original mass.

If the velocity were equal to ten times the speed of light, then $m=m_0/\sqrt{(1-100)}=m_0\sqrt{/(-99)}=-jm_0/(9.95)$ If the velocity were equal to 100 times the speed of light, then $m=m_0/\sqrt{(1-10000)}=m_0/(-9999)\approx-jm_0/(100)$ If the velocity were equal to 1000 times the speed of light, then $m=m_0/\sqrt{(1-10^6)}\approx-jm_0/(1000)$ If can be seen that if the velocity increases to n times the speed of light, the mass goes down by a factor of n where $n^2>>1$.

speed of light, for large n, the imaginary mass is equal to the original mass divided by n; that is the mass goes down significantly, being inversely proportional to its velocity. If the speed were 10,000 times the speed of light, the mass would go down to only one-ten thousand of the original mass. That should be extremely good news for warp drive technology. However, the bad news is that large n the kinetic energy (KE) goes up proportional to the velocity times $m_0 c^2$. Where have we seen the term $mc^2$ before? It is Einstein's equation for the energy contained in a mass m.

It is very interesting that after reaching the speed of light the kinetic energy drops down very sharply for very small increases in the speed. It then bottoms out to a value of $-2jm_0c^2$ at a speed of the square root of '2' ($\sqrt{2}$) times the speed of light (c). The expression for the kinetic energy for speeds above the speed of light is $KE_{v>c}=-jm_0v^2/\sqrt{(v^2/c^2-1)}$. Setting equal to zero the first derivative of the KE with respect to velocity will determine any points on the curve where the slope is zero. That will determine any maximums or minimums. To differentiate an expression of the form of that for the KE, use the formula $(du/dx)[u/y]=[ydu/dx-udy/dx]/y^2$. Let $u=v2$ and $y=\sqrt{(v^2/c^2-1)}$. Setting the first derivative of the

---

$m_{v<c} = m_0/\sqrt{(1 - v^2/c^2)} = m_0/\sqrt{(1 - n^2)}$   for $v < c$   $(n < 1)$
$m_{v=c} = \infty$   for $v = c$   $(n = 1)$
$m_{v>c} = m_0/\sqrt{(1 - v^2/c^2)} = m_0/\sqrt{(1 - n^2)} = -jm_0/\sqrt{(n^2 - 1)} \approx -jm_0/n$   for $v > c$   $(n > 1)$
$m = m_{v<c} + m_{v>c} = m_0/\sqrt{(1 - v^2/c^2)} - jm_0/\sqrt{(v^2/c^2 - 1)}$   (vector form of mass)

---

The preceding equation is a vector form of mass for ($0>v>c$). This is no different than the vector forms for voltage, current, and impedance. Whereas Z(impedance)=R(resistance)+jX(reactance), where jX is the imaginary component of the impedance, either capacitive reactance ($-jX$) or inductive reactance ($+jX$). For electrical engineering, the letter j is used to indicate the reactance (imaginary) component.

Kinetic Energy (KE) versus the velocity of the starship is the product of its mass times its velocity squared.

KE=0, the solution is $v=c\sqrt{2}$. This establishes the minimum value of the kinetic energy at $v=c\sqrt{2}$.

Since the KE has a low point at $v=\sqrt{2}$, the curve at that point is concave upward. Since the curve will have to reverse its curvature to become asymptotic at $v=\infty$, there will have to be a point of inflection at which the curve changes from concave upward to concave downward. The point of inflection can be obtained by taking the second derivative of the velocity and setting it equal to zero. The result is that the curve changes

---

$m = m_0/\sqrt{(1 - v^2/c^2)} = m_0/\sqrt{(1 - v^2/c^2)} = m_0/\sqrt{(1 - n^2)} = -jm_0/\sqrt{(n^2 - 1)} \approx -jm_0/n$   for $n^2 >> 1$
$KE = mv^2 = m_0 v^2/\sqrt{(1 - v^2/c^2)} = m_0 n^2c^2/\sqrt{(1 - n^2)} = -jm_0 n^2c^2/\sqrt{(n^2 - 1)} \approx -jm_0 n^2c^2/\sqrt{(n^2 - 1)}) \approx -jm_0 n^2c^2/n$
$KE \approx -jm_0 n^2c^2/n \approx -jm_0 nc^2 \approx -jm_0 (v/c)c^2 \approx -jm_0 vc$   for $n^2 >> 1$

---

Summarizing the expressions for kinetic energy below, at, and above the speed of light, from concave upward to concave downward at v=2.135c. A study of the kinetic energy curve should provide warp drive

---

$KE_{v<c} = m_0 v^2/\sqrt{(1 - v^2/c^2)} = m_0 v^2/\sqrt{(1 - n^2)}$   for $v < c$   $(n < 1)$
$KE_{v=c} = \infty$   for $v = c$   $(n = 1)$
$KE_{v>c} = m_0 v^2/\sqrt{(1 - v^2/c^2)} = -jm_0 v^2/\sqrt{(v^2/c^2 - 1)} = m_0 v^2/\sqrt{(1 - n^2)} \approx -jnm_0 c^2$   for $v > c$   $(n > 1)$
$KE = KE_{v<c} + KE_{v>c} = m_0 v^2/\sqrt{(1 - v^2/c^2)} - jm_0 v^2/\sqrt{(v^2/c^2 - 1)}$   vector form of kinetic energy

---

This is Einstein's own theory in engineering terminology. At warp speeds, it can be seen that if the speed is n times the theorists and designers to attempt to jump directly from just below the speed of light to about 40% above the speed of light to avoid the problems encountered at the speed of light. One theoretical way to accomplish that is to change the point of reference from which the velocity of the starship is determined to a reference frame that is moving at about 45% of the speed of light in the direction of the starship travel. How to accomplish that is left as an exercise for the student.

I think the biggest bather to developing a warp drive is psychological, with the mistaken notion that the mass remains infinite after passing through the speed of light, but that is not true; it goes down inversely as the velocity increases. Maybe it is when a worm hole is entered and the speed increases beyond the speed of light, that mass diminishes and becomes imaginary. In electrical engineering, voltage, current, and impedance, all have an imaginary components, designated with a "j" ahead of their magnitude. In mathematics, the square root of a quantity may be designated by the familiar square root symbol, but is commonly referred to as a 'radical'.

The inventor believes the expressions for the kinetic energy of a starship ($-jnm_0c^2$) indicates very strongly that to achieve warp speeds, the energy has to be drawn directly from the vacuum or zero point energy as indicated by the $m_0c^2$ term. The stress-energy tensor of the aether mathematically defines each point in four-dimensional space-time[28]. It is linked to the mass and energy distribution of space and would include the zero-point energy at each point in space. To get to a higher velocity, the starship has to either use zero-point energy directly from the aether or collect enough interstellar hydrogen[29] with a hydrogen ramjet and convert it to pure energy according to the equation $e=mc^2$. Once a starship has a very high velocity, it can collect more interstellar hydrogen in a given amount of time. If it increases its speed by a factor of 100, it can collect 100 times as much hydrogen each second and that will allow it to increase its speed still further. It is an exponentially easier process to achieve increasingly greater speeds. The main problem is for the engineers and scientists to get serious about harnessing zero-point energy and heating hydrogen to a high enough temperature to fuse hydrogen into helium and release its excess thermonuclear energy. The astronomers need to map out all the nearest stars and estimate which one has the most hydrogen in the path from our solar system to it. Start the voyage with on-board hydrogen to get up to a high enough speed and then when that weight is shed, the mass will decrease and the acceleration will increase.

The ten nearest stars to our solar system are: Proxima Centauri at 4.2421 light years (LY), Alpha Centauri A and B at 4.3651 LY, Barnard's Star at 5.9630 LY, Wolf 359 at 7.7825 LY, Lelande 21185 at 8.2905. Sirius A and B at 8.5828 LY, Luyten A and B at 8.7280 LY, Ross 154 at 9.6813, Ross 248 at 10.322 LY, Epsilon Iridani at 10.522 LY, and Lacaille 9352 at 10.742 LY.

A Trip to Alpha Centauri A

Alpha Centauri A is the second closest star about 4.3 light years away from our Solar System and it is the nearest large star to the Earth. Assume for the sake of a trip to Alpha Centauri A that inertial propulsion providing sustained acceleration is possible, that a space ship can travel faster than the speed of light, that a constant thrust will result in a linear increase of velocity, and that energy for the trip can be obtained from the vacuum or zero point energy. These may be large assumptions, but you will see that they are worth exploring.

The following calculations do not take into account the possible increase of mass with velocity. Assume that a space ship can accelerate continuously at 1.0 g. The speed of light is $c=186,000$ mps and g is 32.2 ft/sec$^2$.

$V=\alpha t=c$ (speed of light), where V is the velocity, $\alpha$ is the rate of acceleration, t is time, and c is the speed of light. The time required to get to the speed of light is:
$t=c/\alpha=30.5$ ($10^6$) sec=8,472 hrs=353.0 days to get to the speed of light.

Let distance be represented by "S". To travel half-way to Alpha Centauri, $$S=\alpha t^2/2,$$

$$t^2=2S/\alpha=4,130\ (10^{12})\ \text{sec}^2$$

$t=64,300,000$ sec=744.3 days=2.04 years to get half way to Alpha Centauri. It would take another 2.04 years to decelerate to reach the star for a total one-way time of 4.08 years. At the midpoint of the trip to the star, the velocity would be maximum and would be:

$$V=\alpha t=2.07(10^9)\ \text{ft/sec}$$

In terms of the speed of light, at the midpoint,
$V=\alpha t=2.03$ c, about two times the speed of light.

The total round trip time equals 4.08 years going, 1.00 year in orbit around Alpha Centauri to make observations and collect data, and 4.08 years returning to earth for a total time of 9.16 years.

At an acceleration and deceleration rate of 2.00 g's instead of 1.00 g, the total round trip time would be 2.04+1.00+2.04=5.08 years.

This means that your wife and children would still be home waiting for you. Your children would be 5 years further along in their education.

It is the interpretation and understanding of the inventor that if a space ship had a mechanical (or electric or magnetic or gravitational or nuclear) inertial propulsion unit (IPU) that could sustain acceleration of the whole vehicle at 1 or 2 g's, after 176.5 days at 2 g's the space ship would pass through the speed of light. It is not a matter of its speed being tracked from the Earth, but rather a simple matter of checking the accelerometer to insure that 2 g's of acceleration is maintained and after 176.5 days the space ship will be at the speed of light. Use a fish scale calibrated in pounds and set the acceleration controls so that a one pound mass weighs two pounds and use a wrist watch to tell when 176.5 days are up and you will be at the speed of light, barring any special relativity effects.

As the speed of light is approached, there may not (in the author's opinion) be a physical barrier such as the sound barrier to contend with (unless the aether "wind" has some surprises for us, which it probably will). The mass of the astronauts and their ship will not have become infinite but will reduce as the speed of light is exceeded. At approximately 353 days, the space ship will be traveling at twice the speed of light. At 372.2 days the space ship would be half way and would begin to decelerate at 2 g's.

The point is that if sustained acceleration can be achieved without a propellant, there will be no need to worry about the ability to travel at or greater than the speed of light. Don't create a problem where none may exist. The author cannot prove that this is the case, but he would be disappointed if someone were able to prove him wrong.

Hopefully by the time that sustained acceleration is developed, so too will zero-point energy be developed as a source for power. This would be a perfect marriage of the two technologies.

Examples of Sustained Accelerations Using Known Technology

Rocket Engines with solid or liquid fuel: A brute force and potentially explosive technique. It is a very short term sustained acceleration dropping to zero when the fuel is exhausted. As the fuel is used, the mass decreases and the acceleration increases. It can produce large accelerations based on current technology.

Ion and Plasma engines: RTG powered ion engines have been used many times. The thrust is small, but the thrust can be maintained for years. The ion engines can also be powered with solar energy. Plasma engines can develop considerably more thrust by heating hydrogen gas to a million degrees and ejecting out the end of the rocket and can produce sustained thrust until the supply of hydrogen is exhausted.

Solar Sail: Would require very large sails to produce very small accelerations, but the thrust can be sustained as long as light of sufficient magnitude from one or more stars is available. Beam power from banks of lasers, such as based on the moon, could beam high energy laser beams to push the solar sail.

Ramjet Engines: Atmospheric ramjet engines use oxygen from the atmosphere instead of carrying on-board oxygen. Short duration tests have reached velocities up to mach 15. Ramjets using fusion of hydrogen are still a thing of the future[29].

Applications of Gravity
Dams for power generation
Pendulum to determine time—Grandfather's clock
Foucault pendulum to demonstrate rotation of the Earth on its axis
Gravity creates vortices—flushing a toilet, whirlpools in the water draining through a culvert
Gravity gradiometer
Mass gradient sensor
Holding satellites in orbit by balancing out centrifugal force
Measuring the charge on an electron (Milliken oil drop experiment)
42 minute gravity propelled trip through a straight line hole from any point on Earth to any other point.
Establishing a local vertical
Establishing a geopotential surface as in a lake
Utilization of Lagrangian points
Converting gravitational potential energy by coasting downhill to start a vehicle engine
Horizontal Motion by Mass Transfer (HMT) requiring a gravitational field

OBJECT AND SUMMARY OF THE INVENTION

A principle object of the present invention is to provide for the first time a viable process of inertial propulsion and to slowly do away with brute force rockets with their highly explosive propellants. The principles disclosed herein may be used for many velocity limited applications including station keeping for space applications; movement of payloads near the Space Station, small planets, asteroids, comets, libration points, geostationary orbits, and in general, any orbit where the centrifugal force cancels the gravitational force, and the local acceleration in the orbital plane is zero.

The embodiment employing the use of a gravitational field represents man's first real and practical exploitation of a gravitational field on earth to accomplish motion in a direction perpendicular to the gravity field. If as much development was put into optimizing an inertial propulsion engine as has been put into automobiles, a "Lamborghini" type of car could be built that might theoretically do zero to 40 mph in less than one second. Such a Lamborghini employing inertial propulsion would have four wheels, but no engine or transmission or differential or gear trains or heavy duty brakes leading to them. The wheels would be used strictly for holding the vehicle off the ground with the front wheels also used for steering.

The terms Inertial Propulsion Unit (IPU) and Inertial Propulsion Device (IPD) are interchangeable, although the term Unit usually has a broader meaning, while the term Device usually refers more to a specific device.

When multiple IPDs are operated in parallel and properly phased, approximately uniform motion can be realized. Each individual IPD, were it the only one, will start and stop during each cycle, but continuous movement is developed by the combination of multiple devices in an assembly. Whatever variations in velocity would exist can be smoothed out with springs and shock absorbers. But because each individual IPD can stop each cycle (were it not for the other devices operating in association with it), when it is required that the vehicle as a whole come to a full stop, this can be done in a single cycle, or a maximum of the number of cycles over which the velocity variations are smoothed out, analogous to a multi-stage electronic filter for reducing voltage ripple. Such a vehicle could literally stop in a distance equal to a few of its overall lengths. On the ground, it could perform all of the maneuvers that have been attributed to airborne UFOs, such as turning square or sharp corners and sudden stopping or acceleration. These maneuvers are all attributes of a vehicle employing the simpler form of Class I inertial propulsion (MMT) described earlier.

The devices employing the earth's gravitational field can be constructed so simply that inertial propulsion toys are an absolute certainty. A small inertial propulsion toy radio controlled car that moves but does not have drive power to its wheels could easily sell for under $25 to $50 depending on its quality. Amusement park rides could use inertial propulsion. The rides could stop essentially instantaneously during an emergency. Proper seat belt restraints would be required. Merry-go-rounds, Ferris wheels, and all carousel type rides are examples that could use inertial propulsion.

Aircraft in level flight could use inertial propulsion to save on fuel costs to the extent that generating electrical energy for inertial propulsion would be more efficient than developing thrust using jet engines. Because objects have their normal weight during normal flight, MMT could be used to increase the flight speed, during normal flight and reduce the speed during landing. This would be helpful for takeoffs and landings on short runways and to reduce noise to below legal limits during takeoffs and landings where this is critical (for example, the John Wayne Airport in Orange County, California). Dirigibles could be powered by MMT. Submarines could move in total silence with no external moving parts.

An MMT device could propel a glider using only solar power and batteries. No propellant or fuel would be required. The most efficient glider has a glide ratio of over 70:1. A Boeing 767 has a glide ratio of about 12:1. The Space Shuttle has a glide ratio of about 3:1. A glider or aircraft using MMT would use a small part of its forward velocity to develop lift to help overcome the glide ratio while most of its velocity would contribute to the aircraft forward velocity.

The use of inertial propulsion units will generate completely new industries and employment opportunities, and as soon as sustained acceleration (SA) is developed, travel to the stars can be realized.

The nearest major star to the earth is Alpha Centauri. At an acceleration of only two g's, a round trip to Alpha Centauri, even allowing one year in orbit around the star for observations, could be completed in approximately five years. Upon returning, an astronaut's spouse and children would still be alive and waiting for him/her.

HMMT stands for Horizontal Motion by Mass Transfer and will frequently be abbreviated to simply HMT. VMMT stands for Vertical Motion by Mass Transfer and will frequently be abbreviated to simply VMT. An MMT device can be either HMT or VMT. HMT and VMT devices are Class I inertial propulsion systems.

Another object of this invention is to provide enough detail and examples so that the applications can serve as a primer or tutorial on the principles and development of inertial propulsion systems.

Satellite Station-Keeping

For satellite station-keeping, a special space-qualified VMT IPD could be designed using magnetic bearings for the rotors and make the design completely free of any wear on the moving parts. A space qualified VMT IPD could probably be developed for less than the cost of conventional station-keeping hardware.

Maneuvering in Orbit: Space Station, maintenance or service vehicle, orbital utility vehicles, Inertial Propulsion Tractor, deorbiting of failed or spent satellites, are examples of using VMT in Space applications.

Preferred Embodiments

Since inertial propulsion is a new field and there are so many possible configurations, many different configurations have been included in this application. For learning the principles involved, the preferred embodiments are those depicted in FIGS. 1, 20, 41, 48(a), and 52. For HMT the embodiment shown in FIG. 10(a), since all four rotors are driven by the same motor and automatically have the same angular velocity, eliminates any rotor speed control problems. For the sake of simplicity, for VMT the preferred embodiments are those shown in FIGS. 22 and 24, insofar as all torques about the vertical axis are cancelled out. Where multiple rotors require multiple motors, digital stepping motors can be used to maintain exact synchronism between rotors.

LIST OF DRAWINGS

There are many drawings in this application. The drawings cover both HMT and VMT Class I inertial propulsion devices because they are both precession based and to show one and not the other would take the one out of its inertial propulsion context. Each figure or embodiment is not intended to be separately patentable. Rather, most figures show a slight variation from the simplest or a preceding configuration to a slightly different configuration that adds a feature which can result in improved efficiency, performance, lighter weight, greater "horsepower", lower profile, or smaller size. This application includes a glossary and the application as a whole can serve as a primer or textbook for a course on inertial propulsion.

FIG. 1: Simplest One-Rotor HMT IPD
FIG. 2(a): Alternate One-Rotor HMT Embodiment with Traction Ring Outside Rotor
FIG. 2(b): Alternate HMT Embodiment with V-Groove Traction Ring
FIG. 3: Two Deck, Two Rotor HMT Embodiment
FIG. 4: Alternate HMT with Traction Ring Outside Rotor (adds safety ring to F2(a))
FIG. 5: Two One-Rotor HMT Decks Stacked (F3 with rotors inside traction ring)
FIG. 6: One Deck, Two HMT Rotors, Gear Box (two inline rotors)
FIG. 7: One Deck, Two HMT RPR, Gear Box (F6 with RPRs)
FIG. 8: One Deck, Two Rotors, Overhead Traction Ring (eliminate gears, wheels irrelevant)
FIG. 9: Four Rotors on One HMT Deck (F8 plus two more rotors)
FIG. 10(a): Four Rotors on One HMT Deck with Gear Drive (one motor, top view, wheels irrelevant)
FIG. 10(b): Four Rotors on One HMT Deck, Underside View
FIG. 11: Two Four-Rotors, Decks Stacke
FIG. 12: Solid Disk Rotor and Thin Rim Rotor Compared
FIG. 13(a): 60 Degree HMT IPD (early prototype)
FIG. 13(b): 60 Degree HMT IPD, Side View
FIG. 14: S-Curve HMT
FIG. 15: Velocity Waveform for One-Rotor HMT
FIG. 16: Velocity Waveforms for Two-Deck One-Rotor HMT
FIG. 17: Velocity Waveforms for Four HMT Rotors on One Deck
FIG. 18: Velocity Waveform for Four HMT RPRs each 90 Degrees Apart
FIG. 19: Velocity Waveforms for 60 Degree HMT
FIG. 20: Simplest Two-Rotor VMT IPD (two rotors)
FIG. 21: Four Rotors on one VMT Deck (four rotors)
FIG. 22: Two Two-Rotor VMT Decks Stacked (two F20 stacked)
FIG. 23: Four RPR VMTs on One Deck (F23 plus RPRs)
FIG. 24: One Stack of Two Four-Rotor VMT Decks (Fiala Vertical Space Drive-FVSD), two F21 (stacked)
FIG. 25: Two Stacks of Two Decks, Each Deck with Four Rotors (two F24 side by side)
FIG. 26: Four Separate Decks, each with Two Rotors (four F20 side by side)
FIG. 27: Four Separate Decks, each with Four Rotors (four F21 side by side)
FIG. 28: Four Separate Stacks, each with Two Decks, each with Four Rotors (four F25 side by side)
FIG. 29: Basic Precess-Reset Cycle for VMT IPD
FIG. 30: Precess-Reset Cycle Waveforms for VMT
FIG. 31: Waveforms for VMT IPDs
FIG. 32: Vehicle Vertical Velocity for FIGS. 20, 23, and 24.
FIG. 33: Rotor Angular Position for FIGS. 22 and 25.
FIG. 34: Various Velocity Waveforms
FIG. 35(a): Special Two Yoke Common Pivot Point Design
FIG. 35(b): Special Four Yoke Common Pivot Point Design
FIG. 36: Using VMT Devices for Horizontal Motion (horizontal—F21, 90 degrees)
FIG. 37: Forcing Torque Increases with Time to Produce Acceleration
FIG. 38: Shaped Reset Pulse for Constant Velocity VMT
FIG. 39: Electronic Analog to Inertial Propulsion Unit
FIG. 40: Nano-IPD with Eight Nano-Rotors (horizontal—like F23 using nano-rotors)
FIG. 41: shows a two rotor HMT IPD based on the configuration of FIG. 52.
FIG. 42: Simplest Two-Rotor, Four Deck VMT IPD with Torque Compensation (four F20 stacked)
FIG. 43: Simplest Four-Rotor, Four Deck VMT IPD with Torque Compensation (four F21 stacked)
FIG. 44: Stack of Four VMT IPDs of FIG. 24 for Torque Compensation (four F24 stacked)
FIG. 45: Rotor Inside the Control Rings (F2(a) rotor inside fraction ring)
FIG. 46: Self-Leveling HMT IPD
FIG. 47: Single Rotor HMT, Motor near Rotor
FIG. 48A: Single Rotor HMT, Motor near Center (Fiala Gravity Drive-FGD)
FIG. 48B: Single Rotor HMT, Motor at Center (Fiala Gravity Drive-FGD)
FIG. 49: Cone Rotor Inside Control Rings FIG. 50: Flying Saucer Using an HMT IPD
FIG. 51: Control Ring
FIG. 52: Preferred HMT Prototype
FIG. 53: Mass vs Velocity of Starship
FIG. 54: Kinetic Energy vs Velocity of Starship

BRIEF DESCRIPTION OF THE DRAWINGS

FIGS. 1 through 8, and 45 through 51, all refer to HMT (Horizontal Motion by Mass Transfer) devices while FIGS. 20 through 40, and 42 through 44, all refer to VMT (Vertical Motion by Mass Transfer) devices.

FIGS. 1 and 45 are drawings of the simplest inertial propulsion devices conceived by the inventor. They may be referred to as single deck configurations that contain only one moving part consisting of a rotor, an axle, and the rotor and gimbal of an electrical motor. Other parts include a traction ring, a support ring, and the supporting carriage.

FIG. 2(*a*) is similar to FIG. 1 except that traction ring 5 is on the outside of the rotor instead of just inside it. Instead of a traction wheel disk with a larger diameter disk keyed to the end of the axle, the round traction surface is simply an extension of the rotor axle with a diameter suitably chosen, reduced or enlarged, for the desired precession angular velocity. For simplicity of design and construction, the rotor speed can be chosen so that the traction axle diameter is equal to the rotor spin axle diameter.

FIG. 2(*a*) is similar to FIG. 1 except that the traction wheel rides on a traction ring on the outside of the rotor and it uses safety plate 115 in case the rotor fell out of precession.

FIG. 2(*b*) is an alternate to FIG. 2(*a*) in that the safety plate is replaced by a safety ring. The safety ring is a full 360 degrees as a matter of drawing convenience instead of being only from 180 to 360 degrees during which precession occurs. In addition, traction axle 116 is replaced by traction wheel 196 and traction ring 105 is replaced by V-groove traction ring 197. Also, FIG. 2(*b*) shows a base with wheels and hydraulic shock absorbers to smooth out velocity variations.

FIG. 3 consists of two one-rotor decks like the one in FIG. 1 that are stacked one on top of the other and 180 degrees out of phase so that one of the two decks is always providing forward motion. In the upper deck, the support ring and the traction ring are inverted from their configuration in FIG. 1 and the rotor axle rides on the underside of the traction ring FIG. 4 is similar to FIG. 2(*a*) except that safety ring 129 takes the place of safety plate 115.

FIG. 5 is two one-rotor decks like the one in FIG. 2(*a*) that are stacked one on top of the other and 180 degrees out of phase so that one of the two decks is always providing forward motion.

FIG. 6 is an embodiment using a gear box to enable the traction function to be performed on the same side of the pivot point as the rotor, thus allowing two rotors to be 180 degrees apart and gimbaled about the same pivot point. The gearbox also allows the proper ratio of precessional angular velocity to rotor spin angular velocity to be more easily implemented.

FIG. 7 is an alternate embodiment of FIG. 6 that uses Rolling Pin Rotors (RPRs) instead of conventional disk shaped rotors. An RPR may be thought of as simply a small diameter rotor with a very large width. An RPR can attain a higher velocity than a conventional solid disk rotor and if it has the same mass, it will also have the same "horsepower".

FIG. 8 is an embodiment that allows two HMT rotors to be gimbaled off a common pivot point on a single deck. Each rotor has its own motor.

FIG. 10 is an embodiment of FIG. 9 that uses a single motor and bevel gears to drive all four rotors at exactly the same frequency. This overcomes a motor speed control problem associated with keeping all four rotors of the device of FIG. 9 at the same speed. FIG. 10(*a*) is a perspective view from above while (b) is a perspective view from below.

FIG. 12(*a*) shows a solid disk rotor while (b) shows a thin-rim rotor.

FIG. 13(*a*) shows a front view perspective while (b) shows a side view perspective.

FIG. 14 is a drawing of the motion of a theoretical rotor and axle that moves in one direction in a path that follows an "S" curve. It is possible but not practical to build such a device. The purpose of this figure is to show that mass can be moved stopped and started substantially without the expenditure of work FIG. 15 shows the velocity waveform for a single rotor, such as in FIG. 1.

FIG. 16 combined with FIG. 15 shows velocity waveforms for a two-deck device such as that shown in FIG. 3 with each deck having a single rotor, and the two rotors being mechanically (or geometrically) 180 degrees out of phase.

FIG. 17 combined with FIG. 16 shows the velocity waveforms for a single' deck with four HMT rotors on it, such as in FIGS. 9 and 10. Each rotor is geometrically 90 degrees apart from its neighbors. This is very important in contributing to smooth motion.

FIG. 18 shows the velocity waveforms for a single deck, four rotor, HMT IPD such as in FIG. 9 or 10, except that instead of having conventional disk rotors (solid or thin rim) it has four RPR (Rolling Pin Rotors) (RPRs not shown in the figures referenced on the drawing). The RPRs can produce a higher velocity with the same "horsepower" for the same overall rotor mass.

FIG. 19 shows the forward velocity for the 60 degree HMT IPD of FIG. 12. It is the least desirable of all embodiments due to sudden reversals of direction and lateral reactions, but it was the first HMT device to successfully demonstrate net forward motion.

FIG. 29 shows the basic mechanical IPD cycle for VMT.

FIG. 30 shows the precess-reset cycle waveforms for VMT.

FIG. 31 shows (a) the rotor angular acceleration, (b) the rotor angular velocity, and (c) the rotor vertical velocity waveforms for individual VMT rotors such as in FIG. 20.

FIG. 32 shows the vehicle vertical velocity waveform for the VMT IPD of FIG. 20.

FIG. 33 shows the rotor angular position for the VMT IPD of FIG. 20.

FIG. 34(a) shows the forward velocity versus angular position for the individual rotors of the VMT IPDs described in FIGS. 22, 24, and 25. FIG. 34(b) shows the combined velocity for the rotors of FIGS. 22, 24, and 25. FIG. 34(c) shows the combined velocity for two sets of rotors that are phased 90 degrees apart as in FIGS. 27 and 28.

FIG. 35(a) and(b) shows the design that allows two and four yokes respectively for rotors and axles to have a common pivot point that is directly in line and concentric with the spin axis.

FIG. 37 shows a block diagram that uses a forcing torque that increases with time to obtain vehicle acceleration.

FIG. 38 shows a block diagram for using shaped reset pulses to obtain constant velocity motion for vehicles with VMT IPDs.

FIG. 39 shows a block diagram for an electronic analog to a mechanical Inertial Propulsion Device.

FIG. 40 shows a simplified view of a VMT IPD that uses nano-tube rotors.

FIG. 45 shows a more desirable configuration with the rotor inside the control rings FIG. 46 shows how adding a special gimbal to the outside of the control ring allows the precessing rotor to always remain level by virtue of the fact that gravitationally induced precession can only be in a horizontal plane. Since the HMT shown in this figure is the motive force that moves the vehicle, it is heavy duty and serves far more functions than simply establishing the gravitational horizontal.

FIG. 47 shows a different single rotor configuration with the motor near the rotor and not requiring a traction ring on the opposite side of the control ring.

FIG. 48A shows a different single rotor configuration with the motor near the center and not requiring a traction ring on the opposite side of the control ring. This embodiment has been termed the FGD (Fiala Gravity Drive).

FIG. 48B shows a different single rotor configuration with the motor near the center and not requiring a traction ring on the opposite side of the control ring. This embodiment has been termed the FGD (Fiala Gravity Drive).

FIG. 49 shows a hollow cone-shaped rotor inside of the control rings. A hollow cone-shaped rotor might be used in flying saucer applications. The cone shaped rotor is a form of a thin-rim having a higher quality factor and hence will result in a higher velocity.

FIG. 50 shows a flying saucer configuration using an HMT cone-shaped rotor inside of the control rings.

FIG. 51 shows the Control Ring which is comprised of a traction ring and a support ring.

FIG. 52 shows a preferred HMT prototype configuration. It is the simplest configuration. It may be considered as an inertial propulsion device with only one moving part. The motor rotor is part of the active mass. The traction ring and the support ring are combined into a single ring that is tilted at approximately one degree up from the horizontal at the trailing edge of the vehicle. As the rotor comes to the highest part of the ring it will begin to process until it reaches the lowest part of the ring at which point it would touch the ring and begin the traction process. In order to insure that the traction begins at the lowest point on the ring, the angle, which is nominally one degree above the horizontal at the highest point on the ring, will have to be adjusted. To insure that precession begins at the highest part of the ring, a slight recess may be included in the top part of the ring (zero degrees, also 360 degrees). To insure that traction begins at the lowest part of the ring, a slight ramp for five degrees or so might be added to the top part of the ring at its lowest point (180 degrees).

FIG. 53 shows how the mass of a starship increases as the velocity approaches the speed of light and then decreases inversely as the velocity for v>>c, but becomes imaginary at speeds above the speed of light.

FIG. 54 is a lot like FIG. 53 except that instead of showing how the mass varies as the velocity increases, it shows the kinetic energy of the spaceship increasing as its velocity increases above 1.414 times the speed of light.

DETAILED DESCRIPTION OF THE INVENTION

None of the parts on the drawings contained herein are to a scale or proportion that represents an operational device, but are intended only to clearly convey the concepts and principles involved. For the sake of Clarity, some structural members are not shown. Also, mechanical and electrical controls are not shown. For example, digital stepping motors would normally be used to keep individual rotors synchronized. Those skilled in the art of structures and controls will realize how the elements that are not shown would be implemented. Figures are numbered consecutively beginning with 1 and the parts within the figures are numbered consecutively beginning with number 101.

Figure 1:
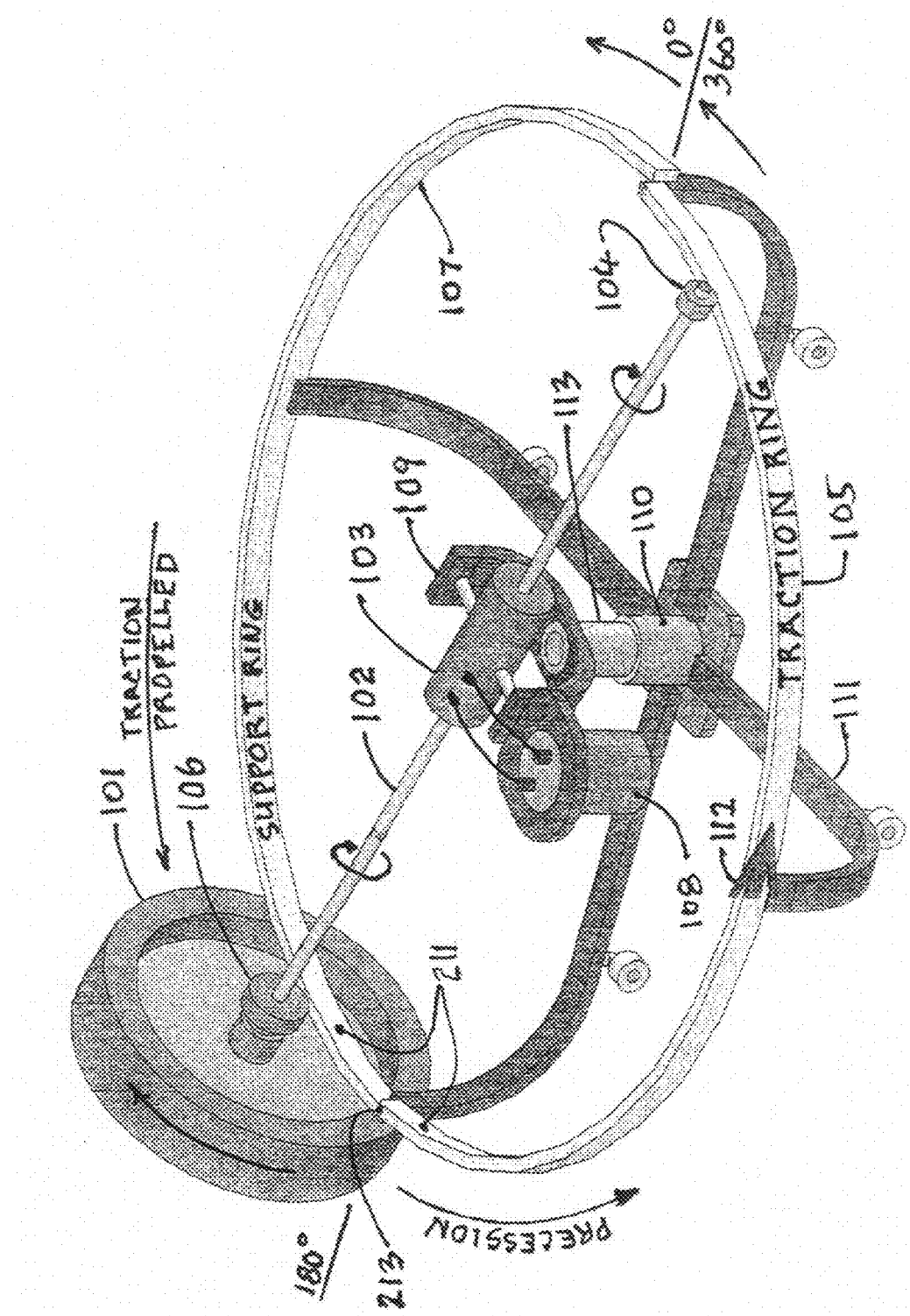

Referring to the drawings and the characters of reference found thereon, FIG. 1 is a drawing of one of the simplest form of inertial propulsion that the inventor has been able to conceive of and it contains only one moving part. It will provide motion, but not force or sustained acceleration (SA). Rotor 101 contains most of its mass in a thin rim with a thin center disk (acting as spokes) and an inner hub. As will be explained later on in this patent application, a disk with most of its mass in a thin outer rim (high quality) is more efficient for inertial propulsion purposes than a solid disk of the same mass with a constant width. Axle 102 comes out of both ends of electrical motor 103 with rotor 101 on one end and traction wheel 104 on the other end. The traction wheel is keyed to the axle and turns with it and propels the axle and the rotor in a CCW (counter-clockwise) direction when it is in contact with traction ring 105. Axle bearing 106 rides CCW on support ring 107 from 0 to 180 degrees. Axle 102 turns inside of axle bearing 106 with very little friction. When traction wheel 104 passes 360 degrees in the horizontal plane (which is the same as 0 degrees), it will not be in contact with the traction ring 105 or the support ring 107 (it lies inside support ring 107) and axle bearing 106 will no longer be riding on support ring 107 and will be outside of support ring 105. Under these conditions, rotor 101 will no longer be supported at either end of its axle and will begin or resume precession in a CCW direction from 180 degrees to 360 (or 0) degrees. When the rotor passes from being propelled to precessing, it will drop very slightly in angle, of the order of a degree or so, depending on the quality of the rotor. The top surface of traction ring 105 is higher than the top surface of support ring 107 by a small amount that will allow the rotor to drop very slightly during each cycle when resuming precession and to allow the rotor axle to be completely unsupported at each end to allow normal precession. The leading edge of the traction ring at 180 degrees is rounded with fillet 213 so as to allow a smooth transition for traction wheel 104 from precession to being propelled. Rotating traction wheel 104 will easily climb up the very small distance of the curved fillet at the beginning of the traction ring.

Figure 5:
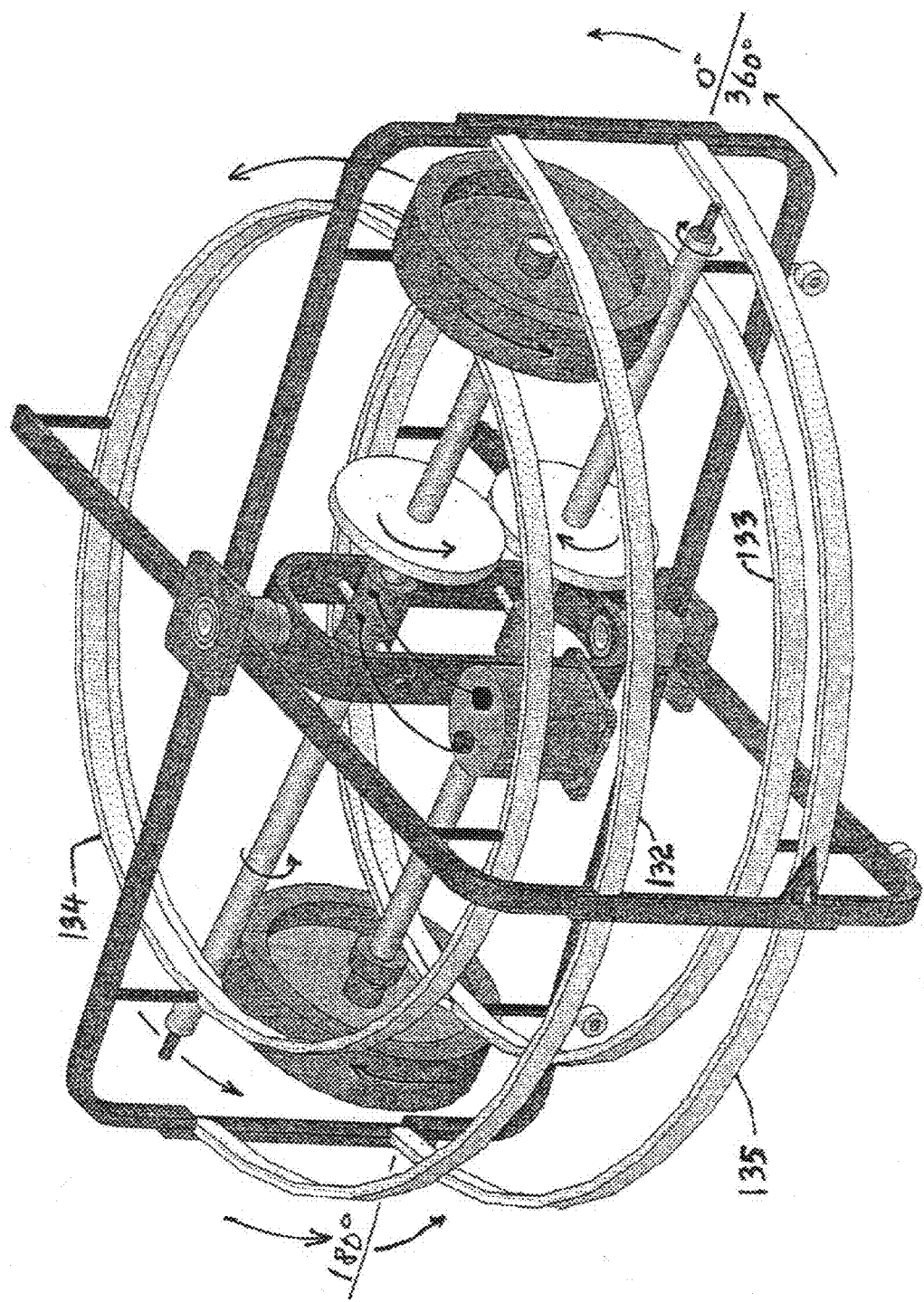

The outer surface of traction wheel 104 and the top of traction ring 105 have high coefficients of friction so that good traction will take place. During traction from 180 to 360 degrees, axle 102 is normally exactly horizontal. The height of gimbal 109 with its pivot points is fixed in elevation with respect to the chassis or carriage. The diameter of axle bearing 106 is just large enough to hold the rotor end of the axle high enough to apply, through the pivot point, downward pressure on traction wheel 104 to enable it to have the required level of traction. This results in the axle bearing 106 being approximately 0.002 inches larger in diameter than would allow the traction wheel 104 to just touch traction ring 105. When two units identical to that in FIG. 1 (as shown in FIG. 5) are stacked on top of each other and are connected to the same central column 113 but 180 degrees apart in phase, each unit will help the other to maintain a constant angular velocity. The unit that is precessing will help the other unit to maintain the proper angular velocity in traction.

If the circumference of traction ring 105 were 100 times the circumference of traction wheel 104, then every 100 rotations of the rotor axle would result in one full CCW rotation of axle 102 in the horizontal plane. The ratio of the diameter of traction ring 105 to the diameter of traction wheel 104 is set equal to the ratio of the spin angular velocity of the rotor to the precession angular velocity of the rotor, so that the precession angular velocity and the propelled angular velocity are equal. Battery 108 is used to power DC motor 103 and the voltage applied to the motor controls its rotational angular velocity. The voltage to the motor is the final adjustment to set the precession angular velocity of the rotor as it precesses from 180 to 360 degrees equal to the angular velocity at which the rotor is propelled from 0 to 180 degrees. As will be derived later on in this patent application, the diameter of the rotor axle is inversely proportional to the square of the rotor spin angular velocity and so it will be relatively easy to match the precession angular velocity to the angular velocity at which the rotor is propelled from 0 to 180 degrees.

Gimbal 109 allows the motor with its axle to be free to move up or down a maximum of about 5 degrees. Bearing 110 allows the rotor-motor-axle-gimbal assembly to rotate 360 degrees in the horizontal plane. Carriage (or Housing) 111 with wheels and structural members through bearing 110 supports the whole assembly including traction ring 105, support ring 107, and central column 113 through the central column bushing 110, and allows motion in the forward direction as indicated by arrow 112.

When rotor 101 is precessing CCW from 180 degrees to 360 degrees (360 degrees is equal to 0 degrees), based upon how much of its mass is in its rim, it loses up to approximately 80% of its inertia, so that the normal reaction against the housing is reduced by up to 80%. Assume for the purpose of this explanation that the mass of the rotor (the active mass) is exactly equal to the mass of the rest of the complete assembly (passive mass). When the rotor is being propelled from 0 to 180 degrees, it is not precessing and hence does not lose any of its inertia. Therefore the reaction against the housing is not reduced at all. The result is that during precession the mass of the rotor moves forward by what we will call 5 units while the rest of the assembly moves backward by 1 unit as a reaction to the rotor precessing forward. The net result of the 180 degrees of forward precession and the 180 degrees of being propelled backward is that the center of mass of the complete assembly moves forward 2 units. While the rotor is being propelled (backward) from 0 to 180 degrees, it elicits a full reaction from the rest of the assembly and while it moves backward 5 units the rest of the assembly moves forward 5 units (during the backward propelled movement, the center of mass of the complete assembly does not and cannot move). The net result is that after 180 degrees of CCW precession and another 180 degrees of being propelled back to what will be called the starting point (one full cycle), the complete assembly has moved forward 2 units. This type of motion is termed Motion by Mass Transfer or MMT. For Horizontal motion it is termed HMMT and may be abbreviated to HMT. If the motion were Vertical, it would be termed VMMT and may be abbreviated to VMT. VMT will be covered later on in this application. The device in FIG. 1 is an Inertial Propulsion Device and may be termed an IPD.

Reversing the direction of motion is possible by simply reversing the control voltage to motor 103. Rotor 101 will then precess in the opposite or CW direction. For this reason, the leading edge of the traction ring 105 would also need a rounded leading edges to insure a smooth transition at the end of each precession. Fillet 213 is shown on the leading edge of traction ring 105 (at 180 degrees). Control ring 211 is shown as connecting the support ring and the traction ring, although the two rings are not shown as two different surfaces of a single ring. However, when both the support ring and the traction ring are integrated into a single ring, the ring is termed a control ring. For example, both the support ring and the traction ring are shown together as control ring 214 on FIGS. 8, 9, 10(a), 11, and 45.

Normally the Mass Moment of Inertia for the motors and axles in FIGS. 1-5 can be ignored relative to that for the rotor because of their relatively small size. Their effect would only show up in the third or fourth decimal place. However to the extent that the motor and axle are centered about the pivot point, their Mass Moment of Inertia is exactly zero because each half cancels out the other half. The same is true for the motors that are gimbaled at their centers of mass. This is an ideal condition for those types of HMT designs.

Figure 2A:
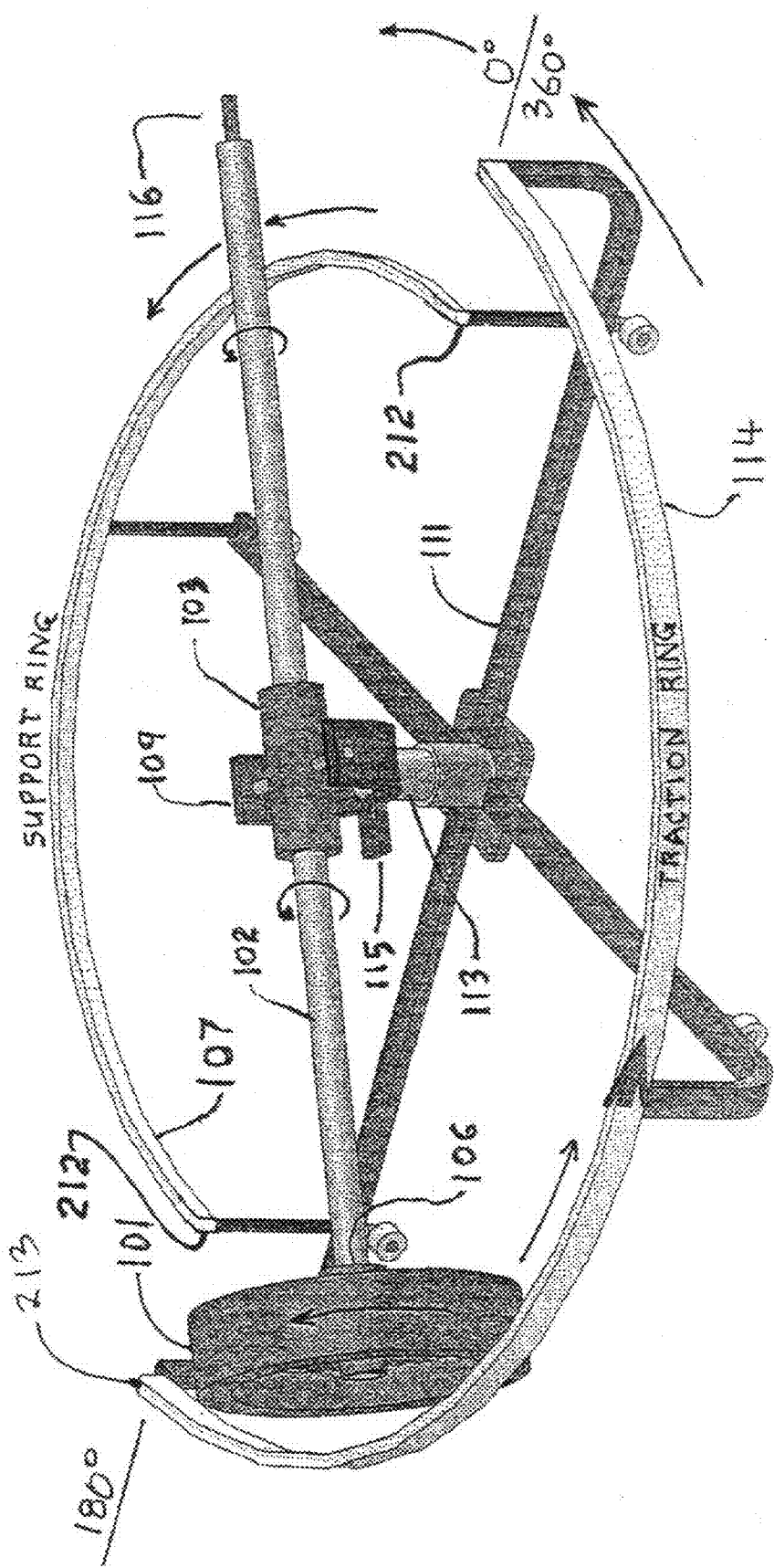

FIG. 2(a) is similar to FIG. 1 except that traction ring 114 is on the outside of the rotor instead of just inside it. Instead of a traction wheel disk with a larger diameter disk keyed to the end of the axle, the round traction surface is simply an extension of the rotor axle with a diameter suitably chosen, reduced or enlarged, for the desired precession angular velocity. As shown, the end part of the axle termed traction axle 116 is at a reduced diameter from the rest of the axle. Traction ring 14 has a high coefficient of friction on its upper surface. Support ring 107 has fillet 213 (a rounded leading edge), to insure that axle bearing 106 will easily move onto its top surface. Safety plate 115 is fixed to the bottom of gimbal 109 and is spaced below motor 103 so that if the rotor should drop out of precession its downward motion is limited. The operation of the rotor-motor-axle-gimbal assembly is the same as in FIG. 1. The rotor precesses from 180 to 360 degrees and is propelled by traction axle 116 from 0 to 180 degrees. For the sake of clarity, no battery is shown.

Normally the Mass Moment of Inertia for the motors and axles in FIGS. 1-5 can be ignored relative to that for the rotor because of their relatively small size. Their effect would only show up in the third or fourth decimal place. However to the extent that the motor and axle are centered about the pivot point, their Mass Moment of Inertia is exactly zero because each half cancels out the other half. The same is true for the motors that are gimbaled at their centers of mass. This is an ideal condition for those types of HMT designs.

Figure 2:
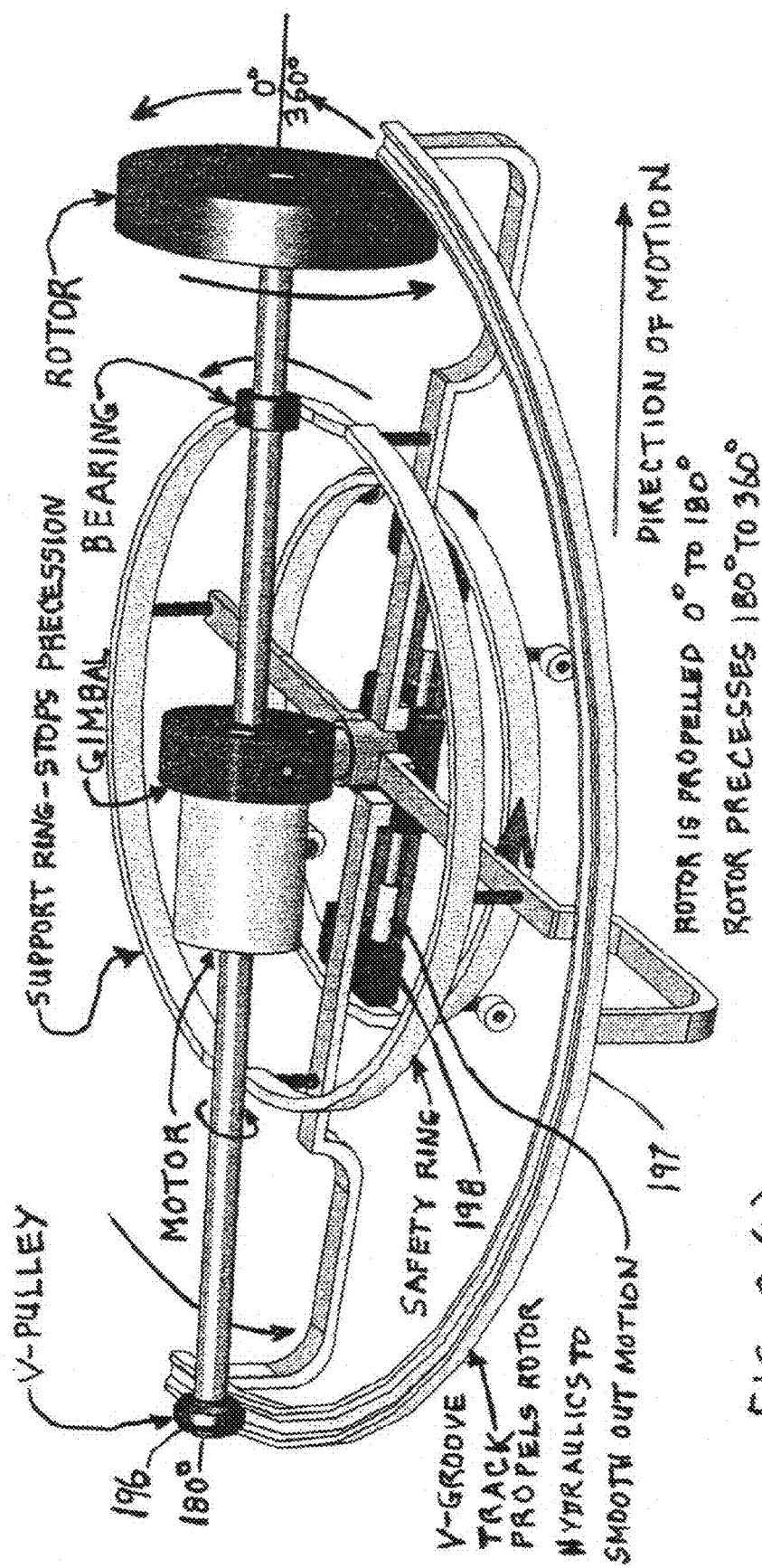

FIG. 2(*b*) is the same as FIG. 2(*a*) except that V-groove pulley 196 and V-groove traction ring 197 are used instead of simple friction contact between an extension of the axle and the traction ring 114. Hydraulic shock absorbers 198 to smooth out velocity variations are also shown.

With a single rotor, the traction propelling is for only one-half of a full cycle or 180 degrees. With two rotors and the second rotor providing traction propelling for the other 180 degrees of the cycle, the velocity will double, except for the small weight of the added structure to support the second rotor. For each additional pair of rotors added, the velocity will not increase any further, but the "horsepower" will be increased in proportion to the amount of active mass that is added. Accordingly, the average velocity of the device in FIG. 3 will be twice that of the device in FIG. 1 since it has two rotors instead of one.

Normally the Mass Moment of Inertia for the motors and axles in FIGS. 1-5 can be ignored relative to that for the rotor because of their relatively small size. Their effect would only show up in the third or fourth decimal place. However to the extent that the motor and axle are centered about the pivot point, their Mass Moment of Inertia is exactly zero because each half cancels out the other half. The same is true for the motors that are gimbaled at their centers of mass. This is an ideal condition for those types of HMT designs.

Figure 3:
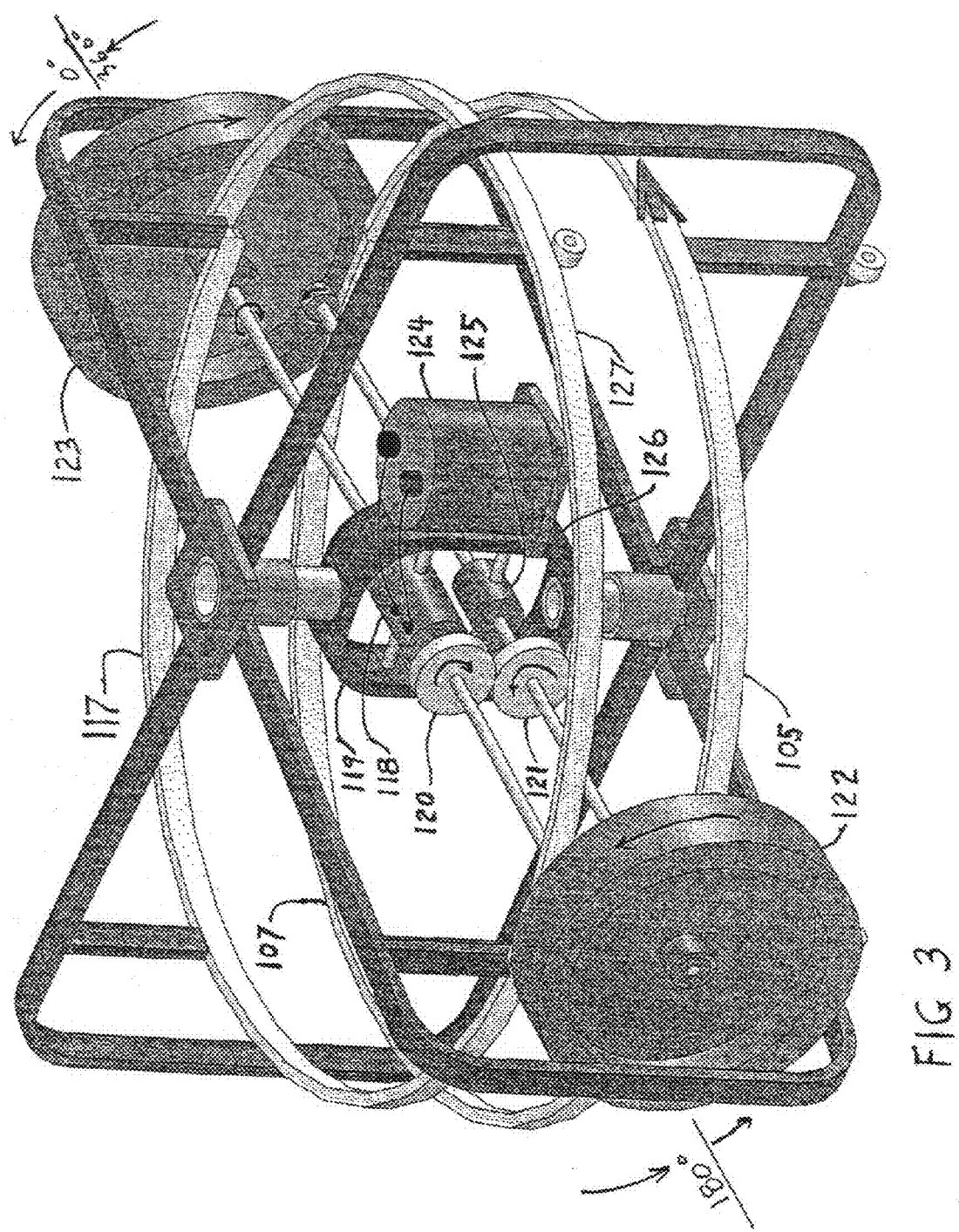

FIG. 3 has two decks, a lower and an upper. The lower deck contains an IPD identical to that of FIG. 1 and the upper deck contains another IPD essentially identical to that in FIG. 1, except that traction ring 127 and support ring 117 are inverted from their orientation in FIG. 1 and are placed below the rotor-motor-axle-gimbal assembly. Motor 118 drives the top rotor and axle and is mounted in gimbal 119. Motor 118 drives gear 120 which drives gear 121 so that the lower rotor 122 spins in the opposite direction to that of the upper rotor 123. Motor 118 is powered by battery 124. Axle bearing 125 is mounted in gimbal 126.

By having the upper deck elements inverted, the overall height is significantly reduced as compared to stacking two identical decks, one above the other. It should be recalled that the upper and lower decks are mechanically 180 degrees apart in that while one is precessing while the other is being propelled and vice-versa.

If the passive mass remains the same as in FIG. 1, the device in FIG. 3 will have twice the velocity of that in FIG. 1; however, this is clearly not the case due the added structure for the second deck. In that case, the added passive mass will reduce the speed accordingly.

Figure 4:
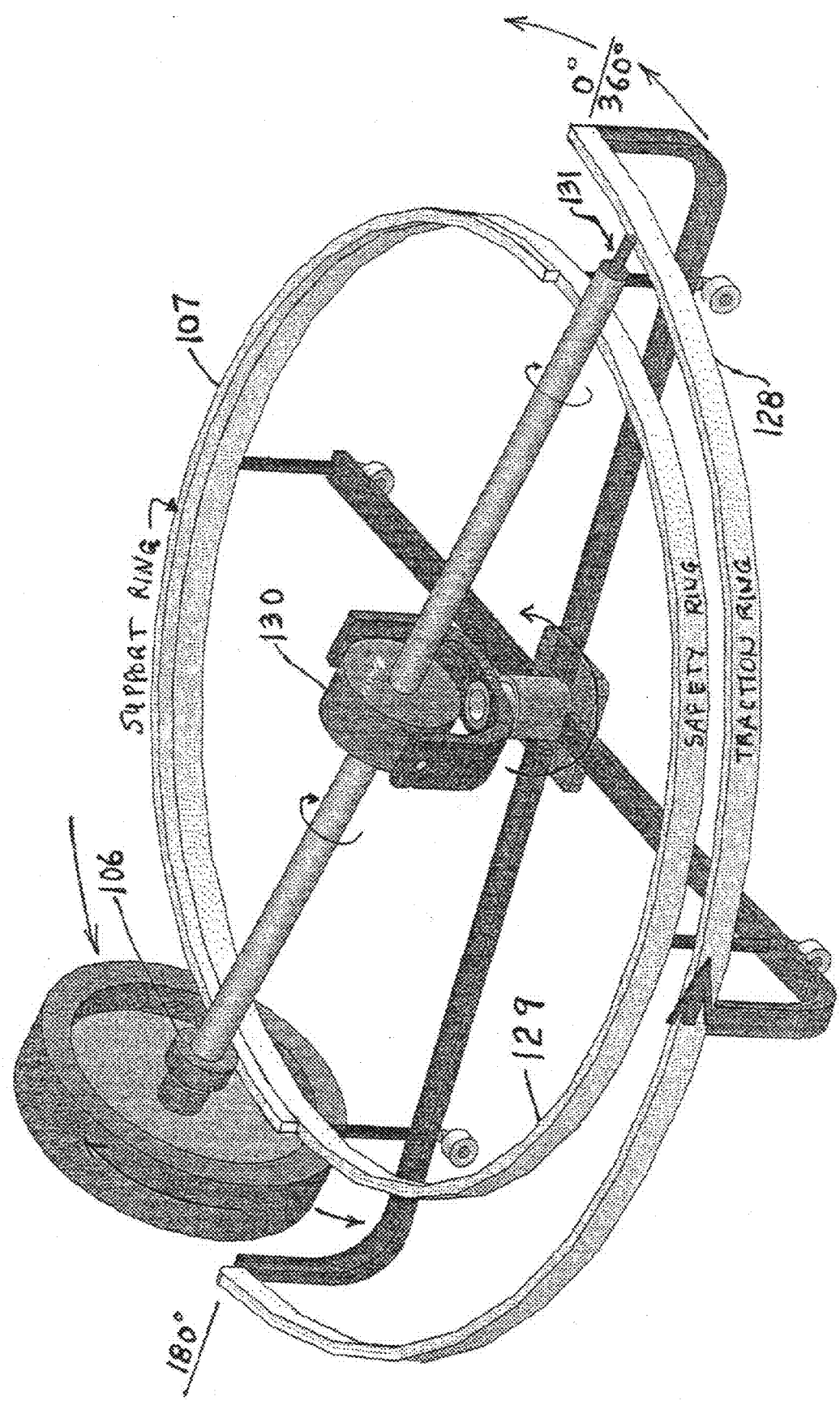

FIG. 4 is similar to FIG. 2(*a*) except that the safety ring 129 takes the place of safety plate 115 shown in FIG. 2(A). Otherwise the operation of the IPD in FIG. 4 is identical to that in FIG. 2(*b*). The velocity of the device in FIG. 4 is approximately the same as that in FIG. 1.

Normally the Mass Moment of Inertia for the motors and axles in FIGS. 1-5 can be ignored relative to that for the rotor because of their relatively small size. Their effect would only show up in the third or fourth decimal place. However to the extent that the motor and axle are centered about the pivot point, their Mass Moment of Inertia is exactly zero because each half cancels out the other half. The same is true for the motors that are gimbaled at their centers of mass. This is an ideal condition for those types of HMT designs.

FIG. 5 is very similar to FIG. 3 in that it has an upper deck and a lower deck. The primary difference is that the basic IPD of FIG. 5 uses outer traction ring 135 and outer traction ring 132 instead of inner traction ring 105 and inner traction ring 127 as in FIG. 3. An additional difference is that instead of using safety plates as in FIGS. 1 and 2, support ring 133 and support ring 134 are in place to limit the downward motion of the lower and upper rotors respectively in case either one should fall out of precession. The upper and lower decks are mechanically 180 degrees apart in that while one is precessing the other is being propelled and vice-versa. This provides for essentially continuous motion in the forward direction of the whole assembly. The velocity of the device in FIG. 5 is approximately the same as that in FIG. 3. A spinning rotor contains a lot of kinetic energy and care should be taken so that it never touches another object.

Normally the Mass Moment of Inertia for the motors and axles in FIGS. 1-5 can be ignored relative to that for the rotor because of their relatively small size. Their effect would only show up in the third or fourth decimal place. However to the extent that the motor and axle are centered about the pivot point, their Mass Moment of Inertia is exactly zero because each half cancels out the other half. The same is true for the motors that are gimbaled at their centers of mass. This is an ideal condition for those types of HMT designs.

Figure 6:
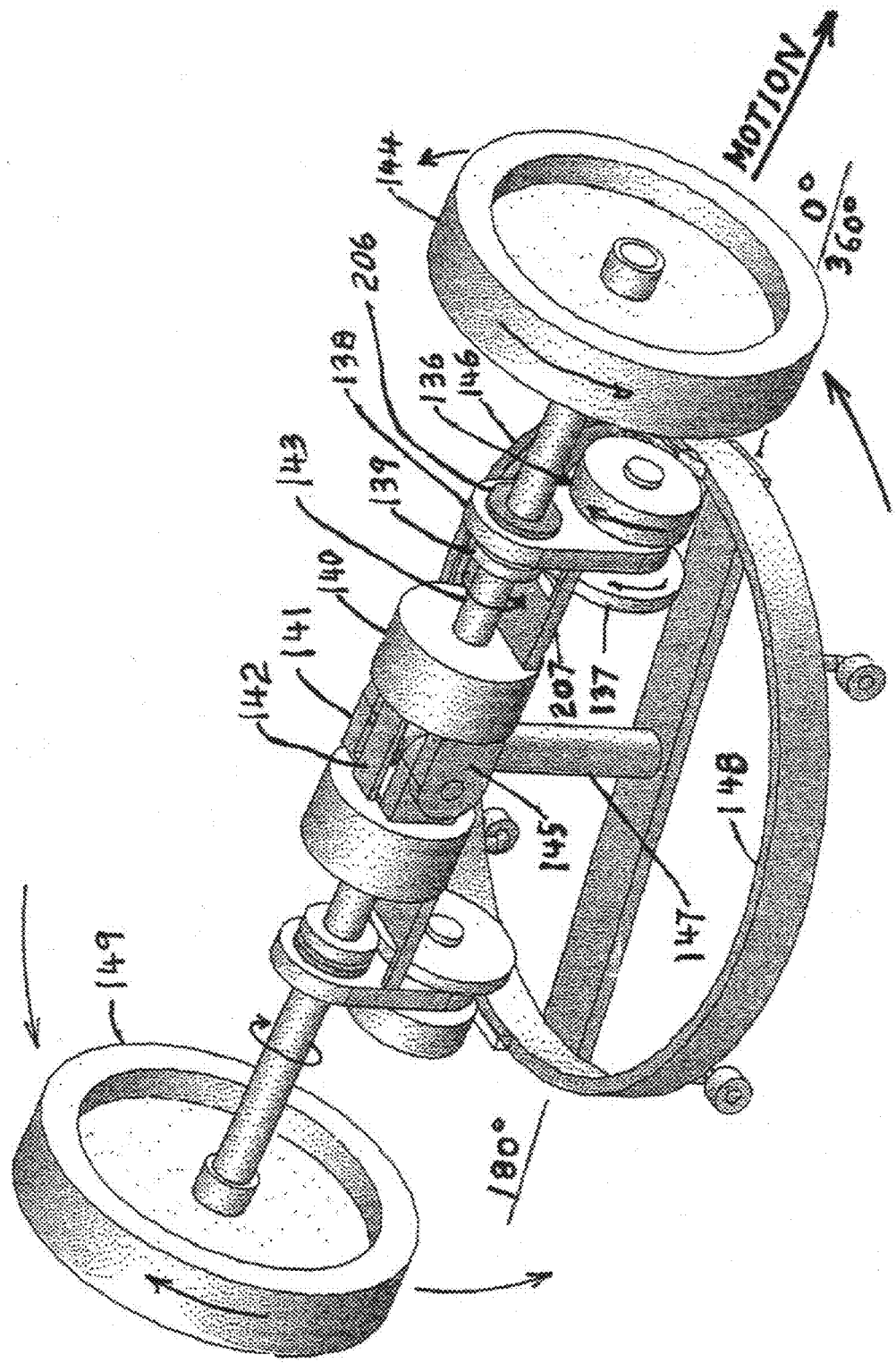

FIG. 6 shows a way to get two rotors on a single deck instead of stacking two decks, each with one rotor. The gearbox gives flexibility in meeting the requirement that the precession angular velocity be equal to the propelling angular velocity. Small gear 139 is keyed to axle 143 which is connected to the rotor of motor 140. Bearing 206 holds gearbox 138 centered on axle 143. Bracket 207 holds gearbox 138 in a fixed position in relationship to motor 140. Small gear 139 drives large gear 137 in a CW direction. Large gear 137 turns traction wheel 146 in a CW direction which propels rotor 144 from 0 to 180 degrees. Plate 142 pushes down on yoke 145 just enough to provide positive fraction between traction wheel 136 and traction ring 146. A plate similar to plate 142 is mounted on central column 147 just below yoke 145 (not visible on FIG. 6 due to the angle of the perspective view) to keep traction wheel 136 from riding on base ring 148 while rotor 144 precesses from 180 degrees to 360 degrees.

While rotor 144 is being propelled, rotor 149 is precessing and vice-versa. Forward motion of the carriage occurs when a rotor is being propelled with full inertia from 0 to 180 degrees. With two rotors 180 degrees apart, one rotor will always be providing forward motion. The velocity of the device in FIG. 6 will be somewhat less than twice that for the IPD of FIG. 1.

Figure 7:
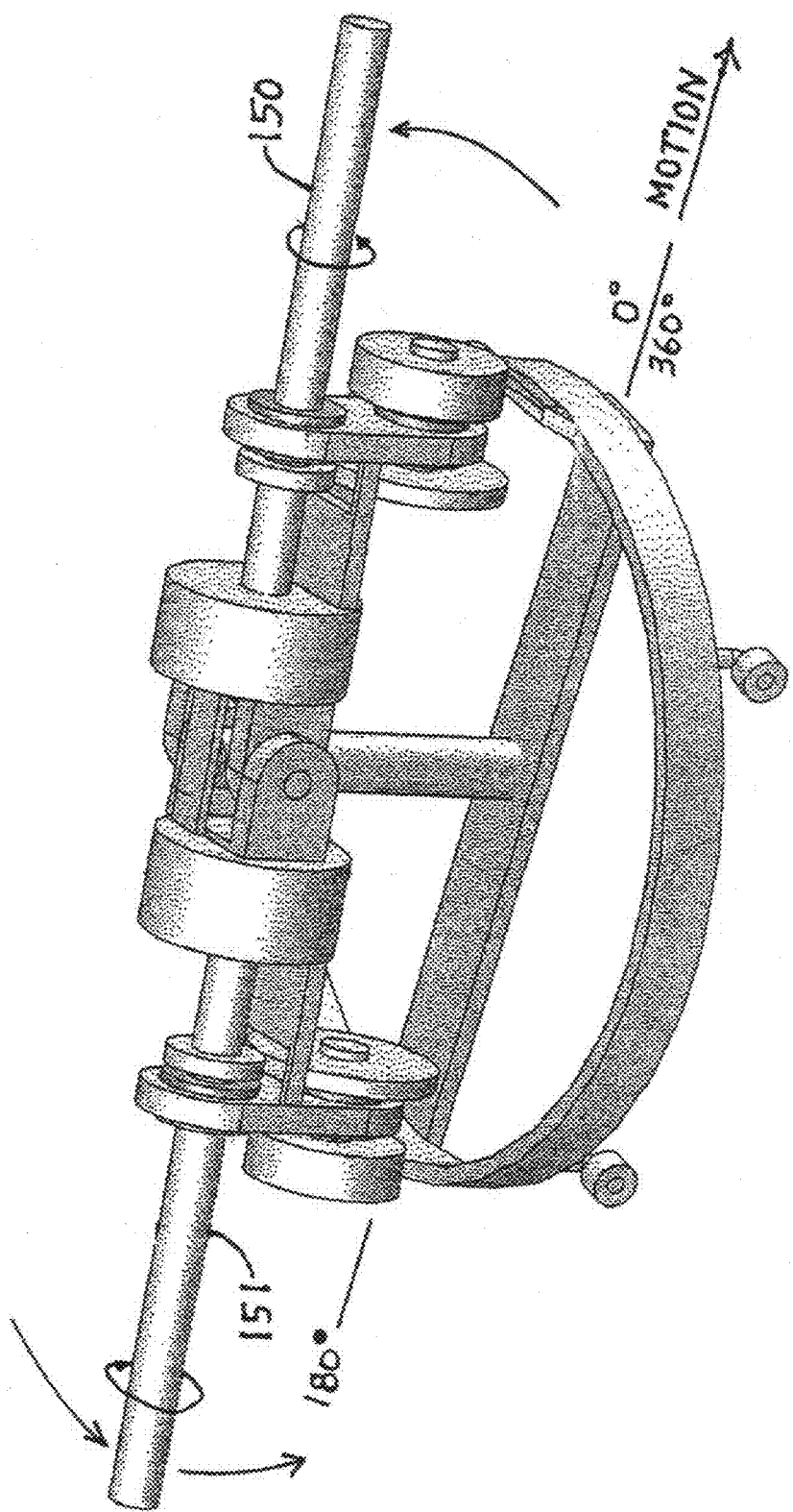

FIG. 7 is identical to FIG. 6 except that it uses Rolling Pin Rotors (RPRs) instead of regular disk rotors to gain the advantage of higher velocity as explained in the section on Analysis of Precession Based Motion. If the mass of an RPR is the same as the mass of a conventional solid disk rotor, it will also have approximately the same "horsepower", but will result in a higher velocity.

Figure 8:
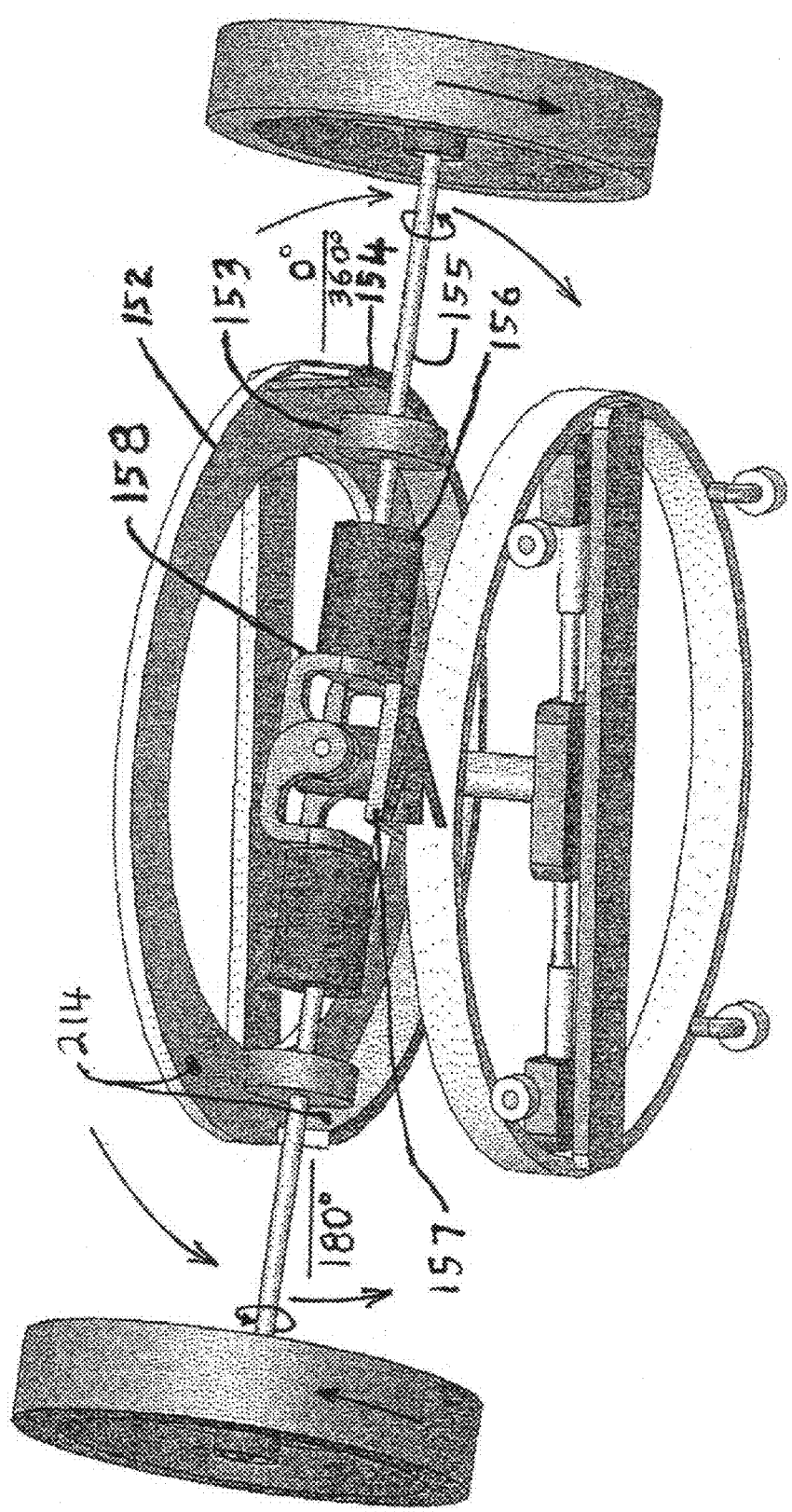

FIG. 8 is an embodiment that allows two HMT rotors to be gimbaled off a common pivot point on a single deck. Each rotor has its own motor. Traction ring 154 is above axle 155 and that eliminates the need to have a gearbox as in FIG. 7 to allow the axle to propel the rotor in the correct direction (CCW). Limit ring 152 is also above and axle bearing 153 will prevent the rotor from going too high during its precession phase from 180 to 360 degrees.

Safety plate 157 prevents the rotors from dropping too low in angle if they should fall out of precession. Motor 156 has its base attached directly to yoke 158 and has its rotor directly connected to axle 155. With two rotors 180 degrees out of phase on a single deck and using a common pivot point, at least one rotor will be contributing to forward motion at all times.

Although traction ring 154 and limit ring 152 are labeled separately, together they form the control ring 214. When the support ring is above the rotor axle, it is called a limit ring.

Figure 9:
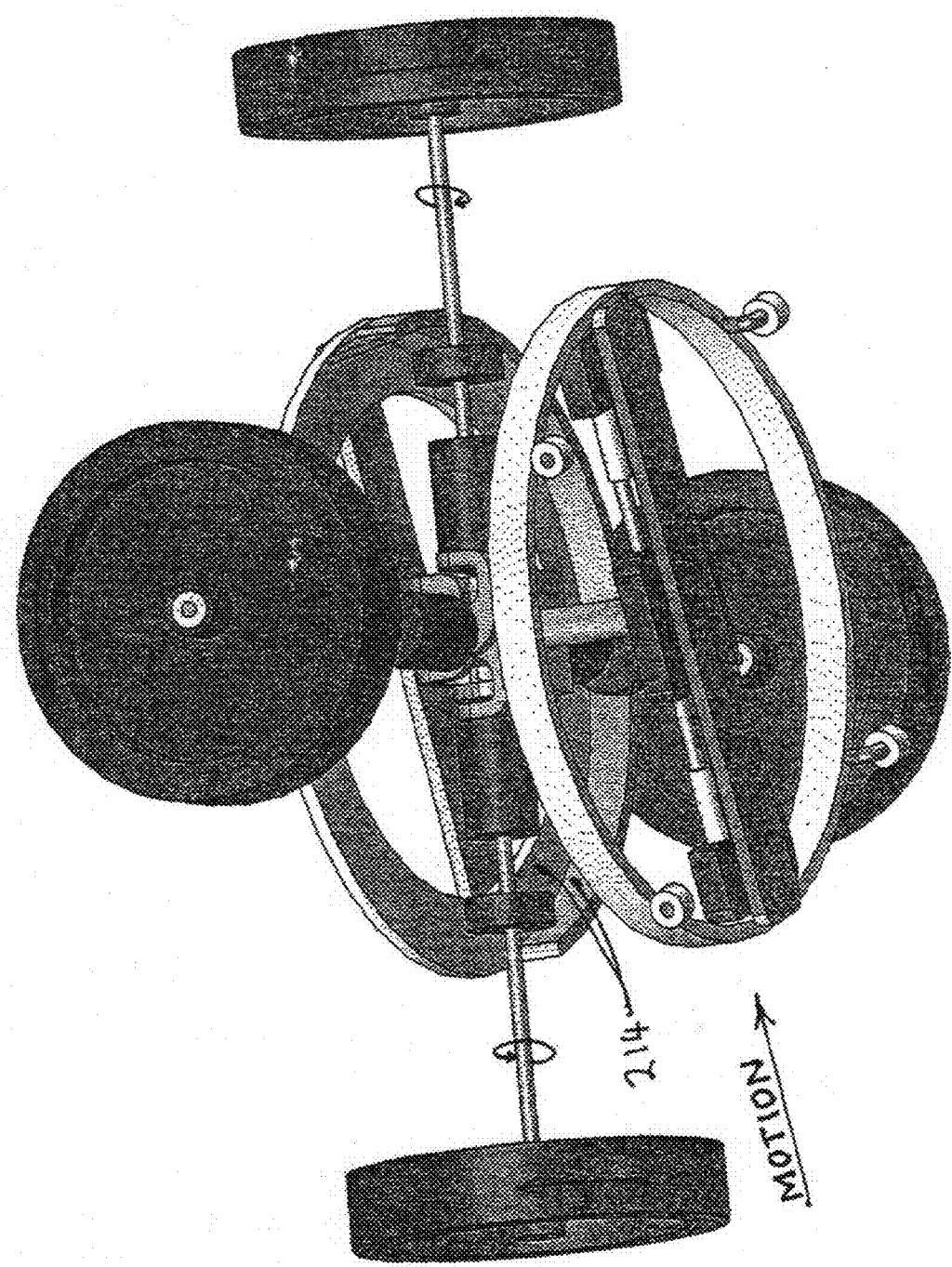
FIG. 9 is an embodiment that allows four HMT rotors to be gimbaled off a common pivot point on a single deck. Each rotor has its own motor.

FIG. 9 is identical to FIG. 8 except that it has four rotors instead of two. All four rotors are exactly 90 mechanical degrees out of phase and at least two rotors will be contributing to forward motion at all times. The velocity waveform for this four-rotor configuration is shown in FIG. 17. It can be seen that with at least four rotors equally spaced in the horizontal plane that at no time does the forward velocity approach zero. Since the IPD has four rotors, its "horsepower" will be approximately four times that of FIG. 1, while its velocity is only twice that of FIG. 1. Both traction ring 154 and limit ring 152 are shown together as control ring 214.

FIG. 10 is very similar to FIG. 9 except that instead of using four separate motors for the four rotors, one motor is used to drive all four rotors at exactly the same speed through spur and bevel gears. This eliminates a control problem in maintaining the same speed in all four rotors as in FIG. 9. Motor 159 drives spur gear 165, which drives another smaller spur gear (not shown) behind gear 165 that is concentric with and directly connected to the bottom of bevel gear 160. Bevel gear 160 drives all four bevel planetary gears 161, each of which separately drives one of the four rotors. Each of the four bevel gears is attached to its own yoke which provides a common pivot point inside the central column which is free to rotate in precession. An alternative solution to maintaining the same speed for all four rotors is to use digital stepping motors. Plate 164 helps support the base of motor 159. Both the traction ring and the limit ring are shown together as control ring 214.

In order for the four rotors to precess naturally in the horizontal plane each rotor has to be free to rotate 360 degrees in the horizontal plane and at least a few degrees in elevation. The design of the four bevel gears 161 and their driving bevel ring gear 160 will allow each of the four rotors-axles-bevel gears to move up or down by about 5 degrees, which is sufficient to allow horizontal precession. Yokes 162 will allow for sufficient movement in elevation. FIG. 10 is a single deck with four rotors, each 90 degrees apart. FIGS. 10(a) and 10(b) are just different views of the same device to better see the structure from the underside. The horsepower of the IPD of FIG. 10 will be approximately four times that of FIG. 1 because it has four rotors instead of one, yet has a fairly simply supporting structure.

Figure 11:
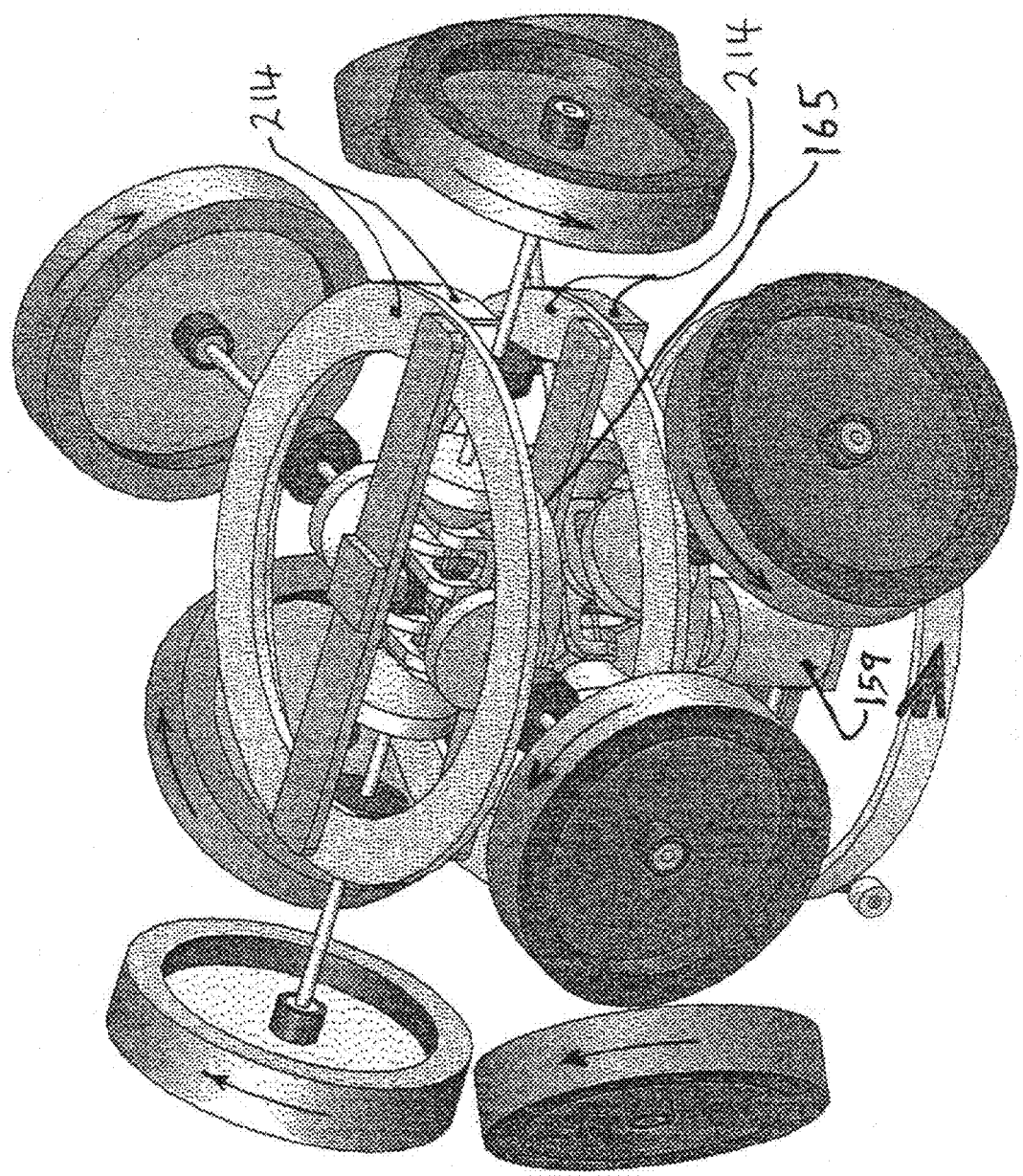
FIG. 11 is simply two decks of the device in FIG. 10 stacked one on top of the other.

FIG. 11 is identical to FIG. 10 except that it contains a second set of four rotors and their driving bevel ring gear 165 that are above the first set and are offset mechanically by 45 degrees from the first set.

All eight rotors are driven by the same motor 159 off of the same central column that rotates in precession with the rotors. The horsepower of the IPD of FIG. 11 will have up to eight times that of FIG. 1 because it has eight rotors instead of one. Both the traction and the limit rings for the upper and the lower deck are shown together as control ring 214.

FIG. 11 represents the embodiment for an HMT IPD in that with eight rotors the forward velocity will have only approximately +−1% ripple without any filtering action provided by the housing.

Figure 12:
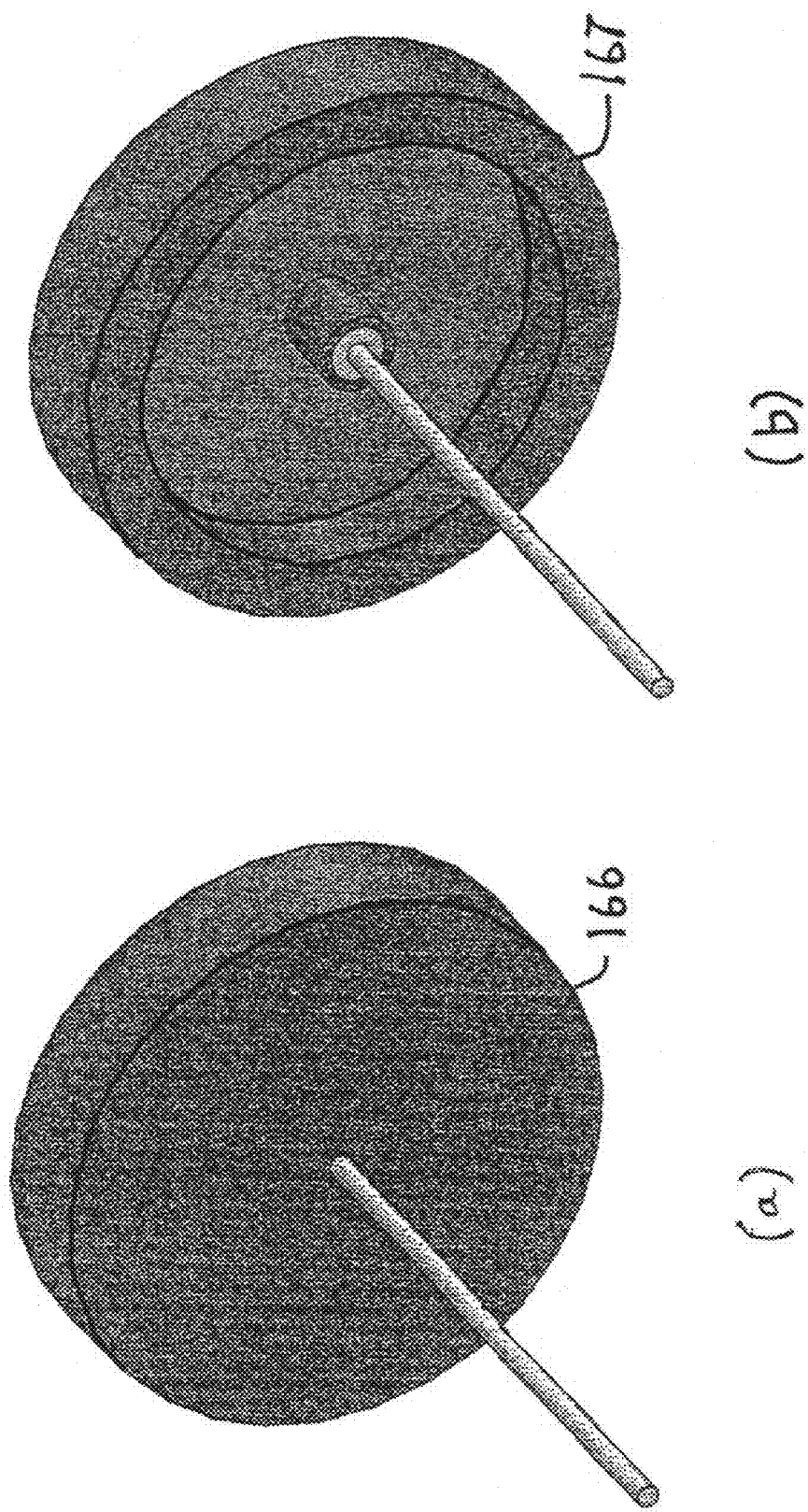
FIG. 12 is a comparison of a solid disk rotor with a rotor having most of its mass in its rim, thus giving it greater loss of inertia during precession.

FIG. 12 shows a solid disk rotor 166 and a "thin rim" rotor 167. As will be shown later on in this patent application, the solid disk rotor can loose a maximum of only 50% of its inertia and angular momentum during natural precession while a rotor with all of its mass in a thin rim (not physically possible) can theoretically lose 100% of its inertia. Practically speaking, a realistic thin rim rotor can lose about 95% of its inertia. For the approximate dimensions show, the thin rim rotor 167 can lose approximately 80% of its inertia, which is sufficient for HMT purposes.

Figure 13:
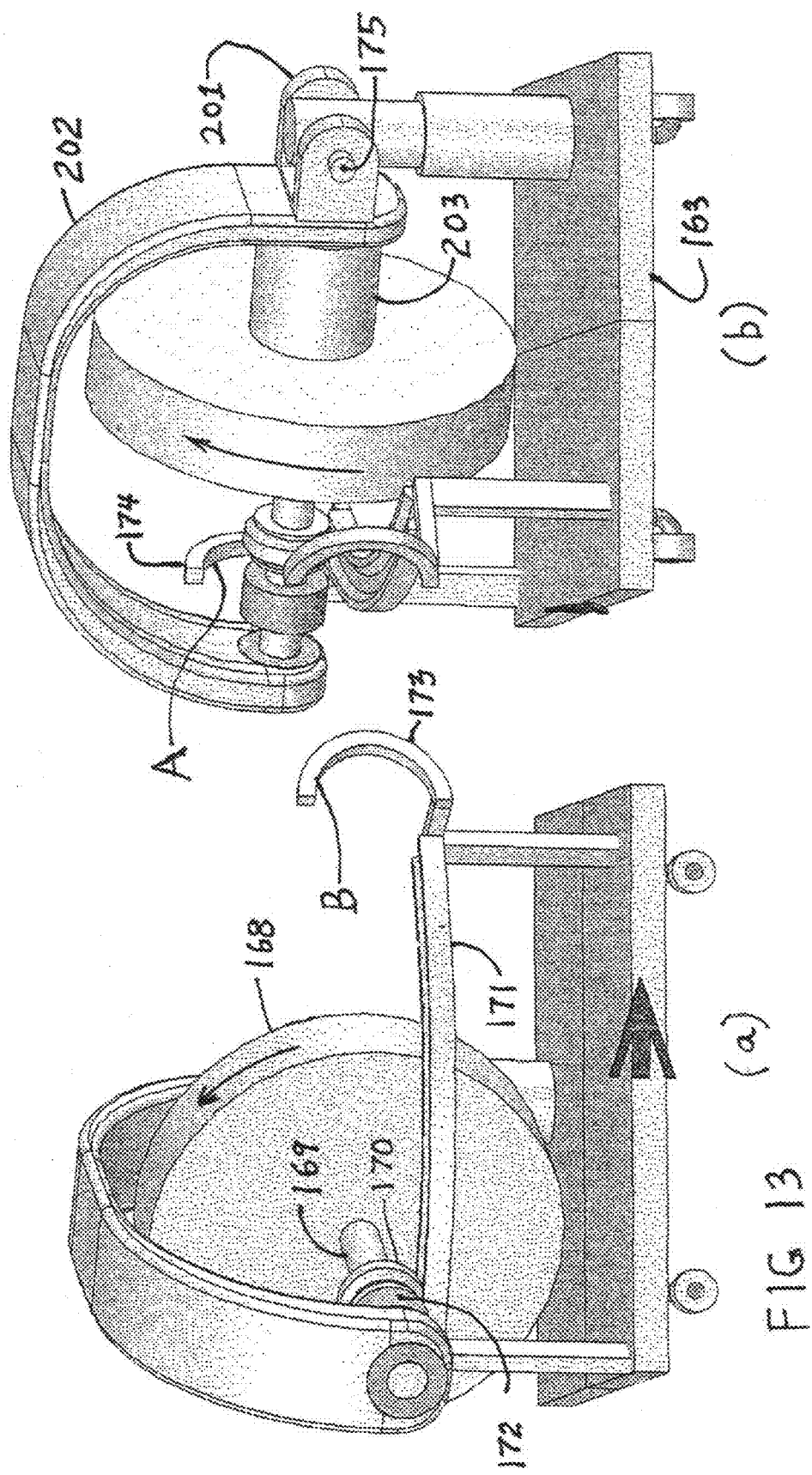
FIG. 13 is an early embodiment of an HMT device that contains only one moving part and limits its angular motion to the order of about 60 degrees.

FIG. 13 shows an early version of an HMT IPD. A solid disk rotor 168 is shown in (a) after being propelled to the left (CW as seen from the top) by V-groove wheel 170 on V-groove track 171. Its region of operation is approximately 60 degrees and is the first configuration that was successfully tested by, the inventor. In FIG. 13(b) motor 203 and uplift 174 can be seen. Semi-circular gimbal 202 pivots on yoke 201. When V-groove wheel 170 propels itself to the end of V-groove traction track 171, axle bearing 172 meets uplift 174 and the rotor and axle due to their momentum crawl up semi-circular uplift 174 enough to become airborne, reverse direction, and begin precessing CCW for about 60 degrees until it meets semi-circular down-track 173. Down-track 173 stops the precession and causes V-groove wheel 170 to begin its CW motion on V-groove track 171 where it reverses direction and propels the rotor for 60 degrees where it will meet uplift 174 and begin another precess-traction cycle.

While rotor 168 is precessing CCW its inertia is reduced by approximately 50% and so its reaction to the pivot point at the center of yoke axle 175 and hence to the base 163 is reduced by about 50%. When rotor 168 is propelled CW for 60 degrees by V-groove wheel 170 it retains its full inertia and has a full and normal reaction against the pivot point and base 163. For this reason, the rotor is propelled CW (to the left), the reaction moves the base to the right so that after a full cycle of precession and retracing, a net movement to the right will result. The resulting movement will be a forward movement followed by a shorter backward movement for a net resulting forward motion. The net forward motion divided by the time of one cycle will determine the average forward velocity.

However, the implementation of FIG. 13 does have some undesirable effects. When the rotor is propelled to the end of the V-groove track and is suddenly reversed by the uplift 174 the momentum of the rotor causes the base to be "jerked" backward for a short distance and again, when the precessing rotor meets down-track 173 and is suddenly reversed in its direction, the base is suddenly "jerked" forward by a small amount. To counter such a jerking motion all of the HMT embodiments in FIGS. 11, 41, 45 through 50, and 52 that have essentially continuous CCW motion of the rotor are considered superior implementations because they do not have the "jerk" problem.

A 60 degree CCW and CW motion were considered because that is the region of the rotor motion mostly in the direction of the desired travel. If however, the retracement went all the way back to what might be considered 180 degrees, then when the rotor is suddenly turned around from CW to CCW motion, the "jerk" would be exactly perpendicular to the direction of travel and this would not result in a backward movement which would be good, but the sideways jerk is very undesirable. An identical mirror image unit that is in synchronism with the unit of FIG. 13 would have a jerk that would exactly cancel the undesirable sideways jerk, but that design is complicated with unnecessary problems including synchronizing motions of the two rotors. For that reason, it is recommended that any development efforts focus on the earlier designs of FIGS. 1 through 11, 41, 45 through 50, and 52.

FIG. 14 is intended to illustrate a principle and does not represent something that is practical to implement. It is sort of a gedanken (thought experiment, frequently used by Einstein) that shows a rotor that precesses in a pattern called an S-Curve. The rotor has an axle that extends for one-foot out of each side of the rotor. The rotor starts out on the right side of FIG. 14. It is unsupported on its right side at point A and is supported on a pivot point on its left side at point B. Under these conditions the rotor will precess in a CCW direction for 180 degrees such that the mass of the rotor will have moved two feet to the left without any work being performed. It converts the downward force of gravity into the conservative process of precession. At that instant the support (pivot point) at point B is removed and simultaneously a pivot point is inserted at point C. At that instant the rotor switches from CCW rotation to CW rotation and resumes its precession along an S-Curve shaped path to the left. When CCW precession is stopped between points B and C the rotor does not drop in elevation or elevation angle. However, in order for CW precession to be initiated at pivot point C, the rotor has to drop slightly in elevation in order for CW angular momentum to be imparted to itself. This will be equivalent to a drop in angle of about one or two degrees, depending on the quality and dimensions of the rotor. The rotor will then precess CW for 180 degrees until its left-most axle comes to point D. At this point the mass of the rotor will have moved another two feet to the left for a total distance of four feet.

At the time that the left-most axle comes to point D, the pivot point at point C is removed and one is set up at point D. At point D, the rotor will drop very slightly and resume precession in a CCW direction around pivot point D. At this point, the mass of the rotor will have moved a total distance to the left of six feet. Again, the pivot point at D will be removed and another one inserted at point E. The rotor will again drop a very slight amount in height and precession will resume in a CW direction around pivot point E. This process can be repeated continuously moving the mass of the rotor two feet each time. It is theoretically possible, but not practical to implement a mechanism for the manipulation of the pivot points. This process was done manually to verify that it can be done. If it were implemented, the rotor would be powered by an electric motor and the energy supplied to the rotor would compensate for the slight loss each time the direction of precession is reversed. The purpose of this thought experiment is to prove that mass can be moved, stopped, started, and moved with an average velocity without the expenditure, of any significant force or energy being required to start or stop the movement.

In FIG. 14, use electromagnetic pivot points from above instead of mechanical ones from below. This will also solve the problem of having to raise the end of the axle slightly at the end of each 189 degrees. The electromagnet will lift the PP as needed.

FIG. 15 shows the horizontal velocity profile for a vehicle propelled horizontally by a single HMT rotor such as that shown in FIG. 1. It assumes that a thin-rim rotor is used that loses approximately 80% of its inertia during precession. It can be seen that during the traction propelled half-cycle the velocity profile is that of a sine wave. During the precession half-cycle, the vehicle velocity is a sine wave in the reverse direction, but with a reduced amplitude of only about one-fourth that of the forward velocity, so that there very clearly is net movement forward.

FIG. 16 shows the horizontal velocity profile for a vehicle propelled horizontally by a single deck with two HMT rotors 180 degrees apart, such as that in FIG. 2. The velocity waveform is the sum of the waveform shown in FIG. 15 added to an identical waveform that it is shifted 180 degrees in phase. FIG. 16(b) shows the sum of the two waveforms and it can be seen that the movement is always in the forward direction, which is highly desirable. The forward velocity shown by FIG. 16 will be approximately twice that of FIG. 15 (also of the IPD in FIG. 1).

FIG. 17 shows the velocity profile for a four-rotor implementation such as that shown in FIGS. 9 and 10. It shows the result of the waveform in FIG. 16 added to itself shifted by 90 degrees. FIG. 17(b) shows that the velocity is always forward and has only a +−3.3% ripple factor due to the fact that two of four rotors are always producing forward motion. If any filtering of the velocity were performed by springs and hydraulic or electromagnetic shock absorbers, the ripple factor could easily be reduced to less than +−1.0%. The velocity shown in FIG. 17 will be approximately two times that of FIG. 1 because it represents more than one rotor.

FIG. 18 is a comparison of the velocity profile shown in FIG. 17 for thin-rim rotors and RPRs (Rolling Pin Rotors) (RPRs not shown in the figures referenced on the drawing). Note that the velocities are higher in FIG. 18 than in FIG. 17. The RPRs will produce a higher velocity. The exact magnitude of the increase is dependent on the dimensions of the rotors.

FIG. 19 shows the velocity profile for the 60 degree HMT IPD shown in FIG. 13. It reflects the motion of the center of mass of the complete device. During precession, the center of mass has a slight rearward velocity followed by a small spike of forward velocity. During the Retrace movement, there is the normal forward velocity followed by a jerk backward at the end of the retrace movement. Lateral or sideways reactions exist but are not shown on the plot and would be resisted by wheels allowing motion only forward or backward.

Figure 20:
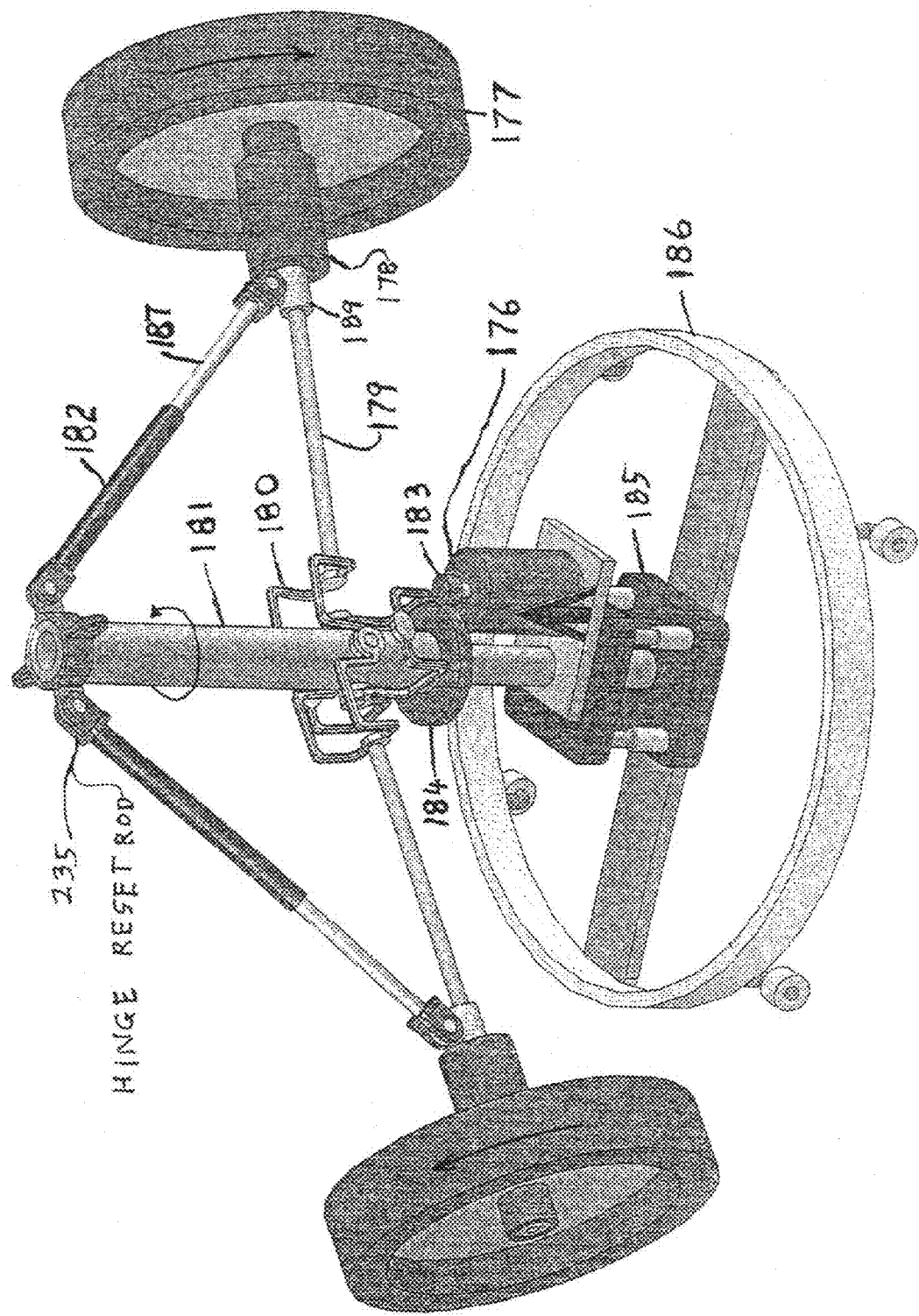
FIG. 20 shows the simplest two-rotor IPD for producing vertical motion (VMT).

FIG. 20 shows the basic configuration for a VMT IPD (Vertical Motion by Mass Transfer) (Inertial Propulsion Device). Rotor 177 is driven by motor 178 which is connected to collar 189 which is concentric with axle 179. Axle 179 is connected by yoke 180 to column 181 with the pivot point for horizontal and vertical motion of axle 179 being at the center of column 181 and the centerline for the yoke axles holding the yokes to the center column. Two extra yokes are shown but not used in this figure. Torque motor 176 turns small gear 183 which turns large gear 184 which turns central column 181. Torque motor 176 applies a forcing torque to both rotors through the two gears and the central column. When rotor 177 is torqued in the horizontal plane it will begin to precess upward pivoting about the pivot point inside central column 181. If unconstrained, rotor 177 could rise 90 degrees which would be vertical. However, a practical design might restrict its motion to plus and minus 30 degrees about the horizontal. With plus and minus 30 degrees of vertical travel, the upper limit of travel, the lower limit of travel, and the pivot point form a perfect equilateral triangle. This means that the vertical length of travel each cycle will exactly equal the length of the lever arm or axle from the pivot point to the center of mass of the rotor. With the vertical distance traveled each cycle being equal to the length of the axle, the equations to describe the performance of the device will be greatly simplified. Reset cylinder 182 and reset rod 187 perform the reset function of pushing the rotor from the plus 30 degree point down to its lower limit at minus 30 degrees. Normally the reset velocity of the rotor will be designed to be exactly equal to the precession velocity of the rotor. During the reset function the forcing torque will be turned off. The reset cylinder 182 and reset rod 187 could be electromagnetic, hydraulic, or pneumatic. The controls for operating the reset mechanism are not shown.

To maintain a dynamic balance about the central column, an identical rotor with its motor, axle, yoke, and reset function will be implemented exactly 180 degrees across from the first rotor.

The rotor is of a "thin rim" design that will lose approximately 80% of its inertia as it precesses upward. This will provide a downward reaction against the pivot point and hence against the housing and any vehicle assembly that will be only about 20% of what it would be if the rotor had full inertia while precessing upward. During the reset part of the cycle the forcing torque is turned off and so the precessing response will not exist and the massive rotor will be moved downward with its full inertia. This will result in a full 100% upward reaction against the pivot point and hence against the complete vehicle. During the reset process the center of mass (COM) of the complete system does not move. The net result of the precess and reset processes is that there is a net distance moved upward after each precess-reset cycle.

However, in the earth's gravity this net upward movement will normally not be noticed and it is difficult to measure the effect in the presence of the earth's strong gravity. However, the performance of the VMT IPD could easily be measured on the Space Station where the earth's gravity is exactly cancelled by the centrifugal force of the Space Station in its orbit around the earth.

The forcing torque has to be turned off during the reset part of the cycle as the forcing torque and the reset force are opposing forces. It should be fluffier realized that in the absence of a gravitational field the motion of the single two-rotor configuration of FIG. 20 will move up, then will move slightly down, then move up again, and slightly down, and continue to repeat this cycle. In the presence of a gravitational field much weaker than that of the earth, the IPD may actually move up slightly during the reset stroke of each cycle, but will ultimately settle back down to the surface.

It should be further realized that when the forcing torque motor applies a forcing torque in a CCW direction, there will be a counter-torque tending to cause the vehicle to rotate in the opposite direction (CW) in the horizontal plane. For this reason there has to be an additional unit, but one that is torqued in the opposite direction with its rotors also being spun in the opposite direction so that its direction of precessive motion will also be in the upward direction. This could be an additional unit setting on the same base plate besides the first one, or one that is appropriately stacked on top of the first unit.

Figure 22:
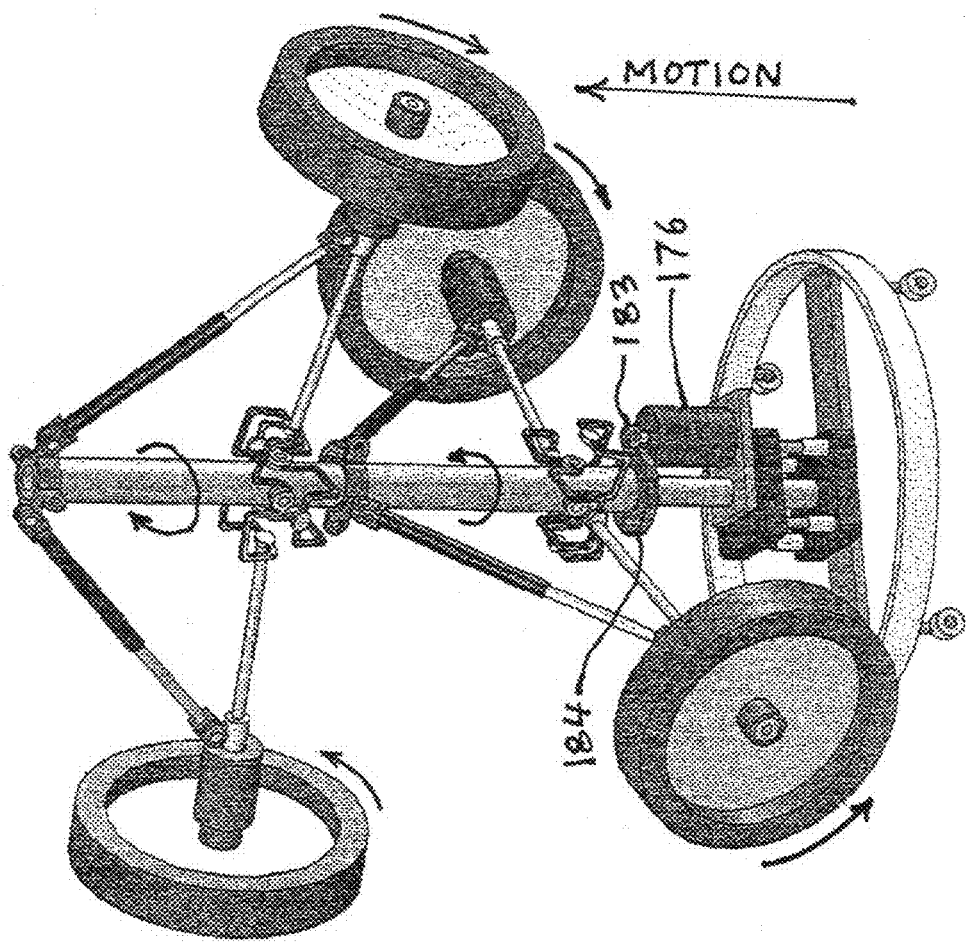
FIG. 22 shows two decks, one on top of the other, each with only two rotors, with the upper set of rotors being torqued in the opposite direction to those in the lower deck.

Or, it could also be just two additional rotors that are torqued about the same vertical axis, but in the opposite direction as the first unit, with its rotors spinning in the opposite direction of the first set as in FIG. 22 so that the precessional motion is always upward. In this instance, the pivot points of the two sets of rotors would not be concentric, but would be one above the other, although this is of no consequence. However, the motion of only two sets of rotors would provide unidirectional motion, but the velocity would go to zero between sine wave type waveforms as shown in FIG. 16. For this reason, it is recommended that a minimum of four pairs of rotors be used to provide forward motion that will not approach zero value, but will have a ripple factor of approximately +−3.3%.

Hydraulic base 185 is part of a hydraulic damping unit to help smooth out the upward motion. The damping or filtering unit could be hydraulic, springs, pneumatic, or electromagnetic. Base ring 186 is part of a housing with horizontally oriented wheels that would not be required for a vertically moving device, but is included for orientation purposes only for the reader.

Central column 181 is shown as being torqued in a CCW direction to produce motion in the upward direction. To reverse the direction of motion, both the direction of torqued produced by motor 176 and the direction of rotation of the rotors by motors 178 have to be reversed. There may be certain additional changes in the controls and possibly the structure to complete the reversal of direction for VMT.

As motor 176 torques the central column in a CCW direction, there is a reverse torque acting on the whole assembly or vehicle. This reverse torque can be compensated for by having an identical unit secured to the same base or vehicle that produces motion in the same direction, but its central column is torqued in the opposite direction. The rotors also will have to be torqued in the opposite direction to those in the first set. See FIG. 42 for a fully torque compensated device using just two rotors per deck.

Figure 21:
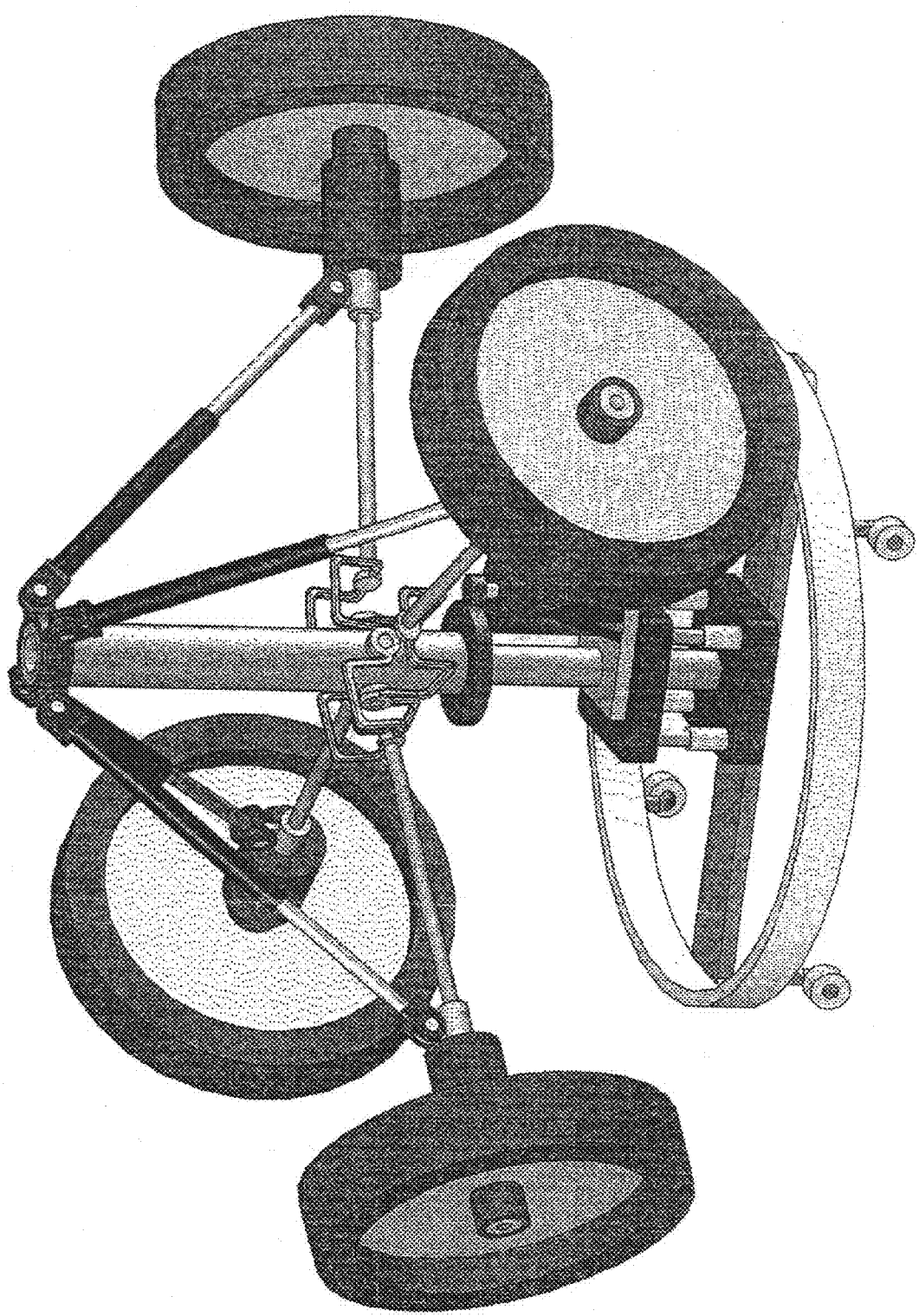
FIG. 21 shows four VMT rotors on a single deck. The axles for all four rotors have a common pivot point by using a unique design of a yoke.

FIG. 21 is identical to FIG. 20 except that it has four rotors precessing about the same pivot point instead of only two. This will improve the efficiency or ratio of active to passive mass of the device. The vertical velocity waveform will be similar to that shown in FIG. 15. The "horsepower of the IPD of FIG. 21 will be close to twice that of FIG. 20 because it has four rotors instead of two. The torque for this figure can be compensated in exactly the same manner as it was done for FIG. 20. See FIG. 43 for a stack of four decks like the one in this figure. The whole stack is torque compensated.

Figure 24:
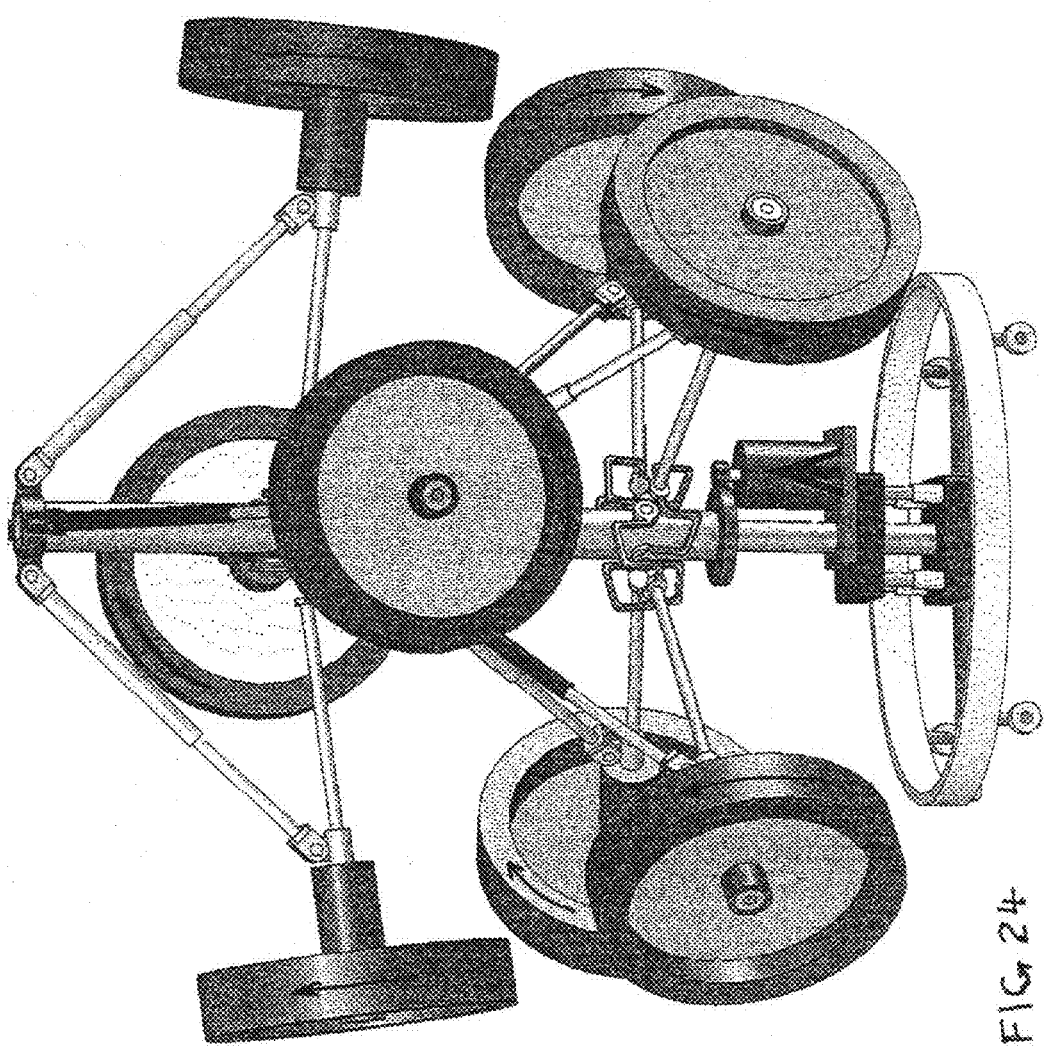
FIG. 24 shows a single stack with two decks, each deck having four rotors.

FIG. 22 shows two decks, one on top of each other, each having only two rotors. It is the absolute minimum configuration that has all forcing torques balanced out. It is called the Fiala Vertical Space Drive (FVSD). However, as will be shown later, the embodiment shown in FIG. 24 is a superior configuration. The reaction to the forcing torque for the lower deck tends to cause the housing to rotate CW while the reaction to the forcing torque on the top deck counters the tendency for the housing to rotate. However, the four-rotor configuration produces a lifting motion for only the reset portion of the cycle, while during the precess portion of the cycle the motion is actually slightly downward. The net result is more like a continuous stop and go movement. The reset part of the cycle could be made shorter than the precess part simply by applying a stronger reset stroke. As long as sufficient energy was available, a stronger reset stroke could be applied. In this respect, force of the reset stroke is the equivalent of the accelerator pedal on an automobile. However, engineering designs with multiple decks and stacks of decks are greatly simplified by designing the duration of the reset stroke to be equal to the precession time, which normally is the time to precess upward from −30 degrees to plus 30 degrees.

The forcing torque on the top deck caused its central column to turn CW while that of the lower deck to turn CCW. The central column of the upper deck is inside and concentric with that of the lower deck. A single torque motor 176 on the lower deck, by the proper choice of a gearing arrangement, insures that the forcing torques to the lower and the upper deck are exactly equal and opposite. For simplicity, the gearing arrangement to torque the upper deck in the opposite direction of lower deck is not shown; however, those skilled in the art will appreciate how this can be accomplished.

It would require two sets of the IPD shown if FIG. 22, phased 180 degrees apart so that some lift would be provided at all times and this would employ 8 rotors. To prevent the lift from dropping to zero at each 180 degree interval, it would require four sets of the IPD, phased 90 degrees apart. The velocity ripple would then be only 6.6% and this would require 16 rotors. The "horsepower" of the IPD of FIG. 22 will be close to twice that of FIG. 20 because it has four rotors instead of two.

Figure 23:
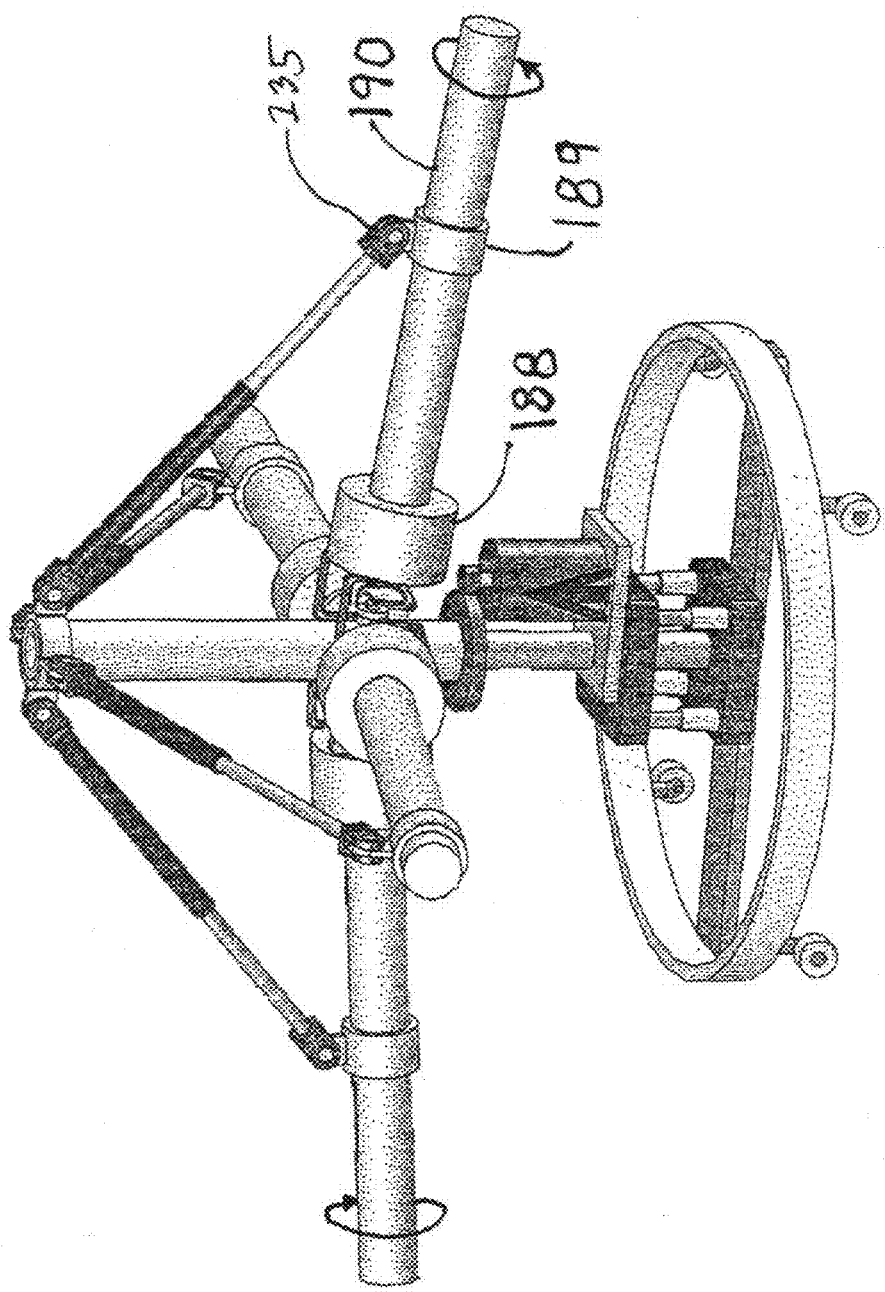
FIG. 23 shows a single deck with four RPRs.

FIG. 23 is identical to FIG. 21 except that it has RPRs (Rolling Pin Rotors) instead of thin rim rotors. Each RPR 190 has its own motor 188 and reset collar 189. The velocity of the IPD of FIG. 23 will be higher than that of FIG. 22 because it has uses RPRs (Rolling Pin Rotors) instead of conventional disk rotors.

It should be realized that if the configuration of FIG. 22 used RPRs for a lower profile, and if two of those units were stacked on top of each other and phased 180 degrees apart, then this configuration would consist of only one stack with eight rotors and would have only upward motion which in the long run would be the most efficient. A figure with this particular single stack is shown in FIG. 24, except that thin-rimmed rotors are used instead of RPRs.

FIG. 24 has a lower deck that is identical to that of FIG. 21 and it has an upper deck whose rotors are hinged off the same central column as that of the lower deck, for a total of eight rotors. The central column has a greater height than that of the lower column. The rotors of the upper deck are offset 45 degrees in the horizontal plane from those on the lower deck, thus allowing for a more compact configuration. The rotors on both decks precess upward together and are all reset downward together, still allowing each of the eight rotors to be free to move independently on their horizontal and vertical axes. However, by design, all rotors will be driven (torqued) in unison in the horizontal plane and reset downward in unison. With all eight rotors being torqued simultaneously, there will be a counter torque tending to turn the housing in the opposite (CW) direction. If the height of the top central column were increased and the top rotors were torqued in the opposite direction, then one deck can be torqued CW and the other one will be torqued CCW, so that the VMT device as a whole will be torque compensated. Such a configuration has been termed the Fiala Vertical Space Drive-(FVSD). It should be noted that an identical set of rotors as shown in FIG. 24 could be stacked on top of itself and torqued in the opposite direction for total torque compensation. There should be no fear that the stack will be too tall or might tip over because all VMT IPD devices are for use where there is no gravitational field and hence no weight. The horsepower of the IPD of FIG. 24 will be close to twice that of FIG. 22 because it has eight rotors instead of four. See FIG. 44 for a stack of four of the IPDs shown in this figure. The stack also achieves complete torque compensation in the same manner as done in FIGS. 42 and 43 for FIGS. 20 and 21.

Figure 25:
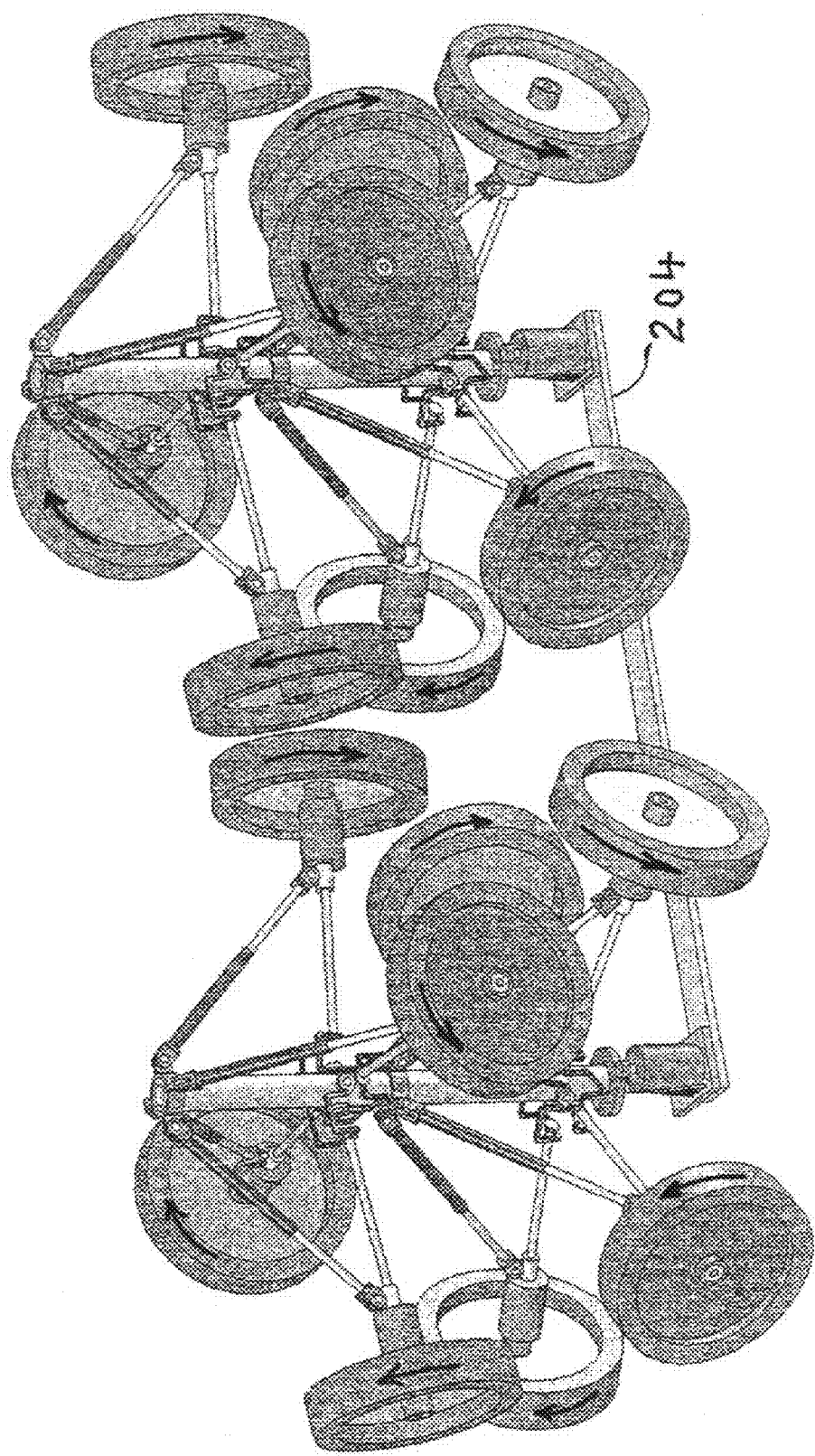
FIG. 25 shows two stacks, each with two decks, each with four rotors.

FIG. 25 shows two stacks, each with two decks, each with four rotors. It is identical to having two of the IPDs shown in FIG. 24 mounted on the same base 204. While one stack is precessing, the other is being reset, so that there will always be a forward motion, except the velocity will approach zero at the end of each reset stroke and the beginning of each precess phase. However, the base plate will oscillate slightly like a teeter-totter.

An alternate mode of operation for the two stacks of FIG. 25 would be to have both stacks precessing at the same time and both stacks being reset at the same time, in which case, two of the stacks will be torqued CW and the other two will be torqued CCW, so that the VMT device as a whole is Torque Compensated (TC). However, the base plate velocity will pass through zero during each cycle ash shown if FIG. 34(*a*). Another alternative is to have an identical set of rotors as shown in FIG. 25 to be stacked on top of the existing set and torqued in the opposite direction for total torque compensation. The phasing of the upper and lower decks would be such as to cancel out the oscillation described for FIG. 25. There should be no fear that the stack will be too tall or might tip over because all VMT IPD devices are for use where there is no gravitational field and hence no weight. The horsepower of the IPD of FIG. 25 will be close to twice that of FIG. 24 because it has twice as many rotors.

Figure 26:
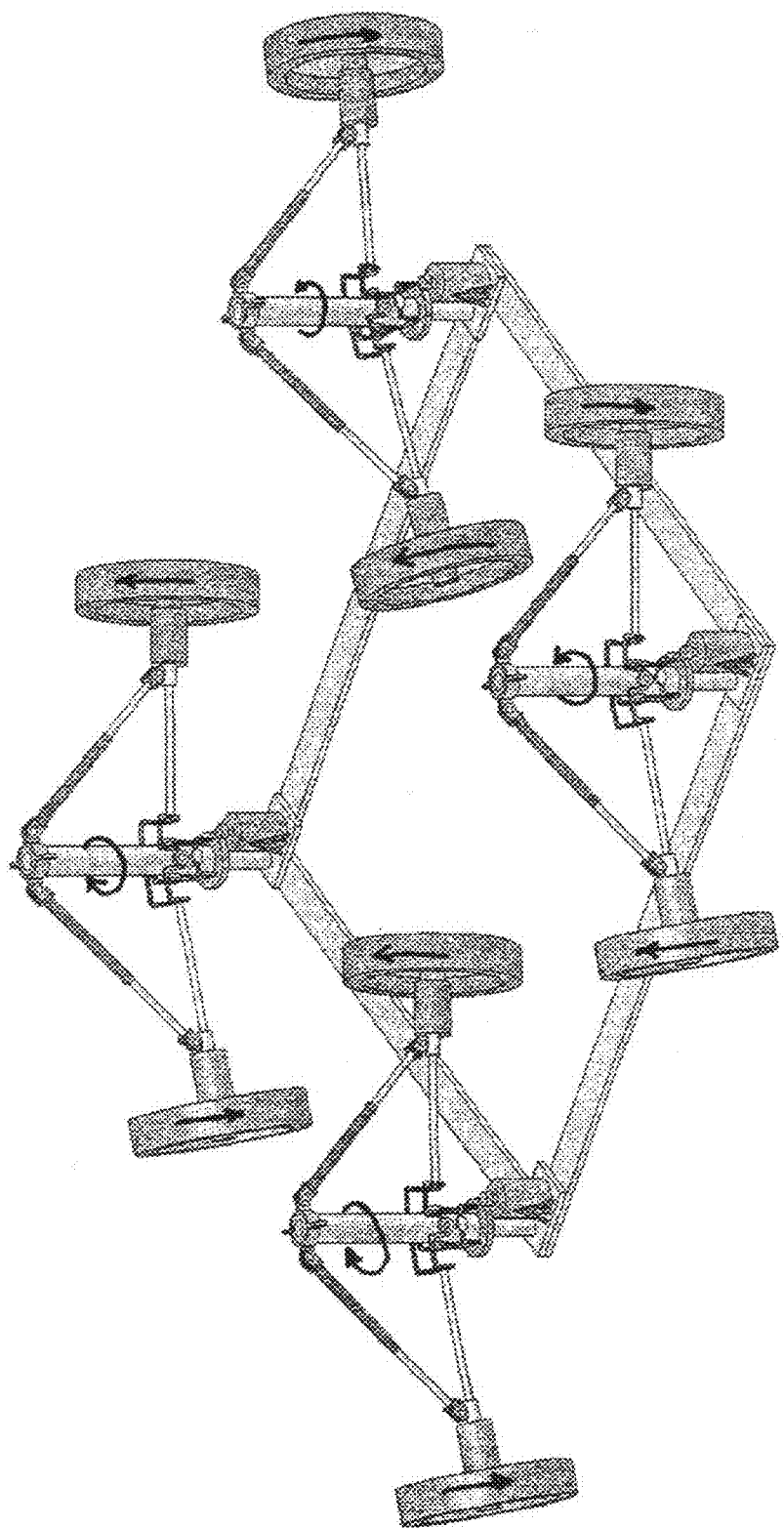
FIG. 26 shows four stacks, each with a single deck, each with only two rotors (not shown at 90 degrees as in FIG. 25).

FIG. 26 shows four stacks, each with a single deck. Each deck has only two rotors instead of four as in FIG. 25. Because there are four separate stacks, two of them can always be providing some upward motion during the reset phase while the other two are precessing. Two of the stacks will be torqued CW and the other two will be torqued CCW, so that the VMT device as a whole is torque compensated. The horsepower of the IPD of FIG. 26 will be about the same as that of FIG. 24 because it has the same number of rotors. If the diagonally opposite stacks are torqued alike, then the rectangular base will not tilt or oscillate, but the base should have sufficient rigidity along its vertical cross section of its members.

Figure 27:
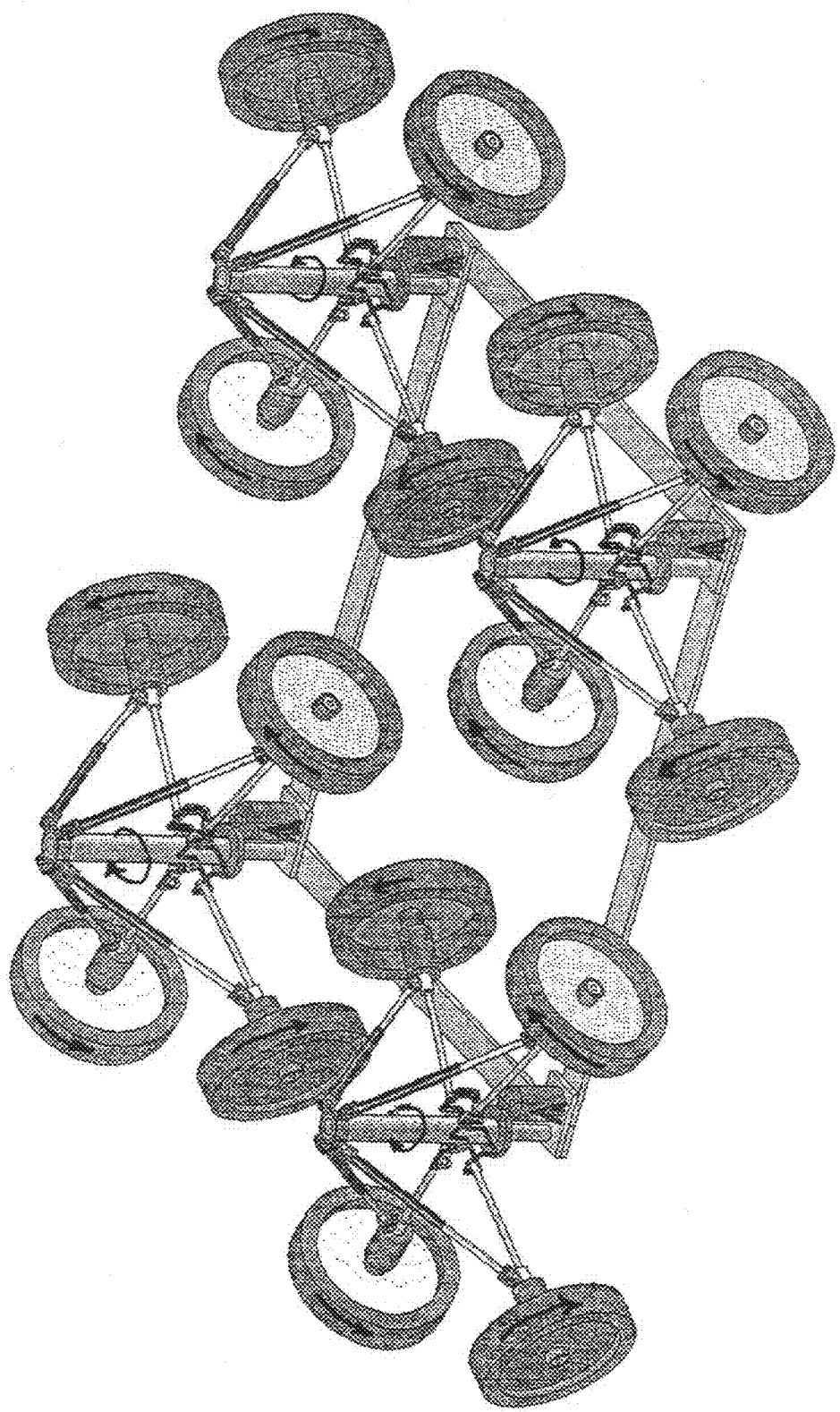
FIG. 27 shows four stacks, each with a single deck of four rotors.

FIG. 27 shows four stacks, each with a single deck, each with four rotors. The operation will be exactly the same as that for the configuration shown in FIG. 26, except that all magnitudes are doubled. As in FIG. 26, two of the stacks will be torqued CW and the other two will be torqued CCW, so that the VMT device as a whole is torque compensated. The horsepower of the IPD of FIG. 27 will be close to twice that of FIG. 26 because it has twice as many rotors. Again, if diagonally opposite as in FIG. 25, the rectangular base will not tilt or oscillate, but the base should have rigidity along its vertical cross section.

Figure 28:
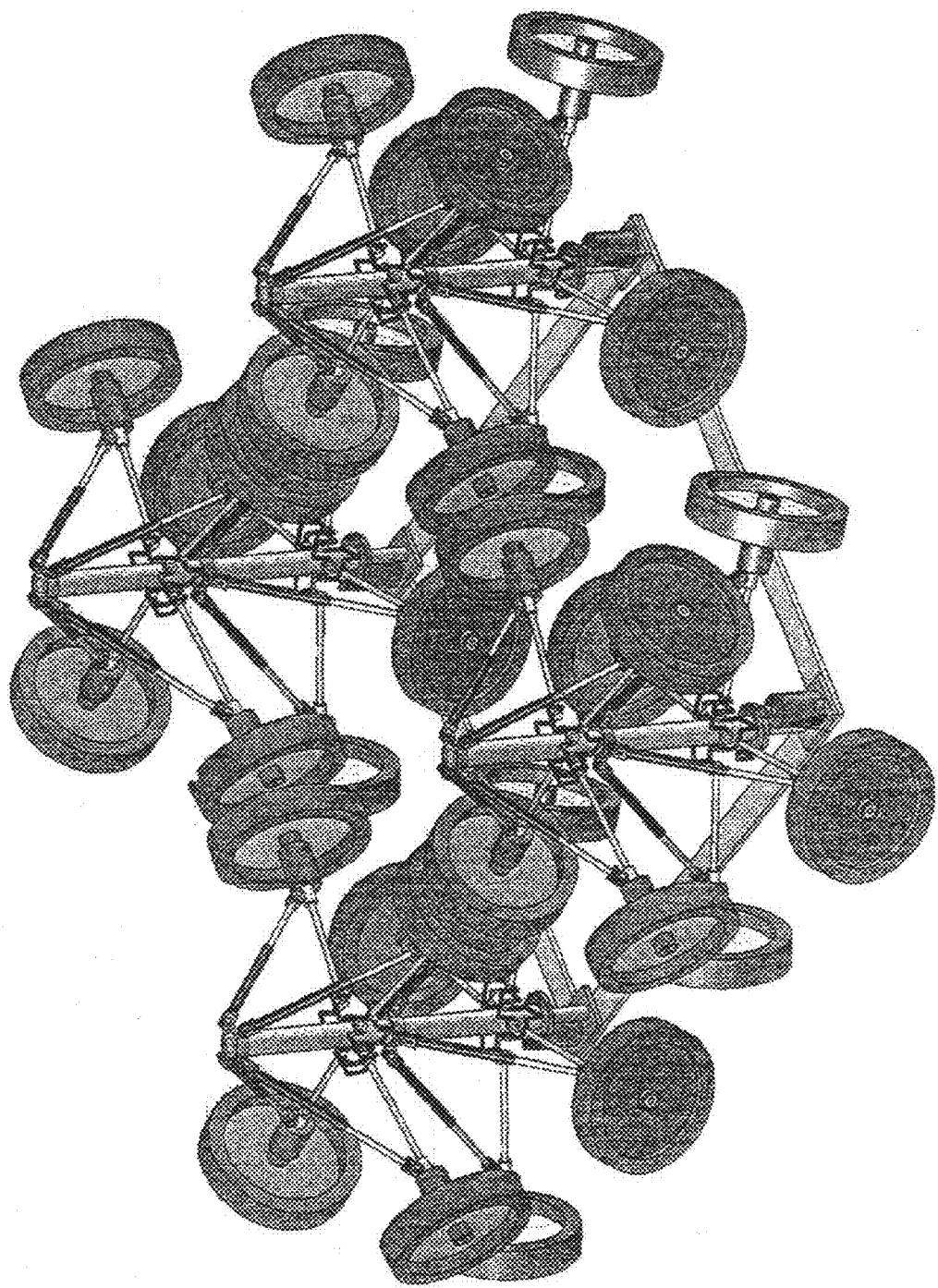
FIG. 28 shows four stacks, each with two decks, each with four rotors.

FIG. 28 shows four stacks, each with two decks, each with four rotors. The operation will be exactly the same as that for the configuration shown in FIG. 27, except that all magnitudes are doubled. Or, operation may be said to be equal to that of FIG. 26, except that all magnitudes are quadrupled. Again, as in FIG. 26, two of the stacks will be torqued CW and the other two will be torqued CCW, so that the VMT device as a whole is torque compensated. The horsepower of the IPD of FIG. 28 will be close to twice that of FIG. 27 because it has twice as many rotors.

FIG. 29 shows the basic IPU cycle for VMT. The central column and the rotor are each assumed to have a mass M so that one-half of the entire vehicle is active mass.

At A in the cycle, the rotor is at its reference position which is as the end of its reset position at −30 degrees below the horizontal. At B in the cycle a Forcing Torque (FT) is applied to turn the central column CCW as viewed from the top. The rotor will then begin to precess upward passing through 0 degrees at C on its way up. Assuming that the rotor is of a thin-rim design and that it loses 80% of its inertia as it precesses upward, its reaction against the pivot point will be only 20% of what it would otherwise have been. Assume that the length of the lever arm from the pivot point to the center of mass of the rotor is length L. Because the pivot point, the lower limit, and the upper limit form an equilateral triangle (60 degrees in each angle), the vertical distance from the lower limit to the upper limit is equal to length L (the length of the lever arm or axle)

At D when the rotor is at its upper limit of +30 degrees, the FT is removed and a reset stroke is applied pushing the rotor down through 0 degrees at E and all the way to its lower limit or reference point at −30 degrees at A. At that point the reset force is withdrawn and the FT is reapplied to the central column and the cycle repeats.

Assume for the sake of an illustration that the lever arm length L is equal to 15 inches. As the rotor precesses upward a length of L with respect to the central column, the reaction against the pivot point is only 20% and so the central column (which represents the vehicle without the rotor) moves downward 3.0 inches. The net movement of the rotor on an absolute scale is the difference or 12 inches causing an upward shift of the center of mass of 6 inches. During the reset cycle the rotor is not precessing and it possesses full inertia, and so when the rotor is pushed down 15 inches with respect to the central column, the reaction against the central column is 100% and the so the central column moves up by the same amount that the rotor moves down, because the rotor and the rest of the vehicle have equal masses (M). During the reset stroke the center of mass of the rotor and the vehicle does not move, and so the net distance moved during the precess-reset cycle is 6 inches upward that was gained during the reset portion of the cycle. The duration of time that it takes to complete one full cycle will determine the average velocity of the process.

FIG. 30 shows the waveforms for the precess-reset cycle for VMT. On the figure, one full cycle may be considered to be shown as 16 units in duration. For the sake of simplicity (and reality), it is assumed that the forcing torque is not applied or withdrawn instantly, but takes one unit of time. So the forcing torque takes one full unit of time to get the rotor up to its full precession angular velocity. The rotor then precesses at full velocity for 6 units of time and then requires one unit of time to drop back down to zero angular velocity as the forcing torque is turned off. In reality, the rise and fall times of the rotor velocity will be much shorter than the proportions shown here, but the proportions shown here are to more simply show and understand the whole cycle on one graph.

Likewise, it is assumed that the reset stroke requires one full unit of time to get the rotor up to its full reset velocity and then again it takes one full unit of time for the rotor to come to a stop at its lower limit as the reset force is withdrawn.

If it were not for allowing a finite time for the rotor to get up to its precessional angular velocity and then to get up to its full reset angular velocity, it would appear as though the rotor would have an infinite acceleration and deceleration before and after its steady-state precessional angular velocity, which is not realistic. Only for a perfect thin-rim rotor could the acceleration and deceleration be infinitely fast, but not faster than the rise times for the electronic torqing pulses could be applied or withdrawn. The rotor angular acceleration is shown in the next figure.

FIG. 31 shows (a) the rotor angular acceleration, (b) the rotor angular velocity, and (c) the rotor vertical velocity waveforms for VMT rotors. As soon as the forcing torque is applied, FIG. 31(a) assumes that the rotor accelerates linearly until it reaches its steady state precessional angular velocity. Similarly, when the forcing torque is removed, it is assumed that the rotor decelerates linearly and that as soon as it reaches zero angular velocity, the reset force is applied and so the deceleration is assumed to continue linearly until the full steady-state velocity is reached. Toward the end of the cycle the reset force is removed and the rotor velocity is assumed to decelerate linearly until its velocity is zero and then the forcing torque is reapplied and the rotor continues to accelerate linearly until it reaches full precessional angular velocity, and the cycle repeats.

FIG. 32 shows the vehicle vertical velocity waveforms for the VMT IPD of FIG. 20. The configuration has a positive velocity for one-half the cycle and a slight negative velocity for the other half cycle. While the rotor angular velocity is linear with respect to angle, with respect to a vertical axis its velocity waveform is that of the cosine of the angle with zero degrees at the horizontal.

FIG. 33 shows the rotor angular position versus time for the VMT IPD of FIG. 20. The angular position varies linearly between +30 degrees and −30 degrees except for the finite turn-around times at each end of the range.

FIG. 34(a) shows the vehicle vertical velocity waveform for a single rotor as in FIGS. 22, 24, and 25. FIG. 34(b) shows the combined vehicle velocity waveform for two sets of rotors that are phased 180 degrees apart. Note that the velocity does not go negative (vehicle reversing direction). FIG. 34(c) shows the combined vehicle velocity waveform for two sets of rotors that are phased 90 degrees apart as shown in FIGS. 27 and 28. Note that the velocity is always moving in a positive direction.

Figure 35B:
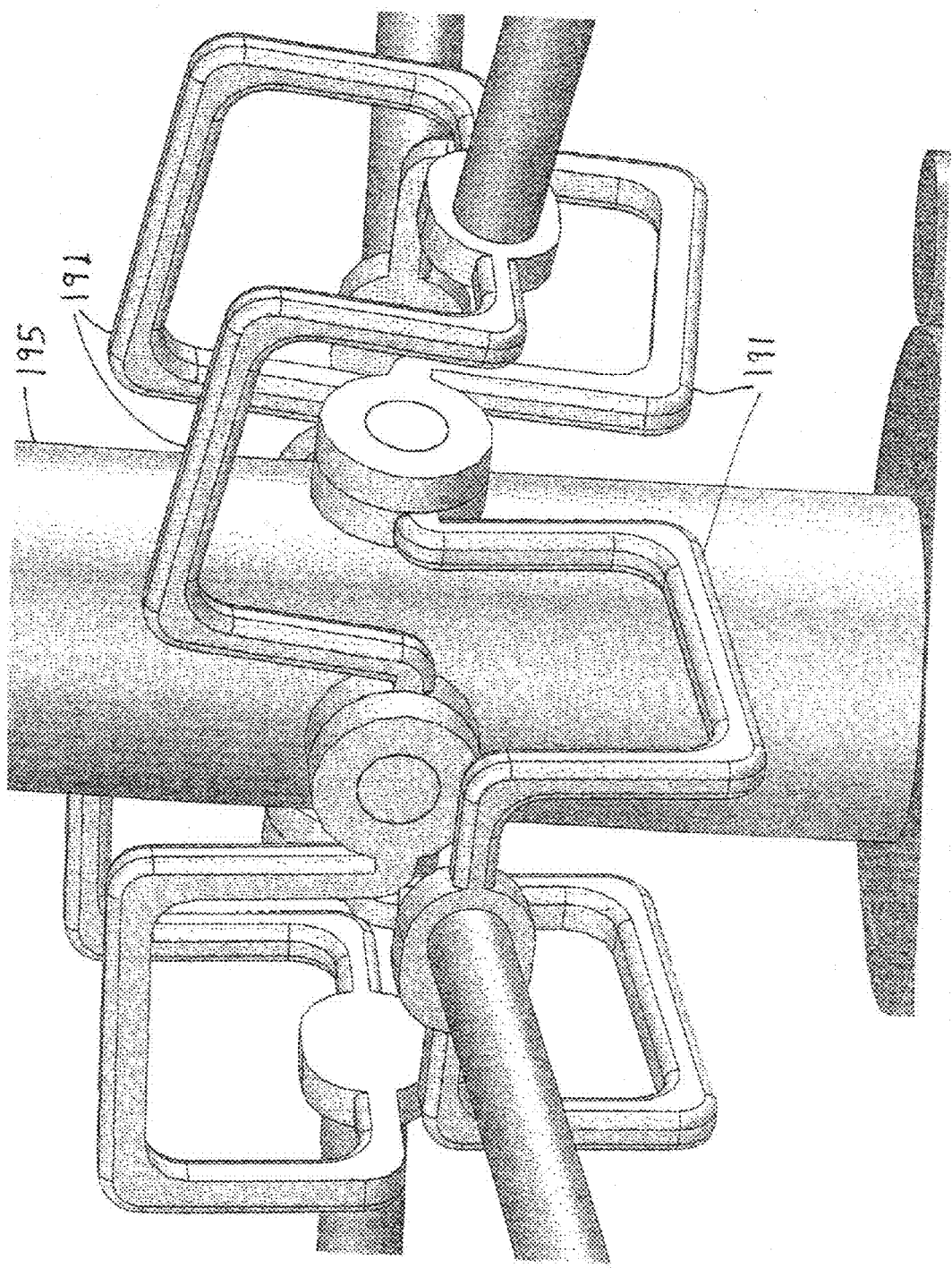
FIG. 35(b) shows a perspective of four yokes connected to one central column.

FIGS. 35(a) and(b) show the design that allows two and four yokes respectively for rotors and axles to have a common pivot point. Yoke 191 in FIG. 35(a) has yoke axle bore 192 for bearings or bushings that are concentric with the pivot point. Assume the thickness of the yoke members is one unit. The two sides of the yoke are not equidistant from the pivot point in the center of a central column. The space between the two sides of the yoke is equal to the width of the central column plus one unit. This is done so that only one yoke design is necessary. The two yokes are placed on opposite sides of the central column as shown in FIG. 35(b). The rotor axles are then connected to one of the two alignment circles 193 shown on the axle end of the yoke. If one yoke is offset slightly to the right of the central column, then the other yoke will be offset to the left. The rotor axles will then be aligned with the one of the two circles that is directly in line with the pivot point.

Each yoke has an arch 194 in its arms. If only two yokes are being used, the arches would not be necessary. But if four yokes are used, the arches would be necessary so that the yoke arms of one pair would not interfere with the arms of the other when moving more than about ten degrees either up or down.

The advantages of this particular yoke design is that the pivot point is exactly in line with the spin axis of the rotor, exactly inline with the vertical axis of the central column, and exactly inline with the axis of the forcing torque, while leaving the inside of the central column completely empty and available for other functions such as having a smaller central column inside of the larger one so that an upper deck could be torqued in the opposite direction in which the lower deck is being torqued. The inner central column would also be empty and allow room to run cables with electrical power and control signals to power the motors for the rotors and operate the reset actuators.

Another advantage is that with the pivot points being inline with the spin axis and the central column axis, the physical analysis for modeling and performance calculations is much simpler. If the pivot point is offset from the spin axis and/or the central column axis, the analysis is considerably more difficult.

FIG. 35(b) shows a perspective of four yokes 191 connected to one central column 195. It can be seen that the rotor axles are slightly to the left or right of the rotor end of the yoke depending on their placement on the central column. It can be seen that when a second pair of yokes are placed on the central column, they are placed "upside down" relative to the first pair so that one pair of yokes will not bump into the other. High arches are needed because for VMT units, the arches have to move up and down by up to 30 degrees. All four yokes are identical in design except that one pair is installed "upside down" compared to the other pair. The high arches as shown plus other dimensions of the yoke are designed to allow each yoke to move up or down about 60 degrees, completely independent of the other three yokes. In other words all yokes do not have to move up or down together. The yoke design allows all four yokes with their axles and yokes to have exactly the same pivot point and exactly the same mass and angular moment of inertia, which is very important for an inertial propulsion system that utilizes many IPDs working together. It is like an eight cylinder V-eight combustion engine. Everything must be perfectly balanced for high speeds or for idling, or the vibrations will destroy the engine. If a pair or quad of yokes were used in HMT applications where the vertical movement of the rotor lever arms is only a few degrees, the high arches shown would be not necessary and only small arches would be sufficient.

Figure 36:
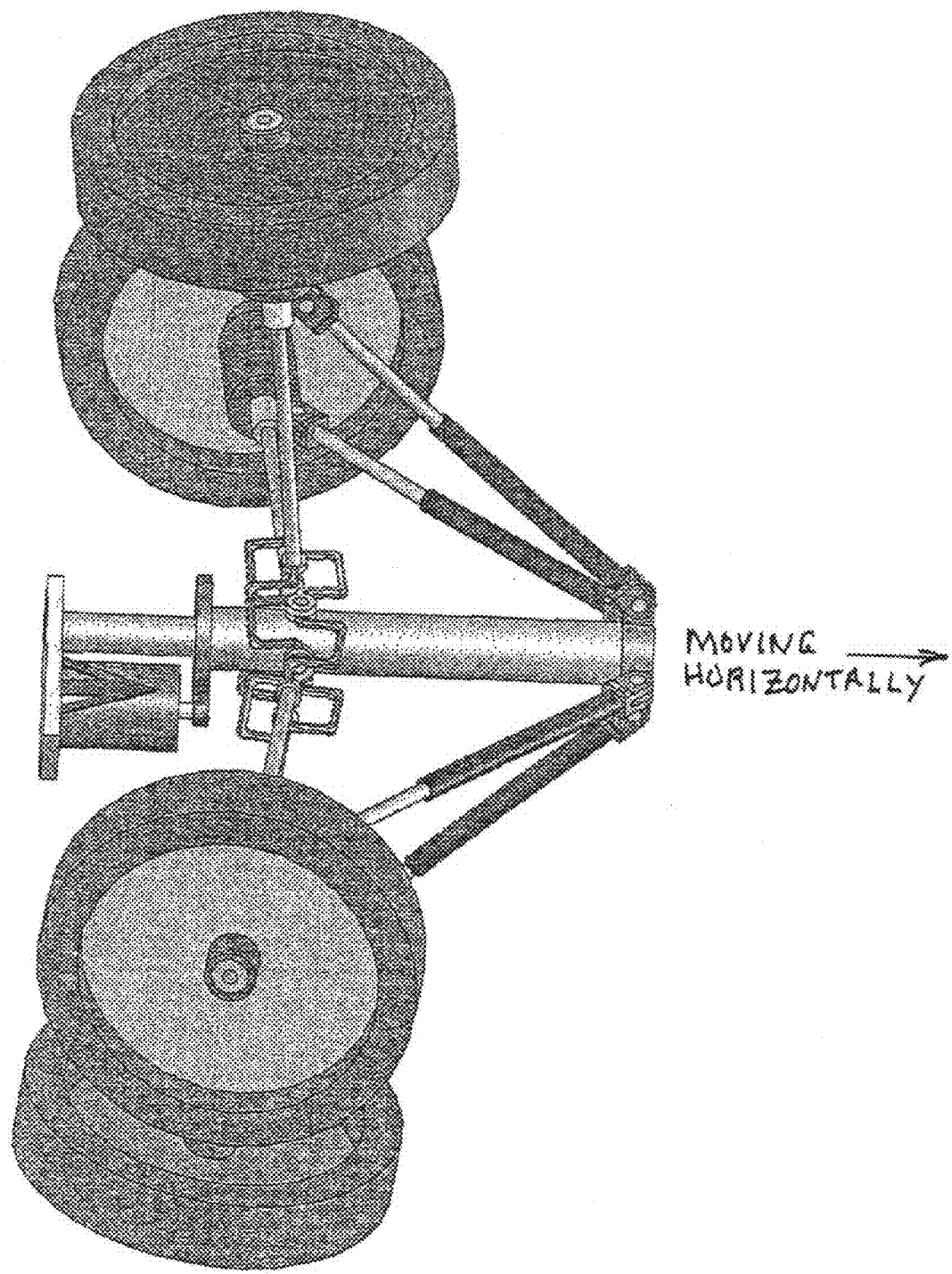
FIG. 36 shows the use of a VMT IPD configuration to obtain horizontal motion in the absence of a gravity field, such as in an orbital path.

FIG. 36 shows the use of a VMT IPD configuration to obtain horizontal motion in the absence of a gravitational field as in orbit or deep outer space. Under conditions of zero gravity, it can produce horizontal or vertical motion, although in deep space horizontal and vertical motion are not defined. A VMT IPD has a maximum achievable velocity which precludes its use in a strong gravity environment such as that on earth. However, in orbit or in free-fall where the force of gravity is exactly cancelled by the orbital centrifugal force, the VMT configuration can be used for velocity in any direction, vertical or horizontal. Also, in deep space where the gravitational field is for all practical purposes non-existent, the VMT configuration can be used in any orientation. In deep space, far from any body, there are always weak gravitational fields and any object is in free-fall, so the effects of the gravitational field can be ignored.

FIG. 37 shows a block diagram that uses a forcing torque that increases with time to obtain vehicle acceleration. Normally a constant amplitude forcing torque is used for the VMT configuration IPD and this will result in a constant velocity output. However, if the input waveform for the forcing torque were increasing linearly with time, so too would the velocity output be increasing as a function of time, within its velocity limits. Preliminary studies indicate that very high velocities might be achievable using nano-rotors where the velocity is proportional to the square of the ratio of the length of a rotor to its diameter. This may be a major step toward achieving sustained acceleration using inertial propulsion.

FIG. 38 shows a block diagram for using shaped reset pulses to obtain constant velocity motion for a vehicle with the embodiments of FIGS. 22 and 25. Since the VMT velocities are obtained from rotors that follow a circular path, the resulting vehicle velocities are the middle portion of the shape of the cosine of an angle. For this reason, a forcing torque could be tailored to provide an output velocity that is essentially constant. Basically a shaped forcing torque that is an inverse cosine wave would produce a linear output velocity.

FIG. 39 shows a block diagram for a VMT electronic analog to a mechanical Inertial Propulsion Device[27]. Almost every mechanical device or dynamical situation has an electronic counterpart. For example, a mechanical force has the electrical equivalent of voltage. Mass has the electrical equivalent of charge. It is possible to design an inertial propulsion unit that is based solely on the electrical counterparts to the mechanical HMT and VMT IPDs presented in this patent application. A VMT device using electrical charges instead of massive rotors, voltages instead of mechanical forcing torques, electromagnetic precession of rotating charges, will be far more compact, weigh considerably less, operate at much higher frequencies, and be completely solid state with no moving parts.

FIG. 40 shows a VMT IPD that uses eight nano-tube rotors. For example, carbon nanotubes have a tensile strength over 200 times greater than that of steel and a density only about one-fourth that of steel. In the form of RPRs (rolling pin rotors) where the velocity achievable is proportional to the square of the ratio of its length to its diameter, such high velocities could be achieved such that other physical limitations of materials would manifest probably themselves before the ultimate velocities of nano-tube rotors could be achieved. A nano-tube rotor would actually be the rotor of a small nano-tube motor. The nano-tube rotors would each be reset with a piezoelectric crystal, much the way mirror segments are positioned on telescope reflectors. The vertical operating range of the rotors would be of the order of +−ten degrees with respect to the horizontal. Although only eight rotors are shown, there could easily be 16 or more nano rotors on a single deck. Nano-controller 200 is shown, but details of the torqing motor, yoke assemblies, and reset mechanism are not shown.

Nano-tube IPDs could be used successfully for small probes or spacecraft commuting between the Space Station and the moon or Mars or asteroids. The small probes could carry miniature cameras, and other small scientific instruments. They could also carry small communication satellite transponders to enhance communication with distant probes on or in an orbit.

Figure 41:
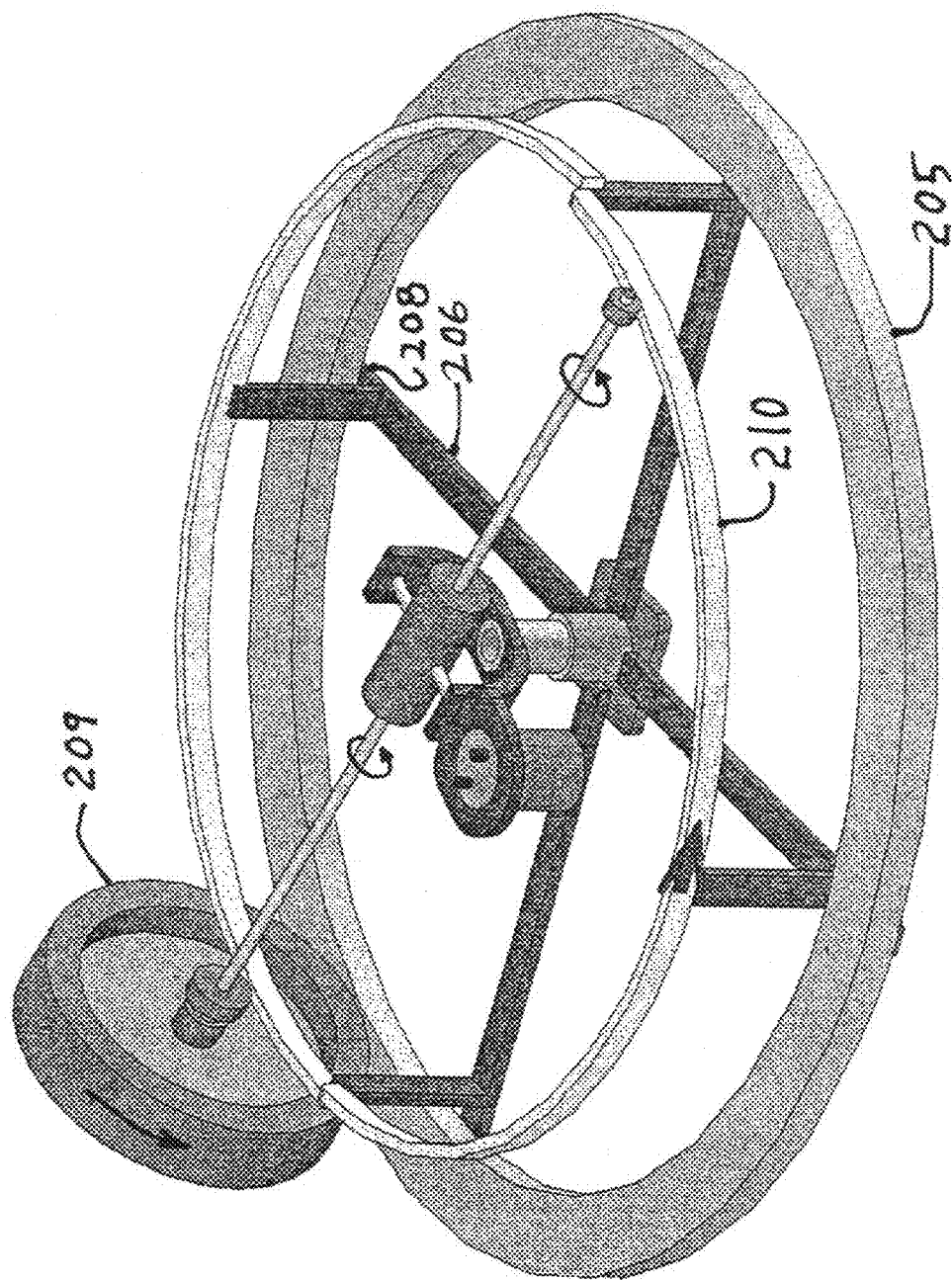
FIG. 41 shows a two rotor HMT IPD with a single ring to take the place of the traction ring and the support ring. The ring is tilted up about one degree at zero degrees (right side), which will become the highest point on the ring, directly in line with the direction of motion.

FIG. 41 shows a two rotor HMT IPD with a continuous ring that serves as the traction ring and a support ring. The ring is tilted up approximately one degree above the horizontal in the direction of motion. The left half of the ring from its low point to its high point (at the right) is the traction portion of the ring. The right half of the ring from its high point to its low point is where the rotor precesses without touching the ring. If it fell out of traction, the ring acts as a safety ring. FIG. 41 is like FIG. 52 except that it has two rotors instead of one. The axles for the two rotors are connected at the pivot point with special yokes as shown in FIG. 6, 7, or 8. The two rotor configuration would have a velocity waveform that goes to zero (but not below zero) between the sine-like waves, but never goes negative, as shown in FIG. 16.

It can be seen that four rotors spaced 90 degrees apart could be placed on the single ring at the common pivot point with four yokes as shown in FIGS. 9 and 35(*b*). This embodiment is the lightest and most efficient configuration for an HMT IPD. The four rotor configuration would have a velocity waveform that never goes to zero as shown in FIG. 17. All multi-deck HMTs should use four-rotor decks of the configuration shown in this figure.

Figure 42:
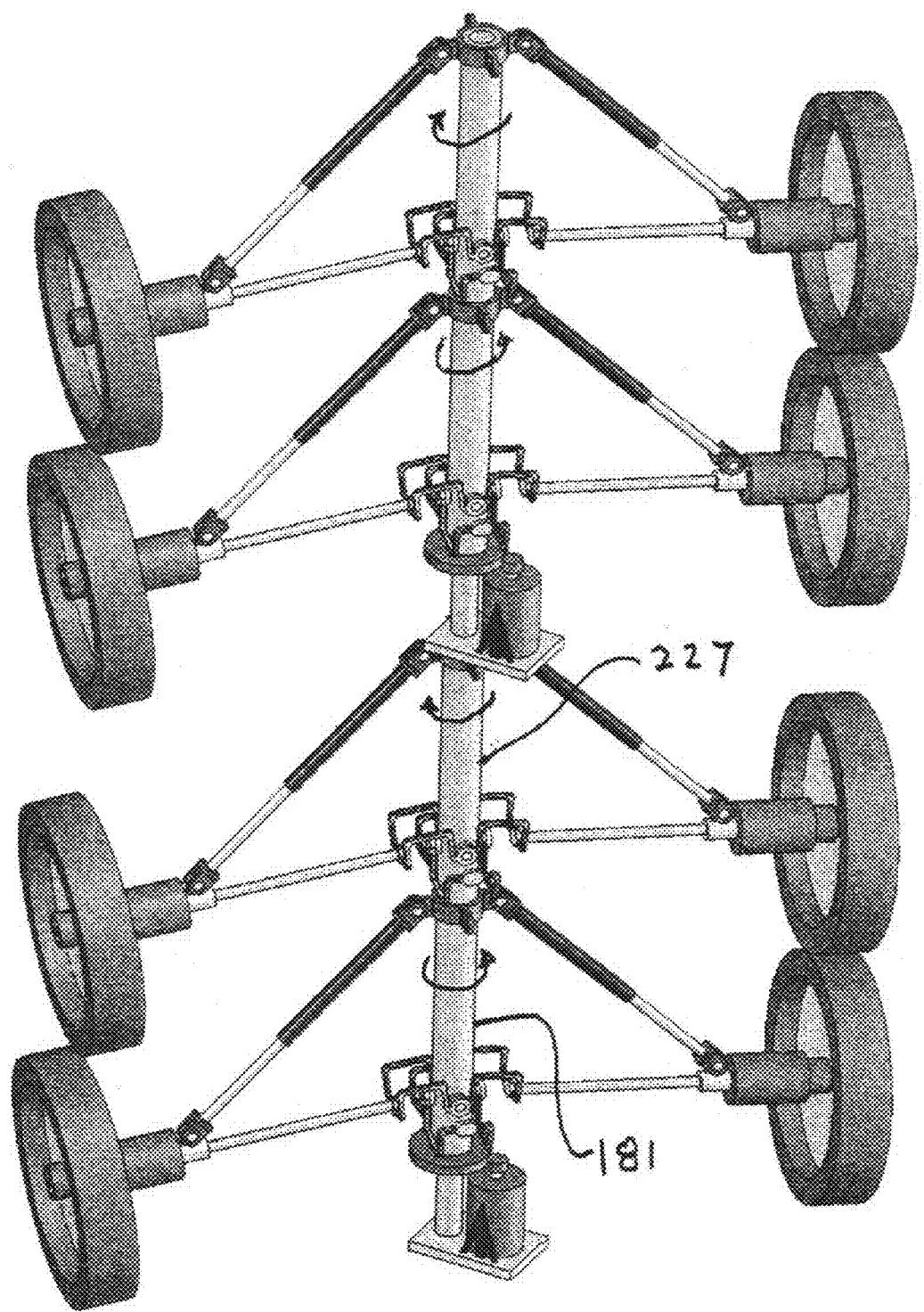
FIG. 42 shows the simplest two-rotor per deck, four deck VMT IPD with Torque Compensation.

FIG. 42 shows a stack of four of the VMT IPDs of FIG. 20. Central column 181 on the bottom deck is torqued CCW while central column 227 on the second deck is torqued CW so that each one cancels out the back-torque of the other one. The third and fourth decks are identical to the first two, except that they are shifted 180 in phase with respect to the first two decks so that some upward motion will be provided at all times (the 180 degree shift in phase is not shown in this figure).

Figure 43:
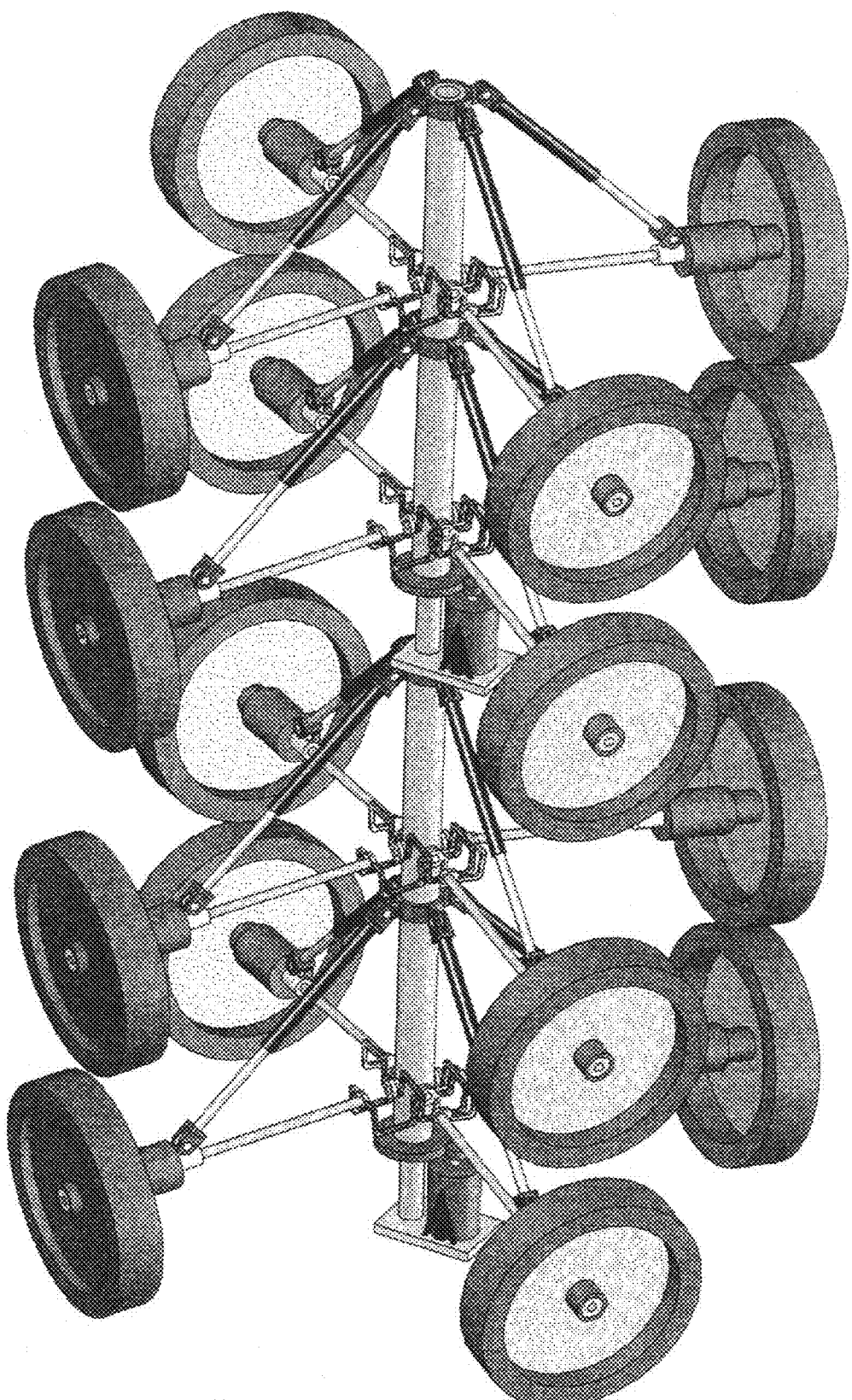
FIG. 43 shows the simplest four-rotor per deck, four deck VMT IPD with Torque Compensation

FIG. 43 shows a stack of four of the VMT IPDs of FIG. 21. The operation of this stack is exactly the same as that for the device in FIG. 42, except that each deck has four rotors instead of two. The stack of four decks has full torque compensation.

Figure 44:
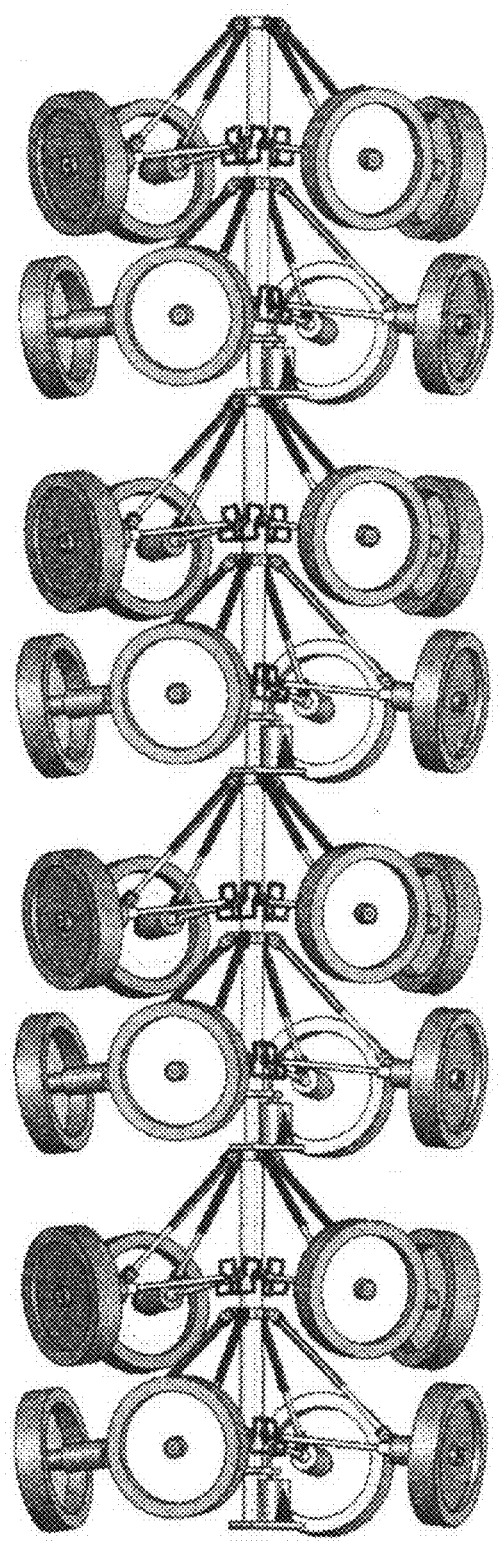
FIG. 44 shows a stack of four double decks each with eight interleaved rotors with Torque Compensation

FIG. 44 shows a stack of four of the VMT IPDs of FIG. 24. The operation of this stack is exactly the same as that for the device in FIG. 43, except that each deck is replaced by a pair of decks, each having four rotors that are shifted 90 degrees with respect to the other four rotors. The second pair provides torque compensation for the first pair and the fourth pair provides torque compensation for the third pair. Because half of the rotors are interleaved with the other four, each pair of decks has a lower profile. It may look like a tall stack, but it cannot tip over because all VMT devices are for use only in the absence of any significant gravitational field, such as in orbit or in deep space.

FIG. 45 shows a more desirable HMT configuration with rotor 101 inside of rings 105 and 107. The combination of a traction ring and a support rings is called Control Ring 111 (the traction ring 105 portion of the control ring is indicated). In order for traction wheel 104 to exert some pressure onto traction ring 105 in order to provide traction, traction support bearing 215 exactly opposite of traction wheel 104 on axle 102 rides on support ring 107 during the traction phase. During the precession phase all three (traction wheel 104, axle bearing 106, and traction support bearing 215) are floating and not in contact with any ring. That condition places constraints on the height of traction ring 105 and support ring 107 and the radii of traction wheel 104, axle bearing 106, and traction support bearing 215. Support ring 107 serves a dual purpose. Besides providing support for traction support bearing 215 it also provides a safety support function in case the rotor fell out of precession and started to drop down, it would limit the downward movement.

Gravitational force vector 225 is exactly vertical by definition and is shown in the figure. By virtue of the phenomenon of precession, the spinning mass precesses exactly perpendicular to the gravity vector. By proper implementation, the phenomenon of precession solves the long sought after method of converting rotary motion to unidirectional linear motion. There is some engineering and physics involved, however. Horizontal precession vector 226 is shown at the tip of the gravity vector.

Normally the Mass Moment of Inertia for the motors and axles in FIGS. 1-5 can be ignored relative to that for the rotor because of their relatively small size. Their effect would only show up in the third or fourth decimal place. However to the extent that the motor and axle are centered about the pivot point, their Mass Moment of Inertia is exactly zero because each half cancels out the other half. The same is true for the motors that are gimbaled at their centers of mass. This is an ideal condition for those types of HMT designs.

FIG. 46 shows how adding roll bearing 219 and pitch gimbal 217 to the outside of control ring 211 (also bumper 218) allows the precessing rotor of an HMT IPD to always remain level by virtue of the fact that gravitationally induced precession can only be in a horizontal plane. The supporting structure including frame, wheels, etc is not shown in this figure. What is shown are the critical elements that comprise what might be called the "engine" of the HMT inertial propulsion device. Roll bearing 219 and pitch gimbal 217 will allow precession in the horizontal plane to be independent of any roll or pitch maneuvers by the vehicle containing the HMT IPD. For example, if a vehicle were climbing a hill with a three degree upgrade, the horizontal motion developed by the IPD would be equal to the maximum velocity of the IPD times the cosine of the three degree angle and the component of the IPD maximum velocity being used to allow climbing the upgrade would be equal to the sine of the three degree angle times the maximum velocity of the IPD. If the vehicle were undergoing a roll maneuver, the maximum forward velocity would still be equal to the cosine of the pitch angle times the maximum IPD velocity because the forward direction is not affected by a roll maneuver. It should be noted that if a plane were in a banking maneuver or a vehicle were on a curve where the road-bed was not horizontal and centrifugal force were involved, the plane of precession would be represented perpendicular to a vector representing the sum of the gravitational field and the centrifugal force. For all practical purposes, the effect of a centrifugal force is indistinguishable from the effect of a gravitational field. However, in reality, all gravitational forces act radially inward while all centrifugal forces act radially outward. At a single point, the Principle of Equivalence considers the two to be indistinguishable. However, the mass sensor, also called the gravity gradient sensor, invented by Robert Forward[18], in conjunction with other equipment, can be instrumented to sense the difference. In summary, since the HMT shown in this figure is the motive force that moves the vehicle, it is heavy duty and structurally designed to propel the vehicle and serves far more functions than simply establishing the gravitational horizontal. It is what keeps the vehicle on the level and moves the vehicle, instead of just sensing the level.

Normally the Mass Moment of Inertia for the motors and axles in FIGS. 1-5 can be ignored relative to that for the rotor because of their relatively small size. Their effect would only show up in the third or fourth decimal place. However to the extent that the motor and axle are centered about the pivot point, their Mass Moment of Inertia is exactly zero because each half cancels out the other half. The same is true for the motors that are gimbaled at their centers of mass. This is an ideal condition for those types of HMT designs.

FIG. 47 shows a different HMT single rotor configuration with motor 227 near rotor 228 and not requiring a traction ring on the opposite side of a support ring. To get the direction of the traction movement in the CCW direction, the direction of axle 233 has to be reversed. This is accomplished with idler axle 221 and idler bearing 222. Idler bearing is a bearing with a high-traction rubber type of circumference on it so that it is rotated by its contact with axle 233 and it in turn propels the rotor in the CCW direction by its contact with traction ring 230. In this figure the rotor is in the precession mode and so idler bearing 222 is not touching traction ring 230, but in FIG. 48 the rotor is in the traction mode and it shows idler bearing 222 riding on traction ring 230.

FIG. 48(*a*) shows a different single rotor configuration with motor 227 near the center and not requiring a traction wheel on the side opposite the rotor. The rotor is in the traction mode with idler bearing 222 riding on traction ring 230. The rotor pivots in elevation about the pivot point with hinge 235. Support plate 223 takes the place of a support ring like support ring 107 in FIG. 1 and prevents hinge 235 from dropping down too low in the event that the rotor fell out of precession. The rotor pivots in the horizontal plane with central column post 236 inside of central column 237. Beam 229 holds the gimbal 234 connected directly to the case of motor 227 which is secured to hinge 235. The rotor and its axle rotate only inside of gimbal 234. This embodiment has been termed the FGD (Fiala Gravity Drive). It is preferred to that shown in FIG. 47, because the motor (passive mass) is near the pivot point, or it can be gimbaled and centered exactly at the pivot point as shown in FIG. 48(*b*). FIG. 48(*b*) has the advantage that the rotor is centered at the pivot point (PP) and contributes zero angular momentum to the axle and rotor combination.

FIG. 49 shows hollow cone-shaped rotor 216 inside of the control rings. A cone-shaped rotor might be used in certain flying saucer applications. The control rings are supported by four struts 231 with wheels oriented for motion to the right.

Normally the Mass Moment of Inertia for the motors and axles in FIGS. 1-5 can be ignored relative to that for the rotor because of their relatively small size. Their effect would only show up in the third or fourth decimal place. However to the extent that the motor and axle are centered about the pivot point, their Mass Moment of Inertia is exactly zero because each half cancels out the other half. The same is true for the motors that are gimbaled at their centers of mass. This is an ideal condition for those types of HMT designs.

FIG. 50 shows a flying saucer configuration 232 using an HMT cone-shaped rotor 231 inside of the control rings. This configuration of rotor lends itself to a flying saucer shaped vehicle and hollow cone-shaped rotor 231 being a thin-rimmed rotor, will give a higher velocity with its lighter "engine". Although not shown in this figure, the HMT IPD "engine" would be gimbaled with pitch gimbal 217 and roll bearing 219 as shown in FIG. 46. Motor-cabin gimbal 238 connects the crew cabin directly to the whole HMT IPD structure so that the cabin remains horizontal due to the self-leveling capability of the HMT IPD. If the craft were undergoing centrifugal force as in a turning maneuver, the cabin would remain level according to the "new" vertical that is the resultant of the actual gravitational field and the instantaneous centrifugal force.

Normally the Mass Moment of Inertia for the motors and axles in FIGS. 1-5 can be ignored relative to that for the rotor because of their relatively small size. Their effect would only show up in the third or fourth decimal place. However to the extent that the motor and axle are centered about the pivot point, their Mass Moment of Inertia is exactly zero because each half cancels out the other half. The same is true for the motors that are gimbaled at their centers of mass. This is an ideal condition for those types of HMT designs.

FIG. 51 shows a Control Ring 214 which is comprised of a traction ring 105 and a support ring 107 mounted on a bumper ring 218. The bumper ring will prevent a spinning rotor from touching any object during horizontal motion.

FIG. 52 is similar to FIG. 48B, except from a slightly different perspective and it shows the traction ring and the support ring as one complete ring (part 240). It is intended to show a preferred configuration for an HMT prototype. Except for the traction wheel 222, it may be considered as an inertial propulsion device with only one moving part. As the rotor is propelled counter-clockwise with full inertia opposite the traction ring, the reaction to this motion will move the chassis to the right. Then when the rotor precesses CCW from the right to the left with reduced inertia, the reaction to this motion will move the chassis only part way to the left, but not all the way back, with a net movement to the right. Traction & support ring 240 is tilted at approximately 1 degree above the horizontal shown at the right side of the figure. During traction the rotor will be crawling up the one degree angle for 180 degrees and it will precess for 180 degrees on the down-slope of the traction and support ring 240. It can be seen that this configuration can have a second rotor exactly 180 degrees off from a first rotor. When one is tractioning the other is precessing, so that there will always be continuous motion of the carriage. A two-rotor configuration is the minimum configuration for a prototype model. It can further be seen that this configuration could hold four rotors (as shown in FIG. 9), or six, or eight equally spaced rotors around a common pivot point, except that the configuration is much simpler. Each added pair of rotors increases the "horsepower" of the unit.

FIG. 53 shows how the mass of a starship increases as the velocity approaches the speed of light and then decreases inversely as the velocity for v>>c, but becomes imaginary at speeds above the speed of light. This may sound impossible, but that is exactly what Einstein's Special Theory of Relativity predicts according to the equation $m=m_0/\sqrt{(1-v^2/c^2)}$ where $m_0$ is the original mass of the starship, m is the mass as a function of the velocity v, and c is the speed of light. At a 1000 times the speed of light, the mass of the starship is only one-thousandth of its original mass. If the starship originally weighed 1000 tons, it would now weigh only one ton, which may be considered 'good news'. With the mass being imaginary above the speed of light, that is no different than the fact that in electrical engineering, voltage, current, and impedance all have imaginary components called the reactive components.

FIG. 54 is a lot like FIG. 53 except that instead of showing how the mass varies as the velocity increases, it shows the kinetic energy of the spaceship increasing as its velocity increases. The kinetic energy also becomes imaginary after passing the speed of light but instead of decreasing inversely with the velocity, it increases linearly with the velocity for v>>c.

The Physics of Motion by Mass Transfer for FIG. 2(a)

Refer to the embodiment shown in FIG. 2(a). 0 degrees (which is also 360) is on the right side of the figure and 180 degrees is on the left side. Motor 103 has its axle 102 going out of both ends. Rotor 101 is mounted on the left side of the motor axle 102.

Rotor 101 will precess from 180 degrees to 360 degrees (360 degrees is the same as 0 degrees) without traction wheel 104 touching traction ring 105. Rotor 101 has most of its mass in its outer rim. If all the mass of the rotor were in an infinitely thin outer rim and spokes or a thin inner rim, the rotor might theoretically lose all of its inertia during precession in the direction of the precession. However, such a perfect thin-rim rotor is not physically possible and with the approximate proportions shown in the figure, the rotor should lose approximately 80% of its inertia. In precessing from 180 degrees to 360 degrees in a CCW direction, the rotor will retain only 20% of the inertia that would normally be associated with its mass. For this reason, as it is precessing to the right, the reaction against the pivot point and hence against the central column 113 and hence against the "carriage or vehicle" 111 will be only 20% of what it would otherwise have been. Due to this reaction, while the rotor is precessing to the right, the carriage will move to the left slightly. On FIG. 2(a), when the rotor gets to 360 degrees, axle bearing 106 will begin to ride on support ring 107 and this will stop precession. Simultaneously traction axle 116 will begin to ride on traction ring 114 at 180 degrees. The traction axle riding on the traction ring from 180 degrees to 360 degrees will propel the rotor from 0 degrees to 180 degrees with the rotor exhibiting full inertia because it is not precessing. Therefore, while the rotor is propelled from 0 degrees to 180 degrees (moving to the left), the reaction to this motion will move the carriage forward (to the right). The net result after one full cycle of precession and traction is that the complete assembly will have moved a net movement forward. While the rotor is being propelled by friction from 0 degrees to 180 degrees, motor 103 will supply any energy losses and keep the rotor turning at essentially a constant speed. If a digital stepping motor is used, the rotor speed will remain constant.

On FIG. 2(a), when axle bearing 106 is riding on support ring 107 and traction axle 116 is riding on traction ring 114, the gimbal 109 is about 0.002 inches lower than normal so as to exert some pressure of traction axle 116 onto traction ring 114 to insure good traction.

An important design consideration is to make the diameter of the traction axle 116 with the correct value so that the traction angular velocity is equal to the precession angular velocity. That way the rotor will experience essentially constant precession angular motion and will travel around and around in uniform circular motion (UCM). The equations for setting the traction axle diameter to the correct value will be discussed later on in this application. A simple solution is to set the rotor spin angular velocity such that the diameter of the traction axle is exactly equal to the diameter of the rotor spin axle. That way no machining has to be done to the spin axle to increase or decrease its diameter at the location of the fraction axle bearing.

On FIG. 2(a), a safety plate 115 will prevent the rotor-axle-motor from dropping down too far down in the event that the rotor fell out of precession. The leading edge of traction ring 114 at 180 degrees is tapered so as to insure that traction axle 116 will start to ride on the fraction ring. Similarly, the leading edge of support ring 107 at 0 degrees is tapered to insure that axle bearing 106 will start to ride on it.

FIG. 2(a) is one of the simplest possible implementations of a horizontally moving inertial propulsion device. The principles of precessing with reduced inertia and being propelled with full inertia are the same for all HMT configurations. However, the IPD in FIG. 13 is implemented quite differently.

Rotor 168 in FIG. 13(a) is a solid disk rotor instead of a thin-rim rotor. This means that at the most, it can lose only 50% of its inertia, thus making it less efficient as an HMT device. The equations for calculating the loss of inertia are given later on in this application.

Assume that a table-top HMT IPD weighs only one pound. If it moves forward a net amount of 1 inch each cycle, the reaction to this motion is not immediately apparent. It will appear as though there is no local reaction. However, the law of conservation of angular momentum is not violated. The reaction will be transmitted to the earth via its gravitational field. If the IPD moves forward by one inch, the earth will rotate backward an infinitesimal amount. The earth weighs approximately $1.3 \times 10^{25}$ lbs and so the reaction of the earth can be calculated, but do not try to measure it. Technically, the angular momentum of the earth-moon system is conserved, but calculating the effect of the IPD motion on the moon is left as an exercise for the student.

The Physics of Motion by Mass Transfer for FIG. 13

Referring to FIG. 13(a), rotor 168 is shown towards the end of its reset stroke, during which time it exhibits it full inertia and angular momentum. When the rotor and bearing 172 on axle 169 meet up-lift 174, the momentum from the retrace movement will start bearing 172 to roll up the semi-circular up-lift and when it has past the half-way point on the up-lift it will begin to reverse direction and after getting to the top of the uplift it will become airborne and will no longer be supported. The rotor will then begin to precess in a CCW direction. The energy required to travel up up-lift 174 will come partly from the CW momentum and partly from the motor maintaining a constant speed. Ultimately all energy required for the HMT process comes from the electric motor. When the rotor and axle bearing start up the up-lift, due to its CW momentum, it will create an impulse which will jerk the chassis further in the CW direction.

After reinitiating precession the rotor will precess in a CCW direction for about 60 degrees at which point it will meet semi-circular down-track 173 and this will stop the precession when bearing 172 is half-way down down-track 173, it will begin to reverse direction while creating an impulse which will jerk the chassis slightly to the right (CCW). The down-track will then guide bearing 172 down so that V-pulley 170 will make contact with V-groove track 171. The rotor will then be propelled 60 degrees in a CW direction until it encounters uplift 174 and the cycle repeats.

When the rotor reinitiates precession at up-lift 174, it drops very slightly in elevation and loses a small amount of gravitational potential energy that is converted to angular momentum of the rotor in the CCW path in order to sustain precession. For example, if a one pound object falls one foot, it loses one foot-pound of gravitational potential energy. The small angle delta ($\Delta$) that the rotor drops in order to initiate precession may be calculated from the equation:

$$\Delta = I_P * \tau / L_O^2 = I_P * T / L_S^2,$$

where the angle $\Delta$ is in radians, $I_P$ is the mass moment of inertia about the precessional axis, T is the gravitational torque on the rotor about its pivot point, and $L_S$ is the angular momentum of the rotor about its spin axis. The foregoing equation can be derived from the discussion by Dr. Richard Feynman[19] of the initiation of precession in chapter 20 of volume I of his three volume series titled, Lectures on Physics. This formula has also been verified in personal correspondence[20].

Original tests were run without an electric motor and under "hand-windup good luck" conditions the rotor made up to 15 precession and reset cycles before winding down and failing to precess. Forward net motion with the HMT device of FIG. 13 was verified in the laboratory. This verifies that there is a net difference in the inertia for a precessing rotor compared to a non-precessing rotor. This net difference in inertia will be true whether it is for HMT or VMT, both being dependent on precession, HMT on natural gravitational torque and VMT on man-made forcing torque. The electric motor also replenishes all kinetic energy or angular momentum of the rotor lost due to air resistance, and friction due to the universal joint 201, and friction between the V-pulley and the V-groove track.

Point A may be considered to be at an angle of $-30°$ on the horizontal plane and point B at $+30°$. Because the cosine wave path for the $60°$ from $-30°$ to $+30°$ is not a straight line, there will be a small lateral reaction to the base as the rotor begins and ends it reset action. However, due to the fact that the base is mounted on four wheels, all oriented for forward motion, all actual motion is limited to only the forward or reverse direction, and there is no evidence that small lateral reactions are of any negative consequence in earthbound applications where wheels provide direction.

There is no indication that any centrifugal force would have any undesirable effect. In theory, a perfect rotor would have all of its mass in a thin rim at its circumference. In such a theoretical case, all angular momentum and centrifugal force[20.5] might are decreased significantly during precession when the rotor spin velocity is much greater than the precessional angular velocity.

Analysis of Precession Based Motion

Precessional angular velocity is inversely proportional to the spin velocity of the rotor according to the following equation:

$$\omega_P = gL/R^2 \omega_S,$$

where $\omega_P$ is the angular velocity of precession in radians per second, L is the distance in meters from the center of mass of the spinning rotor to the pivot point, R is the radius of the rotor, and g is the force of gravity at the surface of the earth in meters squared per second.

The maximum linear velocity of a precession based VMT IPU with a total of eight rotors is given by the following equation:

$$V_{IPU} = 522.00 (L/R)^2 f,$$

where $V_{IPU}$ is velocity in feet per second, L is the length of the axle or lever arm in feet, R is the radius of the solid disk rotor in feet, and f is the rotor spin angular velocity in cycles per second.

The maximum velocity achievable by motion by mass transfer is limited by two factors, the precessional angular velocity and the retrace velocity. If the rotor precesses too slowly, that clearly slows down the achievable forward velocity. If the reset action were too slow, that also will limit the forward velocity. Since precessional angular velocity is inversely proportional to the rotor spin angular velocity, the slower the rotor spin velocity, the faster will be the precessional angular velocity which results in the circumferential velocity of the precessing rotor. It follows that the lowest rotor spin velocity that will still sustain quality precession will contribute to the highest forward velocity. This is counter intuitive, but that is the case. The other factor is the velocity of the reset action. Clearly this is also a function of the rotor velocity and ultimately of the "horsepower" of the electrical motor driving the rotor and the reset actuator. However, the retrace velocity in relation to the rotor velocity can be controlled by the diameter of pulleys and/or gears in a number of ways. Those skilled in the art will realize the various means by which the retrace velocity may be controlled. It is clear that resetting the rotor could be done quicker than by traction alone, but this would then no longer allow the rotor to move with uniform circular motion (UCM), which is a highly desirable property.

The embodiment of FIGS. 3, 5, 6, 7, and 8 can provide unidirectional horizontal motion, but the velocity will drop to zero twice each cycle. The embodiments of FIGS. 9, 10, and 11 will provide velocity with a ripple factor of only +−3.3% for a path of only 90° of its own travel, or about one-half of the motion of a cycle if the reset action time and the precession times are equal. For a precession-retrace path from −30° to +30°, the ripple factor is calculated as follows:

Cos(−30°)=0.866, Cos(0°)=1, Cos(+30°)=0.866,
(1.000−0.866)/2=0.134/2=+−0.067=+−6.7%

It can be seen that two or more separate units, properly phased, could provide reasonably uniform and continuous velocity. Two units could be identical or mirror images of each other and placed anywhere on the same base. If two units were mirror images of each other and were in phase, the lateral reactions would be cancelled. The law of conservation of angular momentum does not care where the two units are located relative to each other, just so they are both fixed to the same base. Multiple units could be stacked vertically on the same central column axis or placed separately any place on the base. If two units were operating in phase and producing the same move and stop actions, then additional units could be added in sets of two and properly phased until continuous motion was achieved.

As given previously, the precessional angular velocity is given by the equation $\omega_P = gL/R^2 \omega_S$. In FIG. 20 and subsequent VMT embodiments, if rotor 177 and its rotating axle 179 were perfect and the axle and any associated gimbal and other passive mass were of zero mass, upon the application of a forcing torque the rotor would come up to its precessional angular velocity essentially instantaneously. It would accelerate up to its steady state angular velocity in essentially zero time, which is a very high rate of acceleration. However, in real life, the rotor and its spinning axle (the active mass) must drag along and accelerate up to the precession angular velocity all of the passive mass that is riding along with the active mass. The passive mass includes the motor, base, the gimbal, and the pivot point.

The time that it takes for the rotor and its associated passive mass to accelerate up to the precessional angular velocity can be calculated as follows: (1) Determine the total mass moment of inertia with respect to the pivot point for the rotor and all of its associated active and passive parts (this will be a tedious procedure). (2) Determine the precessional angular velocity for only the active mass (rotor and rotating axle) by dividing the gravitational torque by the product of the rotor spin velocity and the mass moment of inertia for only the active mass. (3) Then determine the angular acceleration by dividing the gravitational torque by the mass moment of inertia of the active and passive mass combined (obtained from (1)). To get the time required to accelerate up to the precessional angular velocity, divide the precessional angular velocity obtained from (2) by the acceleration obtained from (3).

In real life, the finite time that it takes for the rotor to come up to the full precessional angular velocity will produce some ripple on the velocity produced by MMT. However, such velocity fluctuations can be reduced by controlling the start and stop times of the multiple units and by springs and shock absorbers. Those skilled in the art will realize how to smooth out small velocity variations.

Equations for the Reduced Angular Momentum

The equation for the moment of inertia (I) for a hollow cylinder is $I = m(r_i^2 + r_o^2)/2$ where m is the mass of the cylinder, $r_i$ is the internal radius, and $r_o$ is the outer radius. If $r_i$ is zero, the cylinder is a solid disk. If $r_i$ is slightly smaller, but approximately equal to $r_o$, then the cylinder has a thin shell with a mean radius r and the moment of inertia (I) is $I = mr^2$. The inventor postulates that the cylinder with a very thin shell will approach a high "quality" rotor that will have essentially a total loss of inertia during stable precession[20.5]. It is further postulated that quality (Q) of the rotor will degrade as the inner radius $r_i$ approaches zero and the rotor becomes a simple solid disk. Accordingly, the quality (Q) of a rotor would take the form of $$Q = (m(r_i^2 + r_o^2)/2)/(mr_o^2) = (r_i^2 + r_o^2 = (1 + (r_i/r_o)^2)/2$$

This equation states that the quality factor Q of a rotor with a thin outer shell would be unity and for a solid disk, the quality factor would be 0.50. The variable term in the equation for Q varies as a function of the square of the ratio $(r_i/r_o)$. This is intuitive and reasonable. It means that a stably precessing solid disk rotor would have lost only one-half its inertia and a thin-shelled rotor would lose essentially all of its inertia. The equation for Q assumes that the rotor spin velocity is equal to or greater than approximately 100 times the precessional angular velocity. As the ratio drops below approximately 100, the quality Q drops toward zero approximately exponentially and the rotor will exhibit increased inertia The quality factor (Q) is different for different shapes of rotors. For a hoop (torus or donut) shape the equation will be different. For a torus where the two defining radii are $r_i + r_o$ and where $r_i$ approaches zero as the thin hoop shape is approached, the quality factor $Q = (1 + (r_i/r_o)^2)/2$, which is of exactly the same form as for a thin-rim rotor. For a hoop or torus, radii $r_i$ and $r_o$ are defined differently than for a disk shaped rotor.

For a toy gyroscope with a rotor that may be considered to have the shape of a torus, and a solid disk rotor of the same diameter and mass, where the torus might be expected to have a higher quality factor than the solid disk, preliminary but rough test results indicate agreement with the above quality factor expressions within 20%. It is anticipated that precision test results of the quality factors for a solid disk rotor and a hollow disk rotor of the same mass would agree well with the above equation $Q = (1 + (r_i/r_o)^2)/2$ within 2%.

Calculating Traction Axle Diameter

To design the traction angular velocity to be exactly equal to the precession angular velocity, let
$\omega_S = \omega_{SPIN}$ = rotor angular velocity (rad/sec)
$L_R$ = length of axle from pivot point to center of rotor (ft)
M = Mass of the Rotor (Kg)
g = acceleration of gravity at surface of Earth = (32.2 ft/sec$^2$)
W = Weight = Mg (lb)
R = Radius of the Rotor (ft)
$L_T$ = length of axle from pivot point to center of traction axle (ft)
$I_S = MR^2/2$ = Mass Moment of Inertia of Rotor = mmoi (lb-sec$^2$-ft)
$\omega_P = \omega_{PRECESSION}$ = precession angular velocity (rad/sec)
$\omega_P = L_R M g/(I_S \omega_S)$ (rad/sec)
$d_T$ = diameter of traction axle = $L_T (\omega_P/\omega_S)$ (ft)
$d_T = L_T L_R g/(I_S \omega_S^2) = L_T L_R M g/((MR^2/2) \omega_S^2) = 2L_T L_R g/((R^2) \omega_S^2) = 2L_T L_R g/(R \omega_S)^2$
Rad = radian = dimensionless, L = Length
Dimensional analysis: $d_T = 2L_T L_R g/(R \omega_S)^2 = (L L L/s^2)/(L^2 (rad/s)^2) = L/(rad)^2 = L$ = Length = correct
$\omega_T$ = angular velocity of the Traction Axle in the Horizontal plane = $\omega_S (2\pi d_T/2\pi L_T)$ (rad/sec)
$\omega_T = \omega_S (d_T/L_T)$ (rad/sec)
For Natural Precession (HMT), the axle has very little horizontal or vertical stress on it compared to VMT with its forcing torque.
For good precession, normally $\omega_S >= 100 \omega_P$
Set $\omega_T = \omega_P$
$\omega_T = \omega_P = L_R Mg/(I_S \omega_S) = L_R Mg/(I_S \omega_S) = L_R Mg/((MR^2/2) \omega_S) = 2L_R g/((R^2) \omega_S) = 2L_R g/(\omega_S R^2)$
$\omega_T = 2L_R g/(\omega_S R^2) = (LL/S^2)/(LL(1/S^2)) = 1/1$ = radians = dimensionless = correct-dimensional analysis
solving $\omega_T$ for $\omega_S$,
$\omega_S = 2L_R g/(\omega_T R^2)$
Now one can choose either $\omega_S$ or $\omega_T$ and solve for the other.
Let $d_S$ = diameter of the Spin Axle. (ft)
One solution that is easy to implement is to let the diameter of the Traction Axle ($d_T$) equal the diameter of the Spin Axle ($d_S = d_T$) so that no machining on the spin axle has to be done and then solve for the Rotor spin angular velocity ($\omega_S$) that meets the Traction axle condition.
Derive an expression for $\omega_S$ in terms of $d_T$ that does not include $\omega_P$, because $\omega_S$ and $\omega_P$ are inversely proportional to each other:
Let $d_T$ = diameter of spin axle = $d_S$
$d_T = 2L_T L_R g/(R \omega_S)^2$ (from earlier equation)
Note that the Traction axle diameter ($d_T$) is inversely proportional to the Rotor spin angular velocity ($\omega_S$).
Solve for $\omega_S$ in terms of $d_T$:
$(R \omega_S)^2 = 2L_T L_R g/d_T$
$R \omega_S = (2L_T L_R g/d_T)^{0.5}$ Check for dimensional correctness:
$\omega_S = (2L_T L_R g/d_T)^{0.5}/R = ((LLL/sec^2)/(L))^{0.5}/L = (LL/sec^2)^{0.5}/L = (L/sec)/L$
$\omega_S = (L/sec)/L = 1/sec$ = rad/sec = correct
If $L_T = 1.2$ ft, $L_R = 1$ ft, $d_T = 0.25$ in = 0.0208 ft, R = 0.5 ft
$\omega_S = (2(1.2)(1)32.2/d_T)^{0.5}/0.5 = (77.28/d_T)^{0.5}/.50 = 2(8.79)/d_T^{0.5} = 17.58/d_T^{0.5}$
$\omega_S = 17.58/d_T^{0.5} = 17.58/(0.25/12)^{0.5} = 17.58/(0.0208)^{0.5} = 17.58/0.1443) = 121.83$ rad/sec
$\omega_S = 121.83$ rad/sec = $121.83/\pi$ rev/sec = 38.78 rev/sec = 38.78(60) rev/min = 2,326.8 rpm
If we let $L_T = 1.2L_R$, then
$\omega_S = (2L_T L_R g/d_T)^{0.5}/R = (2.4 L_R g/d_T)^{0.5}/R = (2.4 L_R (32.2/sec^2)/d_T)^{0.5}/R$
$\omega_S = (2.4 L_R (32.2 ft/sec^2)/d_T)^{0.5}/R = (77.28 ft L_R ft/sec^2)/d_T)^{0.5}/R$
$\omega_S = (77.28 ft L_R ft/sec^2)/d_T)^{0.5}/R = 8.791$ ft/sec $(L_R/d_T)^{0.5}/R = 17.58$ ft/sec $(L_R/d_T)^{0.5}$
$\omega_S = 17.58$ ft/sec $(L_R/d_T)^{0.5} = 17.58$ ft/sec $(1/(0.0208)^{0.5} = 17.58$ ft/sec $(1/0.1442) = 17.58/0.1442$
$\omega_S = 121.83$ rad/sec = $121.83/\pi$ rev/sec = 38.78 rev/sec = 38.78(60) rev/min = 2,326.8 rpm
Calculate $\omega_S/\omega_P = 121.83/[L_R M g/(I_S \omega_S)] = 121.83/[L_R Mg/((MR^2/2) \omega_S)] = 121.83/[L_R g/((R^2/2) \omega_S)] \omega_S/\omega_P = 121.83/[L_R g/((R^2/2) 121.83)] = 121.83/[L_R g/((R^2/2) 121.83)] = 121.83^2 R^2/(L_R g) = \omega_S^2 R^2/(2L_R g)$
$\omega_S/\omega_P = \omega_S^2 R^2/(2L_R g) = 121.83^2 (0.5)^2/2 (1.0)(32.2) = 14,842.55 (0.25)/64.4 = 115.24$
$\omega_S/\omega_P = 115.24$ which is greater than 100, and so the condition for good precession is met.
The above solution is partly algebraic and partly numeric.
Then $d_T = L_R M g/(I_S \omega_S^2)$, $d_T = L_T (\omega_P/\omega_S)$, = 1.2(46.92/2000) = 0.0282 ft = 0.34 inches]]

Applications of Motion by Mass Transfer (MMT)

In order to achieve travel to the stars, it is necessary to develop CLASS II inertial propulsion that can produce sustained acceleration (SA). In addition to sustained acceleration, it also requires a source of energy that has not yet been developed, but for which significant research efforts are currently taking place.

Rockets using solid or liquid propellants are clearly a brute force and very dangerous approach to manned space flights and space travel. Zero-point energy is now recognized as existing even though man has not yet managed to harness it to any significant extent. However, it is anticipated that in a few decades, after zero-point energy has been developed, combining a zero-point energy source with an inertial propulsion system will constitute a perfect marriage of the two technologies for future travel to the planets and the stars.

Possibly the highest rate of acceleration achievable by man is the rate at which a "perfect" spinning rotor gets up to its angular velocity of precession. If it were a "perfect" flywheel with all its mass in a thin rim on its circumference and it was not dragging along any passive mass, the rate of acceleration would be infinite. For travel to the stars, a very high rate of acceleration is not needed, but simply a low rate of acceleration that is sustained.

Consider the demonstration that Dr. Eric Laithwaite once gave. At the end of a three foot rod he raised a 40 lb rotor over his head with the little finger on his right hand. How was this done? The answer is by applying a small horizontal torque to its axis. During the time that the torque was applied the weight essentially disappeared and all the weight Dr. Laithwaite had to lift with his little finger was the rod that weighed about 3 lbs. If the rod itself were spinning (and precessing with the rotor) with only the hand-grip not spinning, then Dr. Laithwaite would have had to lift only the weight of the hand-grip, which would be only a few ounces. Suppose the forcing torque could be sustained such that the weight remained at essentially zero, then it would take only a small rocket to lift the 3 lb rod with its 40 lb spinning rotor attached to it. This would still require a small "brute force" rocket, but the weight needing to be lifted is reduced by a factor of more than ten. Of course it would require an additional mechanism to implement the application of a continuous torque on such a rotor.

The nearest large star to the Earth is Alpha Centauri which is 4.3 light years away. If a space vehicle using sustained acceleration could accelerate at only 2.0 g's it could get half way to Alpha Centauri in one year and then decelerate for another year to arrive at the star. It could spend one year in orbit making observations. Then it could spend two years on the return trip. Then the whole trip would take only 5 years and his/her spouse and children would still be alive and ready to greet him on his return. There is a lot of incentive to develop a mechanical or electric device that can produce sustained acceleration (SA). It should become a number 1 priority of NASA and the ESA.

Docking Maneuvers in Space

Docking maneuvers, such as the Space Shuttle docking with the Space Station, are very critical because of the momentum of the Space Shuttle. Any velocity at the moment of contact could cause serious damage to the Space Shuttle and/or the Space Station. It would be far better to use inertial propulsion during the last part of the docking phase because there is effectively no momentum of the combined inertial propulsion tractor and the Space Shuttle. An inertial propulsion "tractor" could be parked near and secured to the Space Station. If the vehicle to be docked was very massive, as is the Space Shuttle, the velocity approaching docking would be much slower than when docking a smaller unit such as a small shuttle or crew recovery vehicle. The Motion by Mass Transfer (MMT) principle imparts only as much momentum or velocity as it can during a reset stroke and all that momentum or velocity disappears at the end of the reset stroke. The VMT device effectively moves the combined mass of the IPD plus its payload from one point to another with a full stop when it is turned off.

Spacecraft Orientation and Orbital Corrections Using MMT

Inertial Propulsion Units using MMT could replace reaction wheels for space craft and instrument orientation. For example, the reaction wheel for the cameras on the Mars Global Surveyor wore out and ceased to function in 2006 after ten years of operating continuously. Furthermore, after enough time has passed, most reaction wheels have to be de-spun. IPUs using MMT could be used to orient spacecraft and their instruments and can be turned off when not being used, thus greatly extending their lifetimes. Since all motion can be set to stop after each cycle of MMT, the unit would function as a stepping motor and never have to be despun. Since the units do not have to be at the center of gravity, a single unit could be placed almost anywhere on the spacecraft and mounted so that it could be rotated and used for all three orthogonal axes, one axis at a time.

Generic HMT Applications (Requiring a Gravitational Field)
1. Propulsion without external moving parts (Submarine, deep sea submersibles, dirigibles)
2. Airborne: Lightweight UAVs (Unmanned Air Vehicles), dirigibles
3. Demonstration Vehicle (large, light weight automobile)
4. Test in Space Station without wheels, etc.
5. Science Experiments (table top, science classes)
6. Demonstration of Sudden Starts, Stops, 90 degree and 180 degree turns.
7. Toys (radio controlled cars, boats, trains)
8. Scientific Verification and measurement of Reduction of Inertia During Precession (qualitative and quantitative) (Space Station and Earth-bound) to within +−5% of the quality factor equation $Q=(1+(R_1/R_2)^2)/2$ for disk rotors and $Q=(1+(R_i/R_o)^2)/2$ for hoop-shaped rotors where $R_1$ and $R_2$ are defined differently than $R_i$ and $R_o$.
9. Large units for exhibit in museums
10. Nano HMT IPU Device development
11. Emergency Vehicles where traction is poor, such as on ice, icy roads, snow, mud, flooded areas, oil slick on roads, tractors in swamp lands, hybrid vehicles with traction drive and inertial propulsion drive, sport and other vehicles on ice or snow, accident avoidance (stop before going over cliff or crashing into another vehicle or obstacle.

An excellent example of need for HMT IPDs would be for automobiles going up into the mountains where roads are icy and chains are required. With an HMT IPD incorporated into the vehicle, CHAINS WOULD NOT BE REQUIRED. When losing traction on an icy road, simply "ENGAGE IPD" and the car will not need traction, but will move as if pushed by an invisible hand from the aether. Hybrid cars that already have batteries to provide electrical power to wheels could also supply power to the IPD. It will be relatively simple to integrate an IPD into a hybrid electrical vehicle.

Other applications for HMT IPDs would be in snowmobiles, vehicles that operate exclusively in the polar regions on ice or snow, sports vehicles on ice. When losing control of an icemobile, it would stop immediately instead of crashing into a tree or "running away blindly".

Generic VMT Applications (No Gravity Required, No Sustained Acceleration)
1. Maneuvering in Orbit (Space Station, orbital utility vehicles, Inertial Propulsion Tractor), deorbiting of failed or spent satellites
2. Maneuvering at Libration Points.
3. Landing and Lift-off on Low-Gravity asteroids.
4. NEO Orbital Perturbations
5. Performance Tests in Space Station (science experiments)
6. Demonstration of Sudden Starts, Stops, 90 degree and 180 degree turns, and in the vicinity of Earth a downward acceleration of 1.0 G.
7. Verification and measurement of reduction in of Inertia During Precession (qualitative and quantitative) (Space Station)
8. Nano VMT IPU Device development
9. Deorbit of satellites and other orbital vehicles
10. Station-keeping in orbit Space-rated IPDs will have magnetic bearings. For spent or failed satellites, deorbit procedures don't have to be quick, but could use small "horsepower" VMT-IPDs using solar power for a period of several months to accomplish deorbit.

On Feb. 20, 2008, the military used a missile to shoot down a failed satellite in order to avoid a potentially hazardous toxic fuel spill[21]. It took three months of planning, modification of three ships with missiles, and cost $70,000,000. For a fraction of that cost, a low-performance IPD could have taken several months or longer to slowly deorbit the satellite. However, it might require that amount of money to originally develop a space-rated VMT-IPD. With an on-board VMT-IPD, no fuel is needed for station-keeping, thus reducing the mass of the satellite and launch costs. Estimates indicate the weight of an on-board VMT-IPD would have been less significantly than the fuel weight. An IPD is non-hazardous upon re-entry.

On Mar. 15, 2008, the third stage of a proton-M rocket failed to put the AMC-14 telecommunications satellite into correct orbit[22]. It was to have a 15-year service life. Now it has to use most of its on-board fuel to correct its orbit or be scrapped. It was decided to scrap it. An on-board VMT-IPD could have been used to slowly put it into the correct orbit and all the fuel would be saved. If there had been an on-board IPD, no fuel would've been needed for station-keeping. About every month or so a significant example occurs where an on-board IPD would've saved tens of millions of dollars, months of time, and tons of launch weight.

An excellent example of the use of a VMT IPD would be for satellites that have to change their orbit slightly to avoid debris in space. Instead of using up propellant for these maneuvers, an IPD could use solar energy to shift the orbit slightly to avoid known debris. In many such satellites, an IPD would replace the need for any on-board fuel and attitude control jets. An example of the magnitude of this problem is that in January 2007, the Chinese government shot down a polar orbiting satellite about 848 kilometers above the Earth and created an estimated 150,000 pieces of debris[23]. This debris will remain a hazard for centuries to come. This debris is especially dangerous to equatorial satellites in that it is in a polar orbit and can hit a satellite broadside and unexpectedly. In contrast, for equatorial debris the relative velocities are fairly small and the satellite in danger has a chance to observe the nearby debris over a number of orbits and shift its orbit accordingly. It is estimated that about 2,600 pieces of debris are the size of a softball from this event alone and a cumulative total of about 160,000 pieces one centimeter in size. With random collisions of existing satellites and space debris, unless something is done to clean up the debris, low and higher earth orbits will become unuseable in about two decades.

Presently NASA is considering adding shock absorbers to the Ares 1 astronaut-crew-launching rocket to reduce the vibrations originating in the solid propellant main stage due to thrust oscillation during lift-off[24]. This is another example of the reality that rockets using highly volatile propellants are a brute force approach to space launches and space flight. Consider the Shuttle Challenger explosion in 1986.

It is extremely important for NASA and the military to develop HMT and VMT IPD technology as soon as it can. In the long run, it will save trillions of dollars in launch costs, propellant costs, and simpler satellites and space vehicles. Present launch costs are between $10,000 to $20,000 per pound!

With the NASA budget being cut the Moon and Mars programs are in jeopardy. Current plans were to retire the Shuttle in 2010, three years before the Ares rocket is to be completed in 2013[25]. There is also talk of retiring the Space Station even before it is completed. What NASA currently does not realize is that with the immediate development of inertial propulsion systems technology, a lot more could be done for a lot less cost than presently planned, and extending the lifetime of the space and other satellites.

Energy for IPD operation within a solar system could be solar, RTG, or nuclear, and someday maybe even zero-point energy.

Units for Inertial Propulsion Calculations:

When the angular motion in precession of the rotor(s) ceases, the IPD stops. Therefore an HMT or a VMT device cannot have any angular momentum. Therefore regular equations for the dynamics of an IPD cannot be used directly. The terms motion, movement, velocity, acceleration, work, inertia, force, kinetic energy, momentum, and power have to be carefully defined because in general, the standard meanings for all the terms may not apply.

For example, when operating, an IPD has a certain design velocity. When not running, its velocity, inertia, and momentum are zero. When referring to an IPD as defined in this Application it is suggested that terms velocity and acceleration be replaced by ivelocity and iacceleration, where the initial letter "i" refers to the fact that these terms are being used for an inertial propulsion device. Similarly, the other terms, when describing an IPD, would be prefaced with an "i" as follows: iforce, iinertia, ikinetic energy, imomentum, ipower, and iwork. There are other units involved with inertial propulsion, but for now, only the eight units described herein will be considered. When working with inertial propulsion devices that do produce acceleration, the normal terms such as force, inertia, etc, without the "i" in front will apply.

For an IPD, the following parameters are all equal to zero: iacceleration, iforce, iinertia, ikinetic energy, and imomentum. Accordingly, the following identities hold:

iacceleration=0, iforce=0, iinertia=0, ikinetic energy=0, imomentum=0

The ivelocity will not be zero, but will be less than or equal to the IPD design velocity.

It may seem like the above identities place severe restrictions on the usefulness of IPDs, but there are numerous valid applications where IPDs fill unique and important needs in satellite and other space applications.

The fact that an IPD can have velocity does not imply inertia, momentum, kinetic energy, or force. Motion or movement may mean only that an object is moved from one place to another without continuing on.

Since the velocity of an IPD is a function of the total mass of the IPD and its payload (PL), a suitable term would be the product of its mass M times is velocity iV. Since the term is meant to be analogous to horsepower, temporarily let it be termed ihorsepower, or ihp. Normally, multiplying mass time velocity give momentum; however, when working with inertial propulsion, that is not the case.

$$\text{iHorsepower} = \text{ihp} = M_{(IPD+PL)}(iV)$$

For inertial propulsion the term motion will mean moving an object or payload from one place to another without regards to its velocity. The term movement means essentially the same as motion.

The term ivelocity as applied to an IPD with at least one pair of rotors refers to the average velocity achieved during multiple cycles of the individual pair of rotors. Each rotor starts up in angular motion in precession and moves at a constant angular velocity for 180 degrees and then stops its angular velocity in precession. It is then propelled by traction for 180 degrees of its cycle and then stops again. The net motion forward of these two movements for one cycle defines the velocity for each cycle. For Multiple cycles resulting in continuous motion the velocity will be the design ivelocity of each pair of rotors. The number of pairs of rotors increase the ihorsepower of the IPD, but not its ivelocity.

Normally when one of the items is used, the word will be in bold print so as to help distinguish it from normal terms (non-iterms)

footnote: a name for the unit horsepower could be the "Fiala". The final name for the unit of "ihorsepower" will be subject to approval or change by the international committee for the establishment of units.

SUMMARY

There have been almost hundreds of attempts at inertial propulsion by various different means, with none of them succeeding or being practical enough to realize. It is the intention of this invention submission to lay a solid foundation for several different means of obtaining inertial propulsion consisting of motion by mass transfer that are practical to implement. Research by the inventor is ongoing to develop inertial propulsion with sustained acceleration (SA) and will be the subject of a subsequent patent. Since inertial propulsion is really an undeveloped technology, there is so much potential for applications that it is virtually impossible at this time to even imagine all the applications. Whole new industries will develop around the principles of motion by mass transfer and later by inertial propulsion employing Sustained Acceleration.

Amusement park rides could use inertial propulsion. The rides could stop essentially instantaneously during an emergency. Proper seat belt restraints would have to be in place. Merry-go-rounds and all carousel type rides are examples that could use inertial propulsion.

As mentioned earlier, a special light weight demonstration car could be built using HMT that might do zero to 40 mph in one second. Such a vehicle employing HMT would have four wheels, but no internal combustion engine, transmission, gear train, or differential driving them and no heavy duty brakes. An IPD would replace the heavy internal combustion engine. The wheels would be used for holding the vehicle off the ground with the front wheels also used for steering. Such a vehicle would have the minimum possible mass and would be solely for the purpose of demonstrating commercialization of motion by mass transfer. However, it is possible that some physical strength of materials limitation would be reached before 40 mph in one second would be reached.

Other HMT applications include emergency vehicles where traction is poor, such as on ice, icy roads, snow, mud, flooded areas, oil slick on roads, tractors in swamp lands, hybrid vehicles with traction drive and inertial propulsion drive, sport vehicles on ice or snow, accident avoidance (stop before going over cliff or crashing into another vehicle or obstacle). If a hybrid vehicle lost traction and started spinning its wheels on ice, all the driver would have to do is push a button to engage the IPD and the vehicle would be pushed forward without any traction, as if a hand from the sky pushed it. NO CHAINS REQUIRED! MMT (Motion by Mass Transfer) is clearly suitable for moving manned or unmanned vehicles in outer space applications where little or no gravitational fields exist, such as movement near the Space Station, small planets, asteroids, comets, libration points, geostationary orbits, or in general, any orbit where the centrifugal force cancels the gravitational force. MMT is clearly a far safer approach for docking between any two space structures as opposed to rockets using explosive propellants. MMT is truly the precursor to travel to the stars.

Aircraft during takeoff or landing could use inertial propulsion to reduce noise levels to below legal limits. Aircraft in level flight could use inertial propulsion to save on fuel costs to the extent that generating electrical energy for inertial propulsion would be more cost efficient than developing thrust using jet engines. Submarines could move in total silence with no external moving parts.

The use of inertial propulsion devices will generate completely new industries and employment opportunities, and as soon as sustained acceleration is developed, travel to the stars can be realized. Development efforts aimed at achieving sustained acceleration are focusing on using forcing torques that are not constant, but increase as a certain function of time during each cycle and on mechanically implementing vertical precession whereby the distance precessed vertically exceeds the length of the lever arm by using a pseudo-continuous reset function. In general, most generic mechanical components and parameters have analogous electrical counterparts. Research is also focused on defining the complete electronic analogue to the embodiments defined herein which could result in a completely solid state IPU.

Because the inertial propulsion devices covered in this Application do not produce a force and do not accelerate, a new set of units is discussed in a previous section. When referring to an IPD as defined in this Application it is suggested that terms velocity and acceleration be replaced by ivelocity and iacceleration, where the initial letter "i" refers to the fact that these terms are being used for an inertial propulsion device. Similarly, several other terms, when describing an IPD, would be prefaced with an "i" as follows: iforce, iinertia, ikinetic energy, imomentum, ipower, and iwork LIST OF REFERENCE NUMERALS (Parts List)

101 rotor, FIG. 1, 2(a), 45
102 axle, also called lever arm, FIG. 1, 2(a), 45
103 motor, FIG. 1, 2(a)
104 traction wheel, FIG. 1, 45, 46
105 traction ring, FIG. 1, 3, 45, 46, 51
106 axle bearing, FIG. 1, 2(a), 4
107 support ring, FIG. 1, 2(a), 3, 4, 45, 46
108 rotor motor, FIG. 1
109 gimbal, FIG. 1, 2(a)
110 bearing, central column, FIG. 1
111 carriage, FIG. 1, 2(a), 45
112 arrow, direction, FIG. 1
113 central column, FIG. 1, 2(a)
114 traction ring, FIG. 2(a)
115 safety plate, FIG. 2(a), 49
116 traction axle, FIG. 2(a)
117 support ring, FIG. 3
118 motor, FIG. 3
119 gimbal, FIG. 3
120 gear, upper, FIG. 3
121 gear, lower, FIG. 3
122 rotor, FIG. 3
123 rotor, FIG. 3
124 battery, FIG. 3
125 axle bearing, FIG. 3
126 gimbal, FIG. 3
127 traction ring, FIG. 3
128 traction ring, FIG. 4
129 safety ring, FIG. 4
130 motor, FIG. 4
131 traction axle, FIG. 4
132 traction ring, FIG. 5
133 support ring, FIG. 5
134 support ring, FIG. 5
135 traction ring, FIG. 5
136 traction wheel, FIG. 6
137 gear, big, FIG. 6
138 gear box, FIG. 6
139 gear, small, FIG. 6
140 motor, FIG. 6
141 yoke, FIG. 6
142 plate, top pressure, FIG. 6
143 axle, FIG. 6
144 rotor, FIG. 6
145 yoke, FIG. 6
146 traction ring, FIG. 6
147 central column, FIG. 6
148 base ring, FIG. 6
149 rotor, FIG. 6

150 rolling pin rotor (RPR), FIG. 7
151 rolling pin rotor (RPR), FIG. 7
152 limit ring, FIG. 8
153 axle bearing, FIG. 8
154 traction ring, FIG. 8
155 axle, FIG. 8
156 motor, FIG. 8
157 safety plate, FIG. 8
158 yoke, FIG. 8
159 motor, FIG. 10(a), 10 b, 11
160 bevel ring gear, FIG. 10(a), 10 b
161 bevel gear, planetary, FIG. 10(a)
162 yoke, FIG. 10(a)
163 base, FIG. 13(b)
164 motor bracket, FIG. 10(a), 10(b)
165 bevel ring gear, driving, FIG. 10(b), 11
166 rotor, solid disk, FIG. 12(a)
167 rotor, thin rim, FIG. 12(b)
168 rotor, FIG. 13(a)
169 axle, FIG. 13(a)
170 V-pulley, FIG. 13(a)
171 V-groove traction track, FIG. 13(a)
172 axle bearing, FIG. 13(a)
173 uplift, FIG. 13(a)
174 down-track, FIG. 13(b)
175 yoke axle, FIG. 13(b)
176 torque motor, FIG. 20, 22
177 rotor, FIG. 20
178 motor, FIG. 20
179 axle, FIG. 20
180 yoke, FIG. 20
181 central column, FIG. 20, 42
182 reset cylinder, FIG. 20
183 gear, small, FIG. 20, 22
184 gear, large, FIG. 20, 22
185 base, hydraulic, FIG. 20
186 base ring, FIG. 20
187 reset rod, FIG. 20
188 motor, FIG. 23
189 axle collar, FIG. 20, 23
190 rolling pin rotor (RPR), FIG. 23
191 yoke, FIG. 35(a), 35(b)
192 yoke axle bore, FIG. 35(a)
193 alignment circle, FIG. 35(a)
194 yoke arch, FIG. 35(a)
195 central column, FIG. 35(b)
196 V-pulley, FIG. 2(b)
197 V-groove traction ring, FIG. 2(b)
198 hydraulic shock absorber, FIG. 2(b)
199 nano-rotor, FIG. 40
200 nano-controller, FIG. 40
201 yoke, FIG. 13(b)
202 gimbal, semi-circular, FIG. 13(b)
203 motor, FIG. 13(b)
204 base, FIG. 25
205 motor, FIG. 41
206 Traction ring support, square, FIG. 6
207 bracket, FIG. 6
208 beam, FIG. 41
209 support and traction ring, FIG. 41
210 central column post, FIG. 41
211 control ring, FIG. 1, 46
212 fillet, support ring, FIG. 2(a)
213 fillet, traction ring, FIG. 1, 2(a)
214 control ring, FIG. 8, 9, 10(a), 11
215 traction support bearing, FIG. 45
216 cone rotor, FIG. 49
217 gimbal, pitch, FIG. 46
218 bumper ring, FIG. 45, 46, 51
219 roll bearing, FIG. 46
220 hinge, middle part, FIG. 46
221 idler axle, FIG. 41, 47, 48(a), 48(b), 52, cover
222 idler bearing, FIG. 41, 47, 48(a), 48(b), cover
223 support plate, FIG. 47, 48(a), 48(b), 49, cover
224 lever arm, FIG. 47
225 Gravitational Force Vector, Vertical, FIG. 45
226 Precessional Vector, Horizontal, FIG. 45
227 motor, FIG. 47, 42
228 rotor, FIG. 41, 47, cover
229 beam, FIG. 48(a), cover
230 traction ring, FIG. 47, 48(a), 48(b), cover
231 strut, FIG. 49
232 flying saucer enclosure, FIG. 50
233 axle, FIG. 41, 47, 48(a), 48(b), cover
234 half-gimbal, vertical, FIG. 41, 47, 48(a), 48(b), cover
235 hinge, FIG. 20, 23, 48(a), cover
236 central column, FIG. 47, 48(a), 48(b), cover
237 central column post, FIG. 47, 48(a), cover
238 bracket supporting crew cabin, FIG. 50
239 crew cabin, FIG. 50
240 traction and support ring, FIG. 52
241. platform, FIG. 26

APPENDIX B

Glossary

This glossary contains the definition of many technical terms and acronyms associated with the subject of Inertial Propulsion. Different terms can mean different things to different people; however, the definitions given in this glossary apply to the meanings as used in this invention application.

Because of the complexity involved in this disclosure, the newness of the field of inertial propulsion, and the extensive tutorial discussion incorporated into this disclosure, it is felt that this glossary will fill an important need even for the reader skilled in the art and especially to properly communicate the inventor's concepts.

ACCELERATABLE MASS: Any mass undergoing acceleration, whether it is linear, non-linear, or centripetal acceleration. It is the interaction of an accelerating mass with the mass of all the rest of the universe through the medium of the aether that results in a change in the inertia of the accelerating mass[10,11,12,13,15].

ACTIVE MASS: Technically speaking, the Active Mass is the Acceleratable Mass, that in this application, consists of the spinning rotor and its axle, if it is also spinning. Everything else is the passive mass, comprising the complete vehicle, payload, housing, gimbals, including everything but the Active Mass. In the case where the axle of the rotor is not spinning, the inner race of the bearing assembly is passive mass because it is not rotating, while the outer race, which spins with the rotor, is active mass. The ball bearings or roller bearings are considered pseudo-active mass because each ball or roller is rotating about its center and is also spinning in a circle at a speed less than that of the outer race. However, usually the mass moment of inertia of the balls or rollers is negligible and does not appear in the first three or four significant figures affecting performance parameters such as the initial acceleration and maximum velocity for each cycle of the motion by the mass transfer process.

AETHER (also formerly spelled 'ether', but here 'ether' will stand for the chloroform type of chemical). The aether is a hypothetical non-material fluid (the luminiferous aether)

formerly supposed to permeate all space, and having the property of propagating electromagnetic waves and permitting action at a distance or quantum entanglement. During the 1980s and 1990s, it is receiving renewed interest in that it appears that the aether absolutely has to exist. The aether is not to be confused with the Inertial Reference Frame (IRF), or the Universal Lattice (UL), etc., the structure in which the aether may be said to exist. The aether is currently considered to be the medium which permeates the complete universe, in which electromagnetic waves travel, in which static magnetic and electric fields exist, in which light travels, in which gravitational fields exist, and in which matter exists. Just as sound waves require a gas medium in which to propagate, so too, light wages require the aether in which to propagate. Without the aether filling all of space (the inertial reference frame), magnetic flux lines could not exist, gravitational fields couldn't exist, and one mass could not act upon another mass at a distance. In fact, mass itself could not exist if the aether did not exist. If a beam of light encountered a small pocket of true "vacuum" in the inertial reference frame in which the aether did not exist, the beam of light would stop propagating when it comes to the true vacuum. These properties of the aether are either intuitive or obvious, but may currently not be easy to represent with equations. Through the medium of the aether, any mass, such as a rotor, obtains its inertia through action at a distance with all the mass in the universe[10].

ANGULAR MOMENTUM: The product of the mass moment of inertia of a rotating body or system of bodies, as measured about the axis of rotation, and the angular velocity about that axis. Also called the moment of momentum. It is a vector quantity, having the direction of the axis of rotation and a sense such that the vector points towards the observer if the rotation is clockwise as seen by him. Due to the law of conservation of angular momentum, the angular momentum remains constant in any isolated system. However, a massive flywheel precessing about its precession axis may have a reduced value of angular momentum in the direction of precession as measured in our four-dimensional space-time continuum.

AXLE BEARING: A bearing on the spin axle normally on the opposite of the axle that the rotor is on. It maintains tight contact with the support ring so that it will literally hold the traction wheel on the other side of the axle down on the traction ring to provide good traction. Also called TRACTION SUPPORT BEARING.

BASIC ELEMENT: A Basic Element is defined as containing two rotors, two axles, two reset mechanisms, two motors, one or two torque motors, depending on the design, and one central column on a single base as shown in FIG. 20.

BASIC UNIT: A Basic Unit is defined as two basic elements containing four rotors, four axles, four reset mechanisms, four rotor motors, two torque motors and two central columns as shown in FIG. 21.

BUMPER RING: A ring with a circumference that extends outward slightly more than any part of an HMT IPD. For example, if it were being demonstrated on the floor of a room, bumping into a wall would not allow any of the moving parts to bump into a wall. The bumper ring will usually have the TRACTION RING, which has a slightly smaller diameter than the bumper ring, mounted on it. It could also have a support ring mounted on it if one is used in that particular design.

CONE-SHAPED ROTOR: A rotor in the shape of a cone. It may be solid or hollow. A hollow rotor would provide the same velocity as a solid rotor, but would have less "horsepower".

CONTINUOUS RESET: For an inertial propulsion unit that uses a precess and reset cycle, the concept of having the cycle time approach zero so that in effect the precession remains continuous and the reset function remains continuous, but with a phase-shift between the precession and reset portions of the cycle. A resonant vibration mode with a non-spinning lever arm or spin axis is being considered for developing a continuous reset function. A continuous reset may not be physically possible. Testing to date has not succeeded in producing a successful continuous reset function.

CONTROL RING: When the support ring and the traction ring or the support ring and the limit ring are integrated into a single part, it is called the control ring.

DISCRETE RESET: For an inertial propulsion unit that uses a precess and reset cycle, the forcing torque is turned off for a part of the cycle thus stopping precession and during this part of the cycle the spinning rotor with its axle or lever arm is forcibly reset to its reference or starting position. As soon as the reset is completed, the forcing torque is resumed and thus the precession part of the cycle takes place.

ESCAPE VELOCITY: The velocity required to escape the gravitational pull of a body from the surface of the body. The equation for the escape velocity at any altitude above the surface of a body is equal to the square root of 2 times the orbital velocity at that altitude. The escape velocity for a body smaller than the earth comes into play considering the maximum velocity of a VMT IPD.

FGD: Fiala Gravity Drive

Fiala: The last name of the inventor. Also the term currently used to represent the equivalent of a term like "horsepower" of an HMT or VMT IPD as defined in this Application. The term "Fiala" is the "units" currently defined for ihorsepower=ihp, the expression for the analog to horsepower when working with HMT and VMT inertial propulsion devices as described in this Application. The iHorsepower=ihp=$M_{(IPD+PL)}$(iV), where $M_{(IPD+PL)}$ is equal to the sum of the mass of the rotors plus the mass of the payload (PL) and iV is the maximum design velocity of the IPD. For example:

ihp=10.0 Fialas=$M_{(IPD+PL)}$(iV)=(10 lbs)(1.0 ft/sec)=10 Fialas=10 ft-lbs/sec. It has the same units as momentum, which is the product of mass times velocity. Although, an HMT or VMT IPD does not have momentum in the conventional sense, it is a measure of how fast an IPD can move a given mass including the mass of the IPD. See ihorsepower=ihp.

Fiala Vertical Space Drive (FVSD):

FLYWHEEL: Used to store kinetic energy. For purposes of the invention submission, a rotor is not considered a flywheel or a gyroscope. For example, for HMT or VMT the primary purpose of a spinning rotor is to develop precession and not to store energy. For VMT, work is accomplished by the use of a forcing torque and not the kinetic energy of a spinning rotor.

FORCING TORQUE (FT): In a gravitational field, a torque applied to accelerate or decelerate the precessional angular velocity of a rotor or flywheel undergoing natural precession. For a rotor undergoing natural precession in the earth's gravity field, the torque is applied about the vertical axis which contains the pivot point for the flywheel. The resulting natural precession due to the earth's gravitational field is about the vertical axis at its natural angular rate. If a forcing torque is applied so as to increase the angular velocity (hurrying torque), the rotor will rise or precess upward in angle about its pivot point. If the forcing torque is applied so as to reduce the angular velocity about the vertical axis (slowing or retarding torque), then the rotor will precess downward in angle. The forcing torque will cause the rotor to move up or down in angle and to trace out a path on a spherical surface.

While not in a gravitational field, or in free fall in a gravitational field, a forcing torque is a torque applied to a central column for the purpose of producing a precession of a spinning mass in a direction perpendicular to the plane in which the forcing torque is applied.

FVSD: Fiala Vertical Space Drive

GRAVITATIONAL POTENTIAL ENERGY: At a point in the gravitational field of an isolated spherically symmetric mass, gravitational potential energy is represented by the quantity Gm/r, where G is the gravitational constant, m is the mass concerned, and r is the distance of the point from the center of mass.

GRAVITATIONAL FIELD: The field in which gravitational forces are operative. According to Einstein's general theory of relativity this field may be described in terms of GRAVITATIONAL WAVES and quanta which are analogous to the waves and quanta of the electromagnetic field. However, gravitational quanta (gravitons) are still hypothetical[26].

GYRO: See Gyroscope.

GYROSCOPE (AS DISTINGUISHED FROM A FLYWHEEL, TOP or a ROTOR): The original definition of a gyroscope has changed significantly in the past four decades with the invention of different types of gyroscopes. The original definition included an apparatus including a housing, two bearings or bushings, an axle, and a flywheel or wheel or disk mounted to spin rapidly about an axis and also free to rotate on one or two additional pivot points or joints about one or both of two axes perpendicular to each other and to the axis of spin so that a rotation of one of the two mutually perpendicular axes results from the application of torque to the other when the wheel is spinning and so that the entire apparatus offers considerable opposition, depending on the angular momentum, to any torque that would change the direction of the axis of spin. The terms "gyro" and "gyroscope" have the same meaning and are used quite interchangeably as can be seen by a review of the literature. Several different types of gyroscopes that use non-mechanical means and/or support include the electrostatic gyroscope and the cryogenic gyroscope. A fiber-optic gyro or gyroscope is also an example of a gyroscope that does not use a flywheel and has no moving parts. A ring laser gyro is another example of a gyroscope that does not use a flywheel and has no moving parts. A nuclear-spin gyroscope is all solid state, weighs less and uses less power than even a fiber-optic gyroscope [NASA Tech Briefs, January 2008, page 59]. For the purposes of this invention submission, a spinning rotor is not considered to be a gyro or gyroscope.

HMMT (HMT): Horizontal Motion by Mass Transfer. See MMT.

HMT (HMMT): See HMMT and MMT.

HORSEPOWER: For an HMT or VMT IPD, an expression to convey an idea of the amount of passive mass that can be moved at a given velocity. This expression when used with an HMT or a VMT IPD is not really in the units of conventional horsepower.

IDLER BEARING: As shown in FIGS. 47 and 48, the idler bearing turns on the idler axle and is rotated by contact with the rotor and then by its rotation and traction with the traction ring, it moves the axle CCW during the traction half of a cycle. The idler bearing will be comprised of a high quality bearing with a rubber-like substance on its circumference so that it will maintain good traction with the axle above it and the fraction ring below it.

IDLER AXLE: An axle that is fixed on the inside of a half-gimbal as shown in FIGS. 47, 48 and 52. The idler bearing turns freely on it.

i: A mathematical term equal to the square root of minus one ($\sqrt{-1}$). It is used in Electrical Engineer to represent the imaginary components of voltage, current, and impedance. It is also used to represent certain units related to inertial propulsion.

iterms: When working with calculations for inertial propulsion devices that do not exhibit a force or acceleration, as disclosed in this Application, several terms such as force, inertia, acceleration, etc, have to be modified. In this document, the terms used with "i"nertial propulsion devices will simply have an "i" (italicized letter "i" as in the imaginary unit in mathematics and engineering) as the first letter in the terms. The terms are referred to as iterms. Examples are as follows: iforce, iinertia, ikinetic-energy, imomentum, ipower, and iwork. Those terms are defined in the following group. When working with inertial propulsion devices that do produce acceleration, then the normal terms such as force, inertia, etc, without the "i" in front will apply.

iacceleration: The expression for acceleration when working with inertial propulsion devices as described in the Application. The iacceleration will always be equal to zero.

iforce: The expression for force when working with inertial propulsion devices as described in the Application. The iforce will always be equal to zero.

iinertia: The expression for inertia when working with inertial propulsion devices as described in the Application. The inertia will always be equal to zero.

ikinetic-energy: The expression for kinetic energy when working with inertial propulsion devices as described in the Application. The ikinetic-energy will always be equal to zero.

imomentum: The expression for momentum when working with inertial propulsion devices as described in the Application. The imomentum will always be equal to zero.

ihorsepower=ihp: The expression for the analog to horsepower when working with inertial propulsion devices as described in the Application. The iHorsepower=ihp=M$_{(IPD+PL)}$(iV), where M$_{(IPD+PL)}$ is equal to the sum of the mass of the rotors plus the mass of the payload (PL) and iV is the maximum design velocity of the IPD.

ipower: The expression for power when working with inertial propulsion devices as described in the Application. The ipower will always be equal to zero.

ivelocity: The expression for velocity when working with inertial propulsion devices as described in the Application. The ipower will always be less than or equal to the maximum design velocity of a single pair of rotors.

iwork: The expression for work when working with inertial propulsion devices as described in the Application. The iwork will always be equal to zero.

INERTIA: The property of matter that manifests itself as a resistance to any change in the momentum of a body. Its value is based upon the total amount of mass in the universe and the inverse square of the distance to each particle of mass. It is similar to the resistance to motion exhibited by an object immersed in a fluid or gaseous medium. The resistance to motion is a function of the viscosity of the medium. In deep space, any body may be considered to be in free fall subject to a gravitational vector equivalent to the summation of the gravitational forces due to all particles of mass in the universe. The magnitude and direction of this vector will vary according to its position in the universe.

INERTIAL DAMPING: Inertial damping is a term that is so far used only in science fiction movies such as Star Trek. It is the ability for objects or humans to not feel the effects of acceleration or deceleration. It may someday be possible for this phenomenon to be realized. It was first postulated by a blind mathematician, Berkhard Heim, in Germany in the early 20$^{th}$ century[30]. [(ref)] Although it doesn't exist yet, the combination of Sustained Acceleration and Inertial Damping will be classified as Class III Inertial Propulsion.

INERTIAL PROPULSION: Inertial Propulsion is the ability to move or accelerate a body in some direction without the use of a propellant or apparently without the application of an external force. The energy required to accomplish this must be contained within the body (for limited movement or acceleration), or the body may generate the required energy by harnessing energy that may be present in the aether, whether it is electrical, magnetic, nuclear, gravitational, acoustic, or zero point energy for unlimited movement or acceleration. Any form of energy present in the vicinity of the body may be said to exist in the aether occupied by the body unless it is somehow shielded from entering into that space.

INERTIAL PROPULSION DEVICE (IPD): A device used to propel another mass or vehicle or payload without the use of a propellant. See INERTIAL PROPULSION UNIT (IPU).

INERTIAL PROPULSION UNIT (IPU): A device used to propel another mass or vehicle or payload without the use of a propellant. The term is interchangeable with the term Inertial Propulsion Device (IPD), although the term IPU is more general while the term IPD more often refers to a specific device. Propelling a mass by interacting with the aether instead of pushing directly or indirectly against other mass such as a propellant or a launch pad. Indirectly pushing is through the use of magnetic, electric, gravitational, or other fields. Interaction with the aether will normally involve an accelerated mass such as may be found in a centripetally accelerated rotating inertial mass.

INERTIAL REFERENCE FRAME: The absolute reference frame as determined by the very distant "fixed" stars. The stars actually do move, but not noticeably in the time frame of an inertially propelled mission within our solar system.

IPD: See Inertial Propulsion Device.
IPE: Inertial Propulsion Engine.
IPU: See Inertial Propulsion Unit.

LEVER ARM: The rod or shaft or axle from the center of mass of the spinning precessing rotor to its pivot point. The term lever arm is used primarily because angular momentum and torque about the pivot point is commonly used in inertial propulsion calculations.

LIBRATION POINTS: Stationary points in a two body system where the sum of the gravitational forces and any centrifugal forces due to orbital motion exactly cancel each other. In the earth-moon system there are five such points, identified as L1, L2, L3, L4, and L5. If the two masses are labeled M1 and M2 with M1 on the left and M2 on the right, then L1 will lie between the centers of the two masses (and this could be below the surface of one of the two bodies), L2 will lie to the right of the center of M2 (and could be below its surface), and L3 will lie to the left of the center of M1 (and could lie below its surface). L4 and L5 are points in the plane of rotation of the two bodies which form an equilateral triangle with the two masses. Let M3 be a third test mass of absolutely negligible mass compared to M1 and M2 and let it be placed at L4 or L5. In each case the three bodies (M1, M2, and M3) are at rest when viewed in a coordinate system which rotates at the appropriate constant angular velocity. All five points are also called Lagrangian points, after their discoverer, Joseph Lewis Lagrange (1736-1813). L4 and L5 are conditionally stable libration points and L1, L2, and L3 are unstable no matter what the ratio of M1 and M2 is. The masses of the Sun and the Earth also have two conditionally stable libration points. In between missions, certain spacecraft have been parked at one of these points for a period of several years. The masses of the sun and Jupiter satisfy the stability condition and so there might be expected to be an accumulation of asteroids and other debris at these points. Such asteroids have been discovered and are known as the Trojan asteroids and their libration points are also called Trojan points. The earth and its moon have stable L4 are L5 points. One of the stable points was used to park a space probe for several years between missions to comets or asteroids.

LIR: Local Inertial Reference Frame
LY: Light year: The distance that light travels in one year.
MASS MOMENT OF INERTIA: The product of the mass of a body times its moment of inertia. Its units in the FPS system are ft-lb-sec$^2$.
LIR: Local Inertial Reference Frame
Local Inertial Reference Frame
MASS TRANSFER: See Motion by Mass Transfer.
MCT: Motion by Charge Transfer.
MMD: Motion by Mass Displacement: To physically move mass out of its usual or proper place. See Motion by Mass Transfer (MMT), the preferred terminology.
MMT: See Motion by Mass Transfer.
MOTION BY CHARGE TRANSFER: To physically move a charge out of its usual or proper place in a manner analogous to MMT.
MOTION BY MASS TRANSFER: To physically move mass from one place to another by reacting against another mass. It does not imply sustained acceleration. In the case of inertial propulsion, mass transfer is accomplished by cycles involving precession of a spinning mass with reduced inertia and the resetting of that spinning mass with full inertia to its reference position by reacting against the housing.
MOMENTUM: The product of mass and velocity.
NATURAL PRECESSION: When applied to a spinning rotor, flywheel, or gyro, it is the circular motion of the center of mass of the spinning element in response to the downward pull of the earth's gravitational field. At any instant, the precessional motion is perpendicular to the plane formed by the downward gravity vector and the spin axis of the spinning element. Precession due to the Earth's gravity is also called "Free" precession.
NET MOVEMENT: In an inertial propulsion unit, the difference between the forward movement of the center of mass of the IPU during the reset cycle and a smaller amount of backward movement during the precession part of the cycle.
NUTATION: The oscillatory movement of the axis of a rotating body. For a precessing gyroscope or flywheel, if the initial conditions are suitably chosen, the precession angular velocity will be constant. If the initial conditions are so carefully chosen, the spin axis will bob up, down, and sideways, sweeping out a periodic path superposed on the steady precession. This periodic motion which is superposed on the steady precession is called nutation.
PASSIVE MASS: A non-spinning mass. For a flywheel, the active mass is the circular spinning element and elements such as an axle or hub that are non-rotating would be considered as PASSIVE MASS. To maximize the lift for an inertial propulsion unit, it is important to maximize the ratio of the active to the total mass (active plus passive). That part of the mass of the complete vehicle, payload, housing, gimbals, including everything except the active mass which consists of the spinning rotor and its axle, if it is also spinning.

PIVOT POINT: The point inline with the spin axis, the forcing torque axis, and the axis about which precession takes place. By design, the pivot point may be designed to be hollow or void of any mass, containing only vacuum energy.

PLATFORM: A platform is defined as having a total of four basic elements (four rotors) on it, two of which are precessing while the other two are resetting. Of the two that are precessing, one is precessing CW and the other is precessing CCW for the purpose of canceling all torques tending to rotate the vehicle. The two that are precessing are precessing in phase with each other, but in the opposite direction. Likewise, the two basic units that are resetting are being reset in synchronism with each other and 180 degrees out of phase with the other units.

PRECESSION: There are several types of precession depending upon the circumstances. They might be classified as NATURAL precession, FORCED precession, CONSTRAINED precession, and UNCONSTRAINED precession. Natural precession, also termed "free precession" is precession in the horizontal plane due to gravity. An example of Forced precession might be a car on a circular race track where the back wheels represent spinning rotors and they are forced to precess on the circular path of the race track. Constrained Precession is when a torque is applied, for example, about the vertical axis of a naturally precessing rotor and the rotor is prevented or constrained to not rise in response to the applied (forcing) torque, in which case there will be a "back reaction" to the axis to which the torque is applied. Unconstrained precession is, for example, the unrestricted vertical movement of a naturally precessing rotor in response to a forcing or slowing torque applied about the vertical axis.

Precession is defined as the motion of the axis of a rotating body which describes a conical surface when a torque is applied to it so as to tend to change the direction of the axis. The precessional motion of the axis at any instant is at right angles to the plane defined by the direction of the torque and the spin axis of the rotating body. The time rate of change of angular momentum about any given axis is equal to the torque applied about the given axis. When a torque is applied about the pivot point of a spinning rotor and the speed of the wheel is held constant, the angular momentum of the rotor may be changed only by rotating the projection of the spin axis with respect to the input axis, i.e., the rate of rotation of the spin axis about the output axis is proportional to the applied torque. This may be stated in an equation as the applied Torque is equal to the product of the angular momentum (about the spin axis) and the precession angular speed (of the spin axis) about the precession axis.

If a forcing torque is applied about the vertical axis of a rotor precessing naturally in the horizontal plane, then the angular velocity of the vertical precessional rise of the rotor in response to the applied torque (T) is given by dividing the applied torque by the angular momentum about the spin axis. This states that the vertical rise is directly a function of the applied torque; however, without the angular momentum stored in the kinetic energy of the spinning rotor, it could not rise in precession. The spinning rotor, or rather its angular momentum about its spin axis, is what converts a forcing (or hurrying) torque into an increase of the vertical angle of the rotor axis about the pivot point, which may also be seen to be a lift generating action.

Why does natural horizontal precession speed up as the rotor slows down? It is because as the rotor loses speed, its angular momentum (which is in the denominator) gets smaller so the precession angular velocity increases. A factor which can cause it to rise as it increases in angular velocity is that the radius of the precession path is getting smaller while trying to maintain angular momentum.

PROPEL: To drive forward or onward by or as if by means of a force that imparts motion. To propel does not necessarily imply acceleration or the application of a force.

PROPULSION The action or process of propelling. The term propulsion includes motion by mass transfer. The term does not necessarily imply acceleration or the application of a force, even though common usage implies acceleration due to the application of a force. However, during VMT inertial propulsion, the reset stroke does apply and remove a force during each cycle and for each cycle of HMT, the traction wheel does apply and remove a torque about the vertical axis.

PUSH: To press against with a force in order to drive or impel.

RADICAL: The symbol for the square root of a quantity.

RESET MOTION: During a VMT inertial propulsion cycle using precessing masses, the moving of a spinning rotor back to its reference position while it is not precessing.

RESET STROKE: The mechanical operation of the reset motion by the reset actuator. See Reset Motion.

RESET TRACK: See Retrace Path.

RETRACE PATH: The path that the spinning or active mass follows on its way back to its reference position during an HMT cycle. It is not processing during the retrace motion, but the active mass is being pushed or it is propelling itself back to its reference position by the turning action of its rotor or axle against the retrace path while drawing its energy from the kinetic energy of the spinning rotor.

RESILIENT: Capable of withstanding shock without permanent deformation or rupture. A structural beam would be considered resilient within its elastic limits. As applied to inertial propulsion, it is a combination of springs and shock absorbers or electromagnetic damping to smooth out the velocity variations of the vehicle or housing while the spinning rotor precesses and resets.

ROLLING PIN ROTOR: A special case of a solid disk rotor where the diameter of the rotor is as small as its axle diameter and the length of the "long axle" is really the width of the disk. In the case of an RPR, the axle or lever arm will have a larger diameter than would otherwise be required to support a disk rotor during forced precession or a reset action, in which case the axle contributes a negligible part to the angular momentum of the rotor-axle assembly.

ROTOR: A circular disk or flywheel capable of being spun and considered the active mass in an inertial propulsion unit employing one or more such devices. This term is used in contrast to the term gyro or gyroscope which implies a significantly more complex and different device.

RPR: See Rolling Pin Rotor.

SA: SUSTAINED ACCELERATION (Class II)

SDR: SOLID DISK ROTOR

SELF-LEVELING: As shown by FIG. 46, the basic HMT IPD will remain horizontal when its outer ring is mounted inside of a gimbal allowing for vehicle pitch movement and a roll bearing allowing for vehicle roll. Under these conditions, the HMT IPD will remain perfectly horizontal by virtue of the fact that gravitationally induced precession is by definition and reality in the horizontal plane.

SPACE ENERGY: Also called Zero Point Energy[9,11,13,14,15,16,17], Vacuum Energy, or "Free Energy". The electromagnetic zero-point radiation that exists at a point in the vacuum even if the temperature at that point is absolute zero. Recent observations and tests indicate that there is a very large amount of zero point energy (ZPE) or space energy at every point in space, possibly even of the order or magnitude of nuclear energy. Harold E. Puthoff and Harold Aspden are recent exponents of ZPE. To any device employing this space energy at any fixed or moving location, the source of space energy would be virtually inexhaustible since the earth rotates on its axis, revolves around the sun, moves within our galaxy, and also moves with our galaxy. It would be inconceivable to deplete any localized region on or near the earth of the space energy that it comes in contact with.

SPECIAL RELATIVITY: Einstein's theory of Special Relativity which state that as the speed of matter approaches the speed of light, its mass becomes infinite.

STARSHIP: A spaceship that can travel at close to, at, or greater than the speed of light and capable of traveling to the stars.

SUPPORTING RING, CIRCULAR: The support ring is a circular ring immediately below a bearing on the rotating axle of the precessing rotor. For 180° it supports the rotating axle and disk so that it does not precess. During this 180° the other half of the rotating axle propels itself through friction with the reset track. During the other 180° the support ring drops down slightly to allow precession and acts as a safety barrier in case the rotor axle were to fall out of precession and dropdown.

SUSTAINED ACCELERATION (SA): The continuous application of a force (such as that produced by a rocket engine) to an object will cause the object to continuously accelerate. SA is Class II Inertial Propulsion.

THRUST: To push or drive with force applied for a period of time. Force applied to an object to move it in a desired direction.

TORQUE: The turning moment exerted by a tangential force acting at a distance from the axis of rotation or twist. It is equal to the product of the force and the distance in question. Its units are force times length.

TRACTION SUPPORT BEARING: Also called AXLE BEARING. A bearing on the spin axle normally on the opposite of the axle that the rotor is on. It maintains tight contact with the support ring so that it will literally hold the traction wheel on the other side of the axle down on the traction ring to provide good traction.

TRR: Thin Rim Motor

UCM: Uniform Circular Motion

UL: UNIVERSAL LATTICE, same as URF.

URF: Universal Reference Frame

VACUUM: The three dimensional space which in theory would be void of all matter. In a true vacuum (not possible), not even the aether would exist and light waves could not propagate through space.

VACUUM ENERGY: Also called Space Energy or Zero Point Energy. See Space Energy

VARIABLE INERTIA: When a spinning precessing rotor has reduced inertia in the direction of precession, this is an example of variable inertia.

VMT (VMMT): Vertical Motion by Mass Transfer. VMT in a gravitational field is useful where the maximum velocity is greater than the escape velocity of the gravitational field in question or for any orbital applications where the gravitational field is cancelled by the centrifugal acceleration in the orbit. See Escape Velocity.

WARP DRIVE: A term used mostly in science fiction, but could become a reality in the near future. Warp drive is a faster-than-light (FTL) propulsion system in the setting of many science fiction works, most notably Star Trek. A spacecraft equipped with a warp drive may travel at velocities greater than that of light by many orders of magnitude.

WORK: The transfer of energy from one system to another. The unit of work is thus the same as that of energy; in the MKS and SI systems it is the joule, and in the CGS system the erg.

WORM HOLE: In physics, a wormhole is a hypothetical topological feature of spacetime that would be, fundamentally, a "shortcut" through spacetime.

ZERO POINT ENERGY: Also called Space Energy or Vacuum Energy. See Space Energy.

ZPE: ZERO POINT ENERGY

REFERENCES

1. Dean, Norman L., U.S. Pat. No. 2,886,976 (1959) System for converting rotary motion into unidirectional motion.
2. Matyas, Laszlo B., U.S. Pat. No. 3,584,515 (1971), Propulsion Apparatus.
3. Cook, Robert, U.S. Pat. No. 4,238,968, "Device for Conversion of Centrifugal Force to Linear Force and Motion", 1980. Website: http://www.rexresearch.com/cookip/cook-ip.htm#4238
4. Laithwaite, Eric Robert, PhD, (deceased) U.S. Pat. No. 5,860,317 titled, "Propulsion System", filed on May 5, 1995, issued on Jan. 19, 1999, also GB2289757 and WO9530832 for the UK and World patents respectively.
5. Strachan, Scott, Patent 22 15 048, Great Britain
6. Jones, Alex Charles (deceased), Patent: Vortriebsvorrichtung (Forward Drive Device) (Patent #23 41 245-in German), filed August 1973, issued May 22, 1975, St. Armes, Alderney, Channel Islands (Great Britain) [deceased September 1995].
7. Spacecraft Attitude Determination and Control, Edited by James R. Wertz, 1988, Written by Members of the Technical Staff, Attitude Systems Operation, Computer Sciences Corporation, Kluwer Academic Publishers.
8. Dean, Norman L., U.S. Pat. No. 3,182,517 on an "Oscillation Thruster" type of space drive, 1965. Also, in the June 1960 issue of "Astounding Fact and fiction" an article described the "Dean Drive" and claimed that it was suitable for a space drive, implying that it could produce Sustained Acceleration. However, this claim was in error.
8.1: Frontiers of Propulsion Science. Edited by Marc G. Millis and Eric W. Davis, Volume 227. Progress in Astronautics and Aeronautics, 2009, AIAA, pages 156-159 on Inertia and the Mass in the Universe.
9. Zero-Point Energy: The Fuel of the Future, Tom Valone, PhD, 2007 book, Encyclopedia of Physics, Rita G. Lerner/ George L. Trigg, Second Edition, VCH, 1991.
10. Ciufolini, Ignazio, and Wheeler, John Archibald, Gravitation and Inertia, 1995, Princeton Series in Physics, Princeton University Press. (local inertial frames, page 4; gyrogravitation, page 7; gravitomagnetism, page 7)
11. On the relation between a zero-point-field-induced inertial effect and the Einstein-de Broglie formula, B. Haisch & Rueda, Physics Letters, A, 268, 224, (2000)
12. Inertial Mass as Reaction of the Vacuum to Accelerated Motion, A. Rueda & B. Haisch, Physics Letters A, Vol 240, No. 3, pp 115-126, (1998).
13. Inertia as a Zero-Point Lorentz Force, B Haisch, A. Rueda & H. E. Puthoff, Physical Review A, Vol. 49, No. 2, pp 678-694 (1994).
14. Quantum and Classical Statistics of the Electromagnetic Zero-Point-field, M. Ibison & B. Haisch, Physical Review A, Vol 54, pp 2737-2744, (1996).
15. Aspden, Harold: Power from Space: Inertia and Gravitation, Energy Science Report No. 6, 1994.
16. Cole, Daniel C., and Puthoff, Harold E., Extracting Energy and Heat from the Vacuum, Physical Review E, August 1993, and Institute for Advanced Studies.
17. King, Moray B. Tapping the Zero-Point Energy (How "free energy" and "anti-gravity" might be possible with today's physics), 1989, Paraclete Publishing, BX859, Provo, Utah 84603, ISBN 0-9623356-0-6.

18. Forward, Robert, Dr., U.S. Pat. No. 3,273,397 Measurement of Static Force Field Gradients, filed Jun. 5, 1964, issued Sep. 20, 1966, assigned to Hughes Aircraft Company, 14 claims, Hughes PD-5817, The Mass Sensor, also called the Gravity Gradient Sensor)

The invention claimed is:

1. A gyroscopic device using precession to move a plurality of arms back and forth or up and down in a circular arc from approximately −30 degrees to approximately +30 degrees above a horizontal comprising:
a base,
a central column extending from the center of said base,
a deck, each deck comprising:
said plurality of arms,
each arm being 180 degrees apart and rotating simultaneously about two separate orthogonal axes having a common pivot point, each arm comprising:
an axle and a circular rotor that are aligned so as to be concentric,
a collar concentric with said circular rotor and said axle,
a reset means comprising a reset cylinder and a reset rod that is connected to each collar and to said central column above said common pivot point,
wherein said reset means moves each arm from approximately +30 degrees to approximately −30 degrees from said horizontal; and
wherein each axle is connected to said central column with a yoke.

2. The gyroscopic device of claim 1 wherein each arm includes an electrical drive means in the form of a motor that spins said circular rotor, said electrical drive means being concentric with said circular rotor.

3. The gyroscopic device of claim 1 wherein a second electrical drive means in the form of a motor provides a forcing torque to said central column through a pair of gears with one of said gears being concentric with and attached to said central column, wherein said circular rotor of each arm moves in a circular arc from approximately −30 degrees to approximately +60 degrees above said horizontal in an arc about said common pivot point at said center of said central column due to said forcing torque provided by said second electrical drive means.

4. The gyroscopic device of claim 1 wherein there are multiple decks attached to said central column.

5. The gyroscopic device of claim 1 wherein each of said circular rotors has a small diameter equal to a diameter of said axle, the width of said circular rotor being equal to the length of said axle.

6. The gyroscopic device of claim 5 where the circular rotors are fabricated with carbon nano-tubes.

7. The gyroscopic device of claim 3 wherein said forcing torque is not constant but rather a torque that increases as a function of time.

* * * * *